United States Patent
Ishimaru et al.

(10) Patent No.: US 6,884,197 B2
(45) Date of Patent: Apr. 26, 2005

(54) GEAR SHIFTER FOR AUTOMATIC TRANSMISSION

(75) Inventors: Wataru Ishimaru, Kanagawa (JP); Yasuo Sumi, Kanagawa (JP)

(73) Assignee: Jatco Ltd, Fuji (JP)

( * ) Notice: Subject to any disclaimer, the term of this patent is extended or adjusted under 35 U.S.C. 154(b) by 0 days.

(21) Appl. No.: 10/343,924

(22) PCT Filed: May 29, 2002

(86) PCT No.: PCT/JP02/05183
§ 371 (c)(1),
(2), (4) Date: Feb. 6, 2003

(87) PCT Pub. No.: WO02/099316
PCT Pub. Date: Dec. 12, 2002

(65) Prior Publication Data
US 2004/0077452 A1 Apr. 22, 2004

(30) Foreign Application Priority Data
May 30, 2001 (JP) .................................. 2001-161578

(51) Int. Cl.[7] .............................................. F16H 3/44
(52) U.S. Cl. ...................... 475/271; 475/275; 475/276
(58) Field of Search ............................ 475/271, 275, 475/276

(56) References Cited

U.S. PATENT DOCUMENTS

| | | | |
|---|---|---|---|
| 3,722,323 A | * | 3/1973 | Welch .................. 475/55 |
| 3,815,445 A | * | 6/1974 | Gorrell et al. ............ 475/286 |
| 3,863,524 A | * | 2/1975 | Mori et al. .............. 475/57 |
| 4,027,551 A | | 6/1977 | Murakami et al. |
| 4,027,552 A | | 6/1977 | Murakami et al. |
| 4,513,634 A | * | 4/1985 | Ohtsuka ................ 475/54 |
| 5,106,352 A | | 4/1992 | Lepelletier |
| 5,133,697 A | * | 7/1992 | Hattori ................ 475/276 |
| 6,342,026 B1 | * | 1/2002 | Takagi et al. ............ 475/276 |
| 6,752,737 B1 | | 6/2004 | Ishimaru et al. |
| 2002/0091032 A1 | * | 7/2002 | Hayabuchi et al. ........ 475/278 |
| 2003/0186775 A1 | | 10/2003 | Ishimaru et al. |

FOREIGN PATENT DOCUMENTS

| | | | | |
|---|---|---|---|---|
| JP | 50-160649 | | 12/1975 | |
| JP | 51-64156 | | 6/1976 | |
| JP | 51-91465 | | 8/1976 | |
| JP | 02118240 A | * | 5/1990 | ............ F16H/3/66 |
| JP | 4-219553 A | | 8/1992 | |

* cited by examiner

Primary Examiner—Charles A. Marmor
Assistant Examiner—David D. Le
(74) Attorney, Agent, or Firm—Foley & Lardner LLP

(57) ABSTRACT

A gear shift control apparatus has a higher degree of freedom for selecting a gear ratio than that of a Ravigneaux type composite planetary gear train, while achieving a strength advantage of the gear train, an improvement in the fuel economy, a coaxial positioning of an input portion and an output position, and a size reduction of an automatic transmission. The apparatus achieves six forward speeds and one reverse speed by properly engaging/releasing three clutches and two brakes. One of three planetary gearsets is a speed-reducing or speed-increasing device for reducing/increasing the speed of an input rotation. One of the remaining two planetary gearsets is a double sun gear type planetary gearset, a carrier of which has a center member for inputting or outputting a rotation from between two sun gears.

17 Claims, 49 Drawing Sheets

FIG. 4a 1st
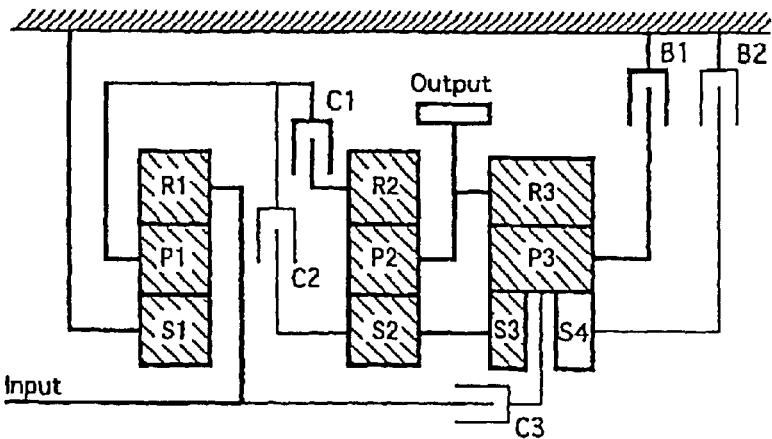
FIG. 4b 2nd
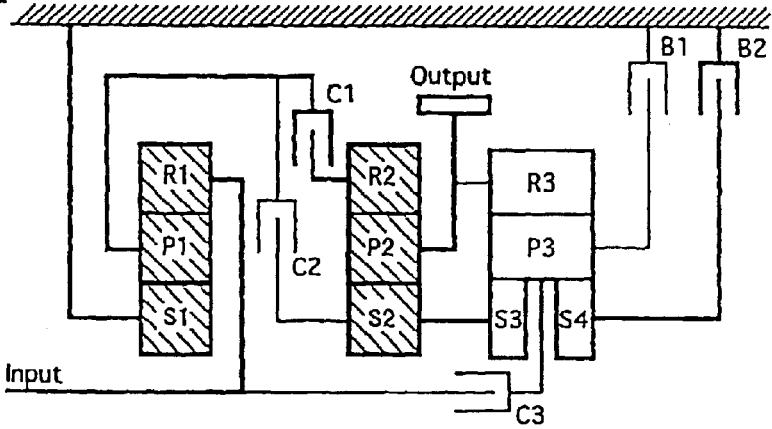
FIG. 4c 3rd
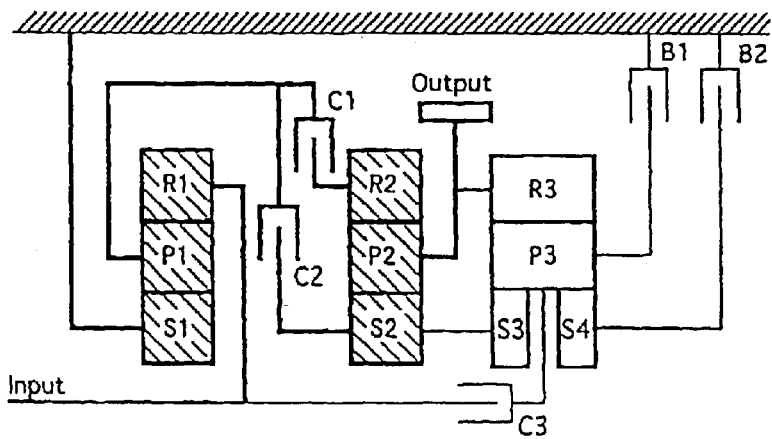

FIG. 5a 4th
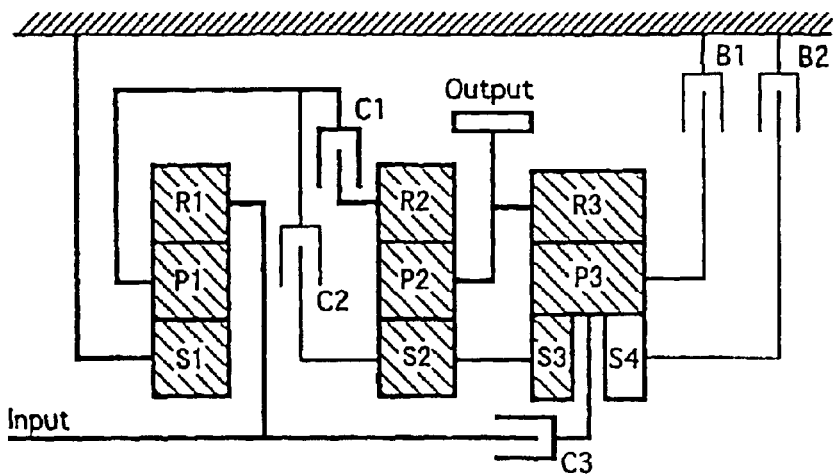
FIG. 5b 5th
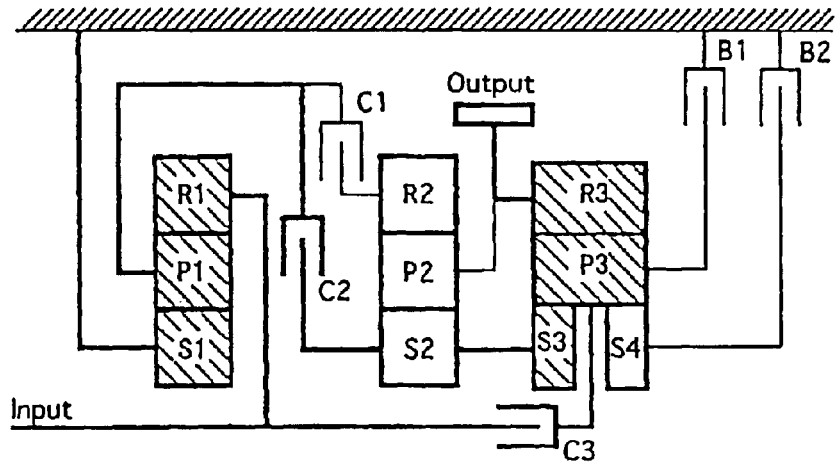
FIG. 5c 6th
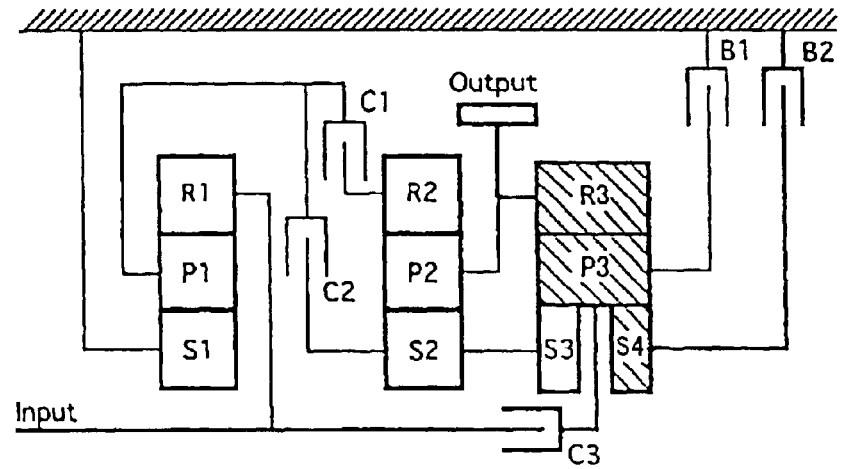

FIG.11

| | | 6TH SPEED | | | | | |
|---|---|---|---|---|---|---|---|
| | | RATIO COVERAGE : 1 | | | RATIO COVERAGE : 2 | | |
| | | RAVIG-NEAUX TYPE | ISHIMARU TYPE | | RAVIG-NEAUX TYPE | ISHIMARU TYPE | |
| | | | SPEED-REDUCING DOUBLE PINION | SPEED-REDUCING SINGLE PINION | | SPEED-REDUCING DOUBLE PINION | SPEED-REDUCING SINGLE PINION |
| PLANETARY GEAR RATIO | α1 | 0.575 | 0.350 | 0.550 | 0.650 | 0.425 | 0.625 |
| | α2 | 0.375 | 0.350 | 0.500 | 0.475 | 0.350 | 0.550 |
| | α3 | 0.350 | 0.500 | 0.375 | 0.350 | 0.500 | 0.350 |
| GEAR RATIO | 1st | 4.500 | 4.505 | 4.392 | 4.714 | 5.093 | 5.072 |
| | 2nd | 2.373 | 2.308 | 2.325 | 2.637 | 2.609 | 2.519 |
| | 3rd | 1.575 | 1.538 | 1.550 | 1.650 | 1.739 | 1.625 |
| | 4th | 1.146 | 1.136 | 1.148 | 1.160 | 1.170 | 1.141 |
| | 5th | 0.880 | 0.891 | 0.883 | 0.842 | 0.872 | 0.881 |
| | 6th | 0.727 | 0.741 | 0.727 | 0.678 | 0.741 | 0.741 |
| | Rev | 4.200 | 4.395 | 4.133 | 3.474 | 4.969 | 4.634 |
| STEP RATIO | 1st/2nd | 1.896 | 1.952 | 1.889 | 1.788 | 1.952 | 2.013 |
| | 2nd/3rd | 1.507 | 1.501 | 1.500 | 1.598 | 1.500 | 1.550 |
| | 3rd/4th | 1.374 | 1.354 | 1.356 | 1.422 | 1.488 | 1.424 |
| | 4th/5th | 1.302 | 1.275 | 1.294 | 1.378 | 1.342 | 1.295 |
| | 5th/6th | 1.210 | 1.202 | 1.215 | 1.242 | 1.177 | 1.189 |
| FORWARD/ REVERSE RATIO | Rev/1st | 0.933 | 0.976 | 0.941 | 0.737 | 0.976 | 0.914 |
| TRANSMISSION EFFICIENCY | 1st | 0.968 | 0.969 | 0.974 | 0.968 | 0.989 | 0.974 |
| | 2nd | 0.950 | 0.968 | 0.972 | 0.952 | 0.968 | 0.972 |
| | 3rd | 0.993 | 0.988 | 0.993 | 0.993 | 0.988 | 0.993 |
| | 4th | 0.982 | 0.987 | 0.989 | 0.983 | 0.988 | 0.989 |
| | 5th | 0.989 | 0.988 | 0.989 | 0.989 | 0.989 | 0.990 |
| | 6th | 0.993 | 0.993 | 0.993 | 0.993 | 0.993 | 0.993 |
| | 7th | | | | | | |
| | Rev | 0.978 | 0.973 | 0.978 | 0.978 | 0.973 | 0.978 |
| TORQUE SHARED OF ENGAGEMENT ELEMENTS | C1 | 1.575 | 1.203 | 1.550 | 1.650 | 1.175 | 1.625 |
| | C2 | 1.575 | 1.538 | 1.550 | 1.650 | 1.739 | 1.625 |
| | C3 | 1.209 | 1.538 | 1.214 | 1.243 | 1.739 | 1.190 |
| | B1 | 5.775 | 0.769 | 5.683 | 5.124 | 0.909 | 6.268 |
| | B2 | 0.798 | 5.934 | 0.775 | 0.987 | 6.708 | 0.894 |
| | TOTAL | 10.932 | 10.982 | 10.772 | 10.654 | 12.270 | 11.602 |
| NUMBER OF ENGAGEMENT ELEMENTS INCREASED WITH OWC IN OPERATION | OWC1 | 0 | 0 | 0 | 0 | 0 | 0 |
| | OWC2 | 1 | 1 | 1 | 1 | 1 | 1 |
| | OWC3 | 2 | 2 | 2 | 2 | 2 | 2 |
| RATIO COVERAGE | MIN. | 4.81 | 5.08 | 4.81 | 4.81 | 5.08 | 4.81 |
| | MAX. | 7.20 | 9.02 | 7.80 | 7.20 | 9.02 | 7.80 |
| DIRECT-ENGAGEMENT MODE | | NO | NO | NO | NO | NO | NO |
| TO 7TH SPEED | | OK | OK | OK | OK | OK | OK |

FIG. 13
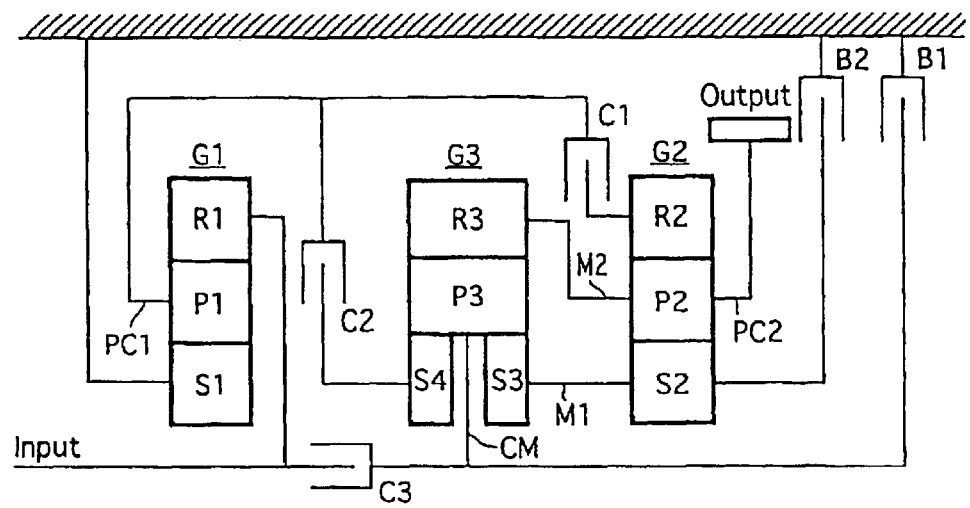
FIG. 14a 1st
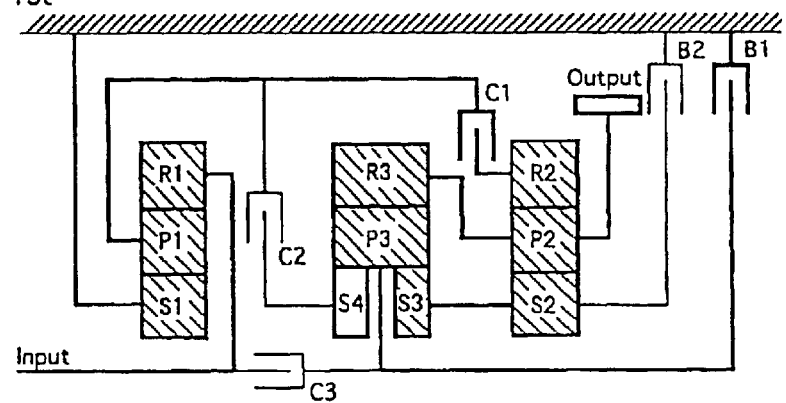
FIG. 14b 2nd
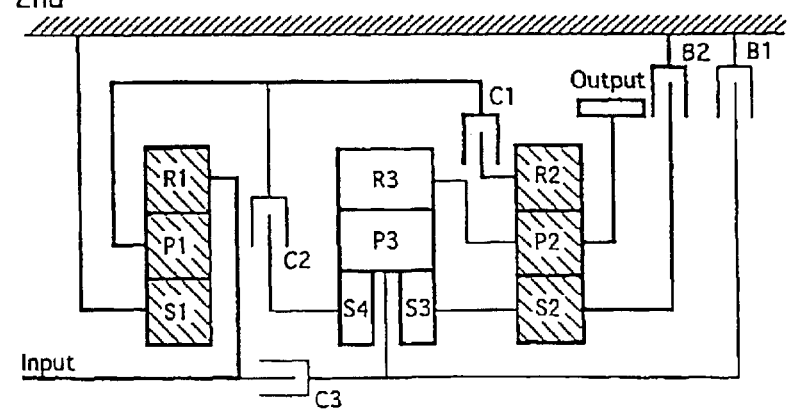

FIG. 15a 3rd
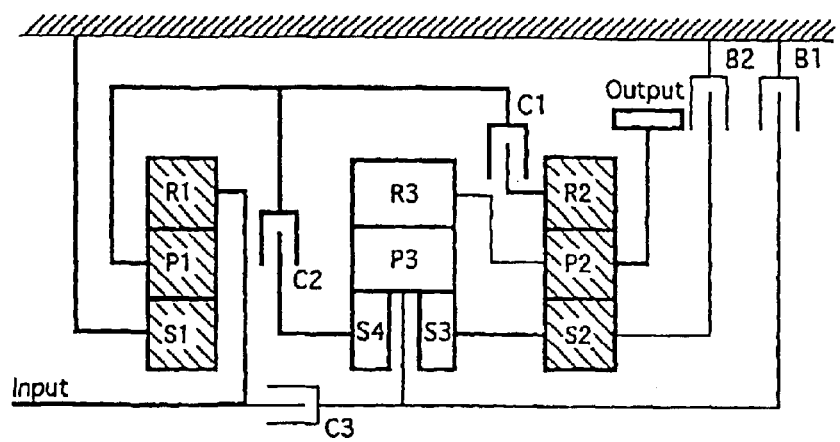
FIG. 15b 4th
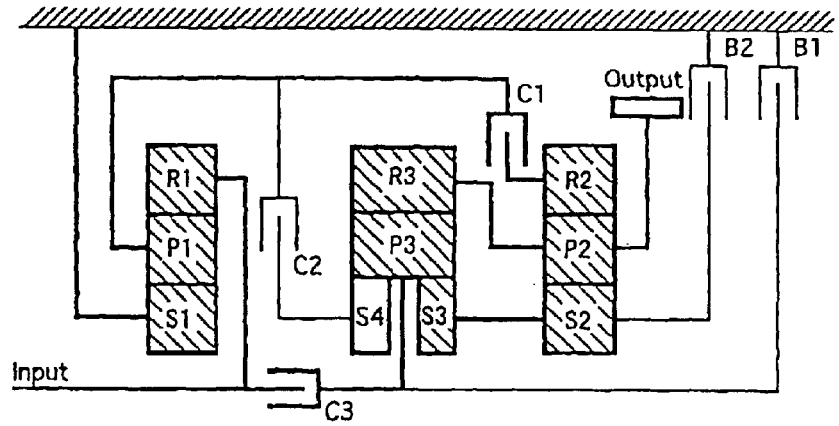
FIG. 15c 5th
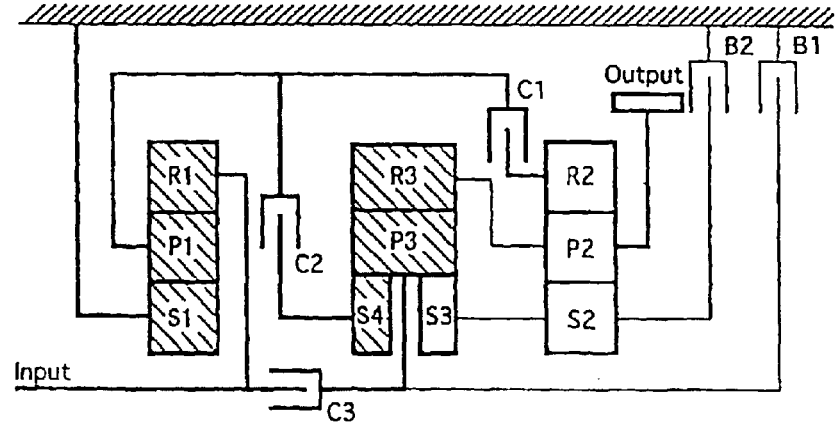

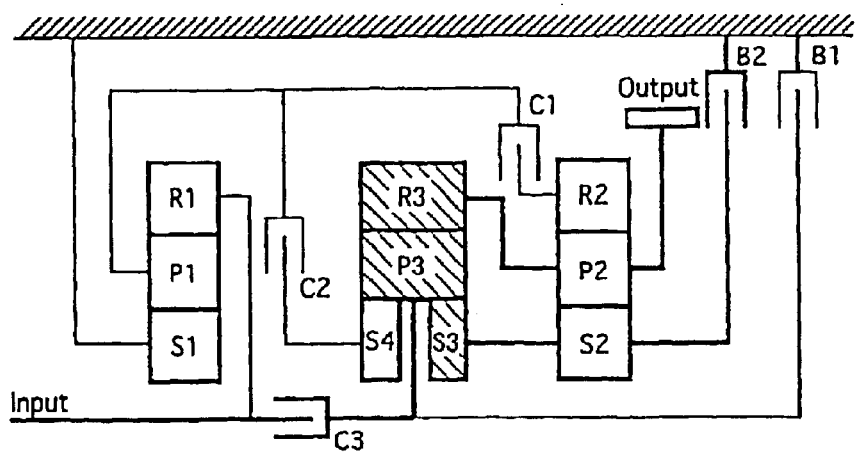
FIG. 16a 6th
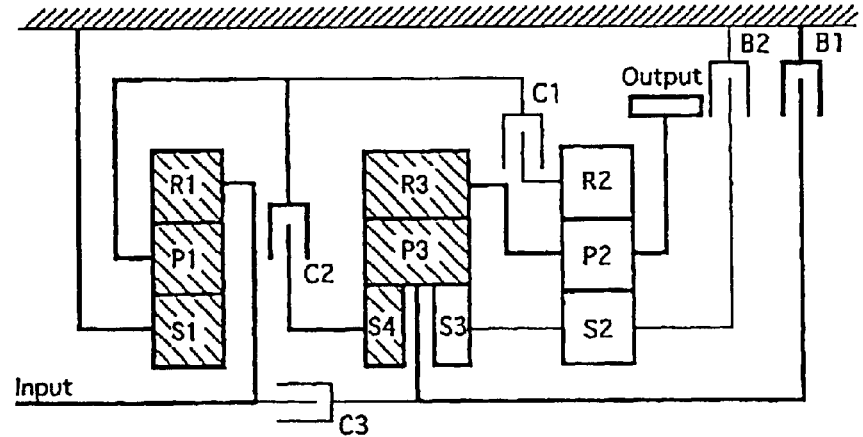
FIG. 16b Rev

FIG. 19a 1st
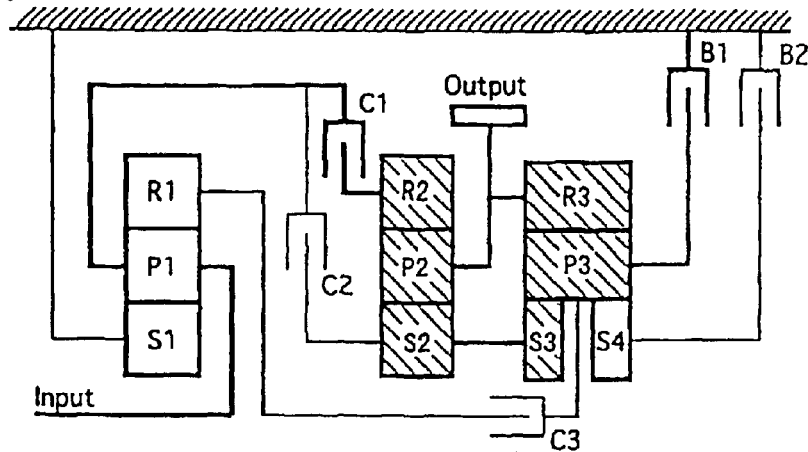
FIG. 19b 2nd
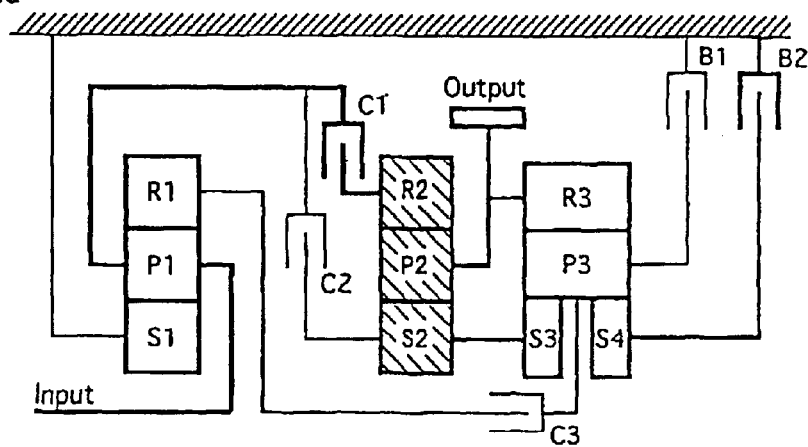
FIG. 19c 3rd
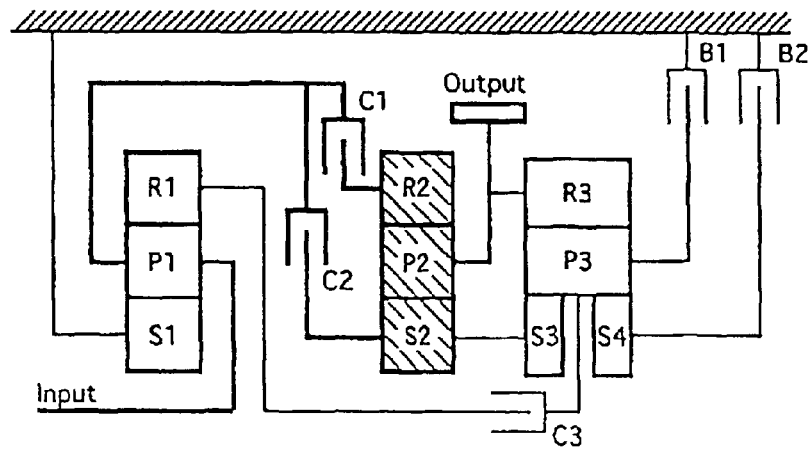

FIG. 20a 4th
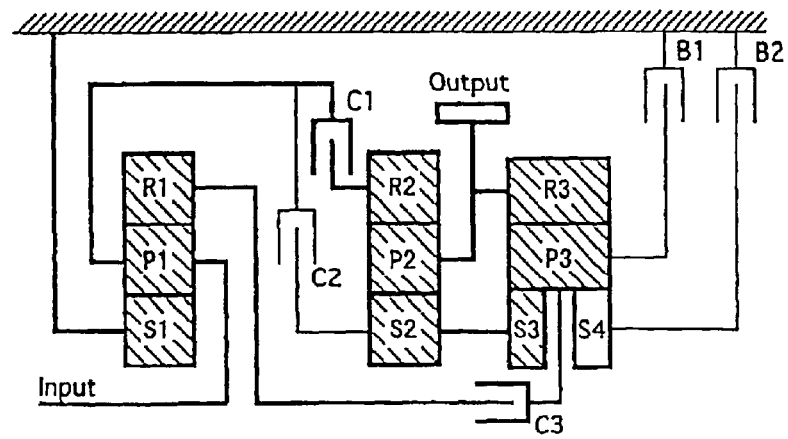
FIG. 20b 5th
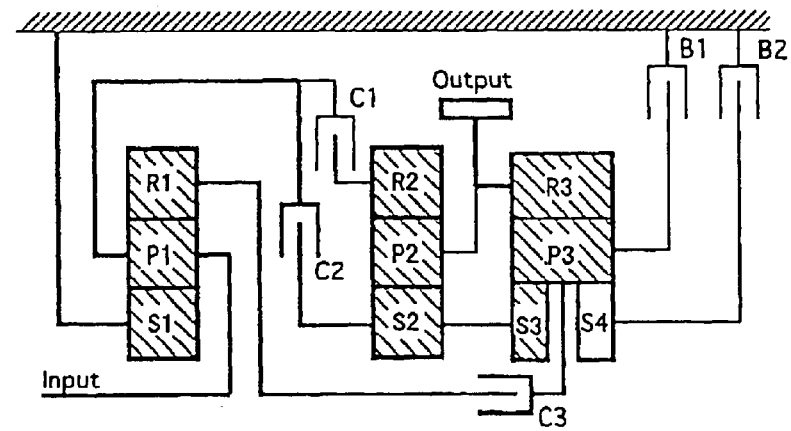
FIG. 20c 6th
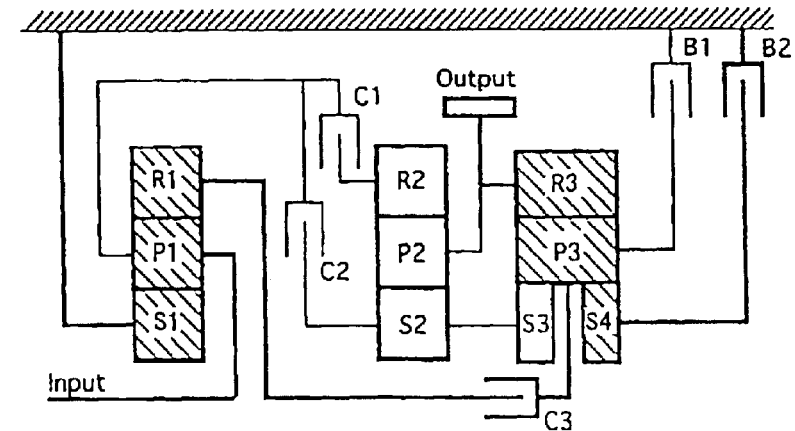

FIG. 22
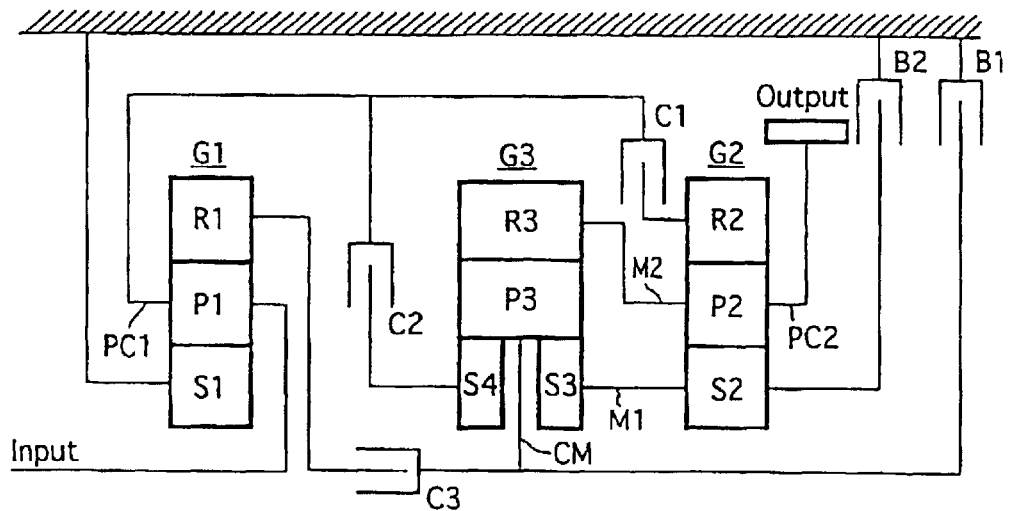
FIG. 23a 1st
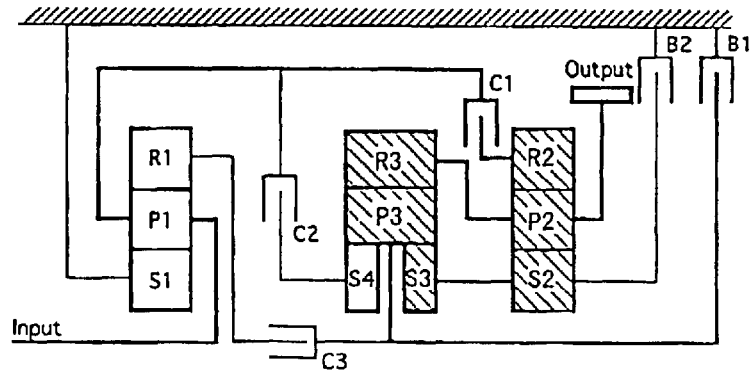
FIG. 23b 2nd
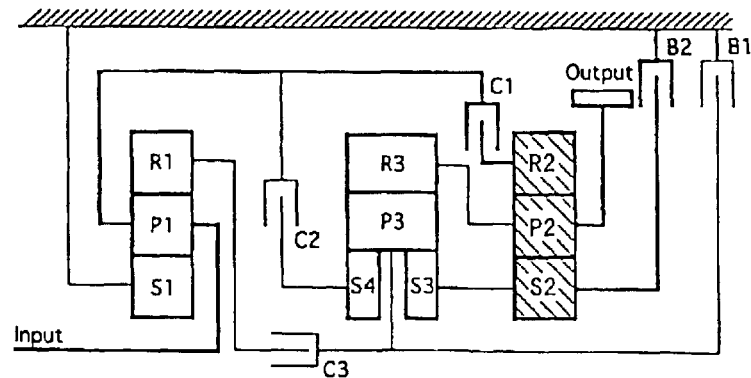

FIG. 24a 3rd
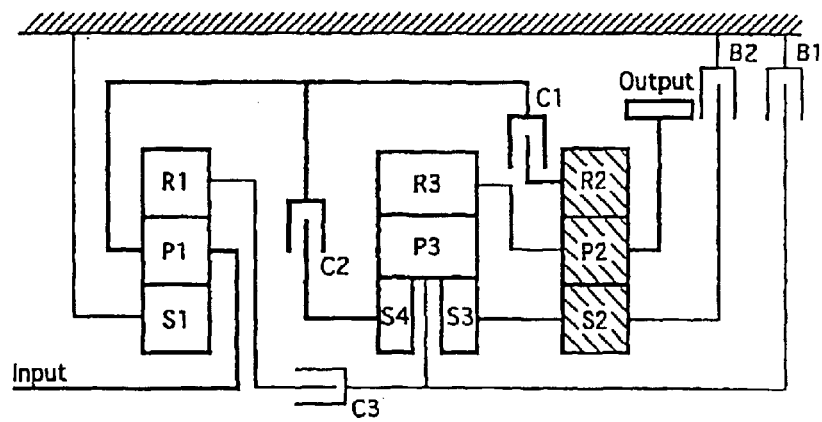
FIG. 24b 4th
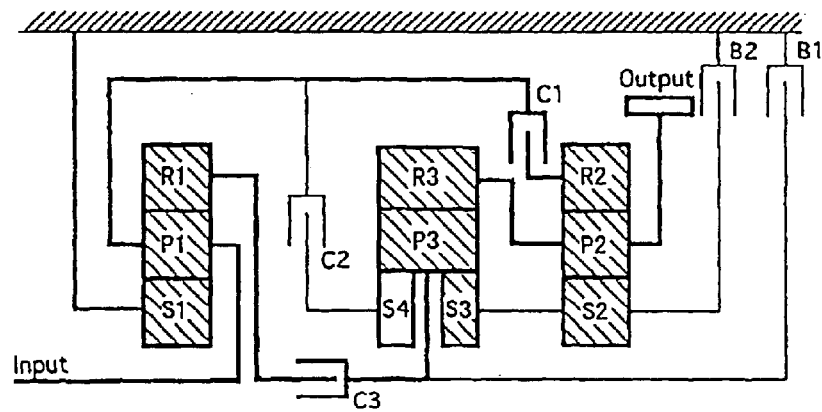
FIG. 24c 5th
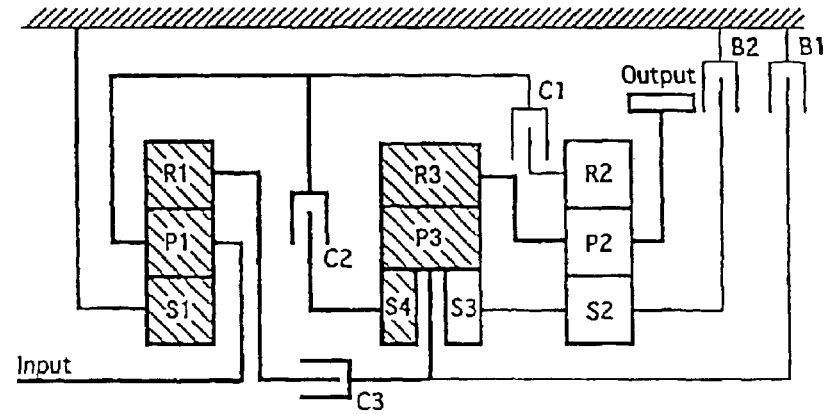

FIG. 25a 6th
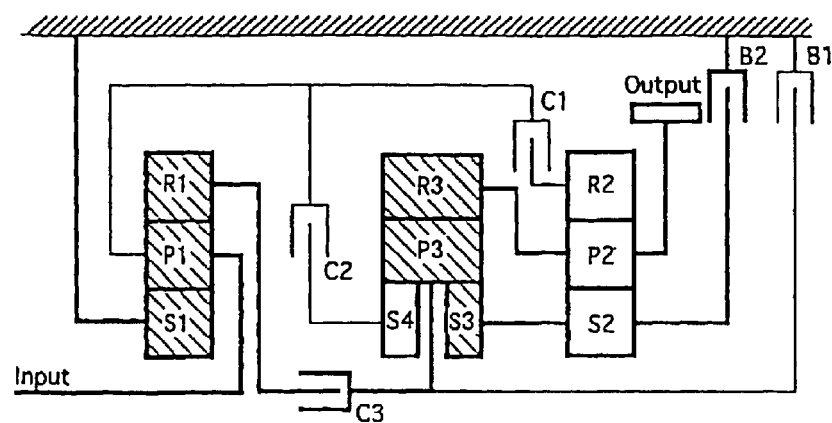
FIG. 25b Rev
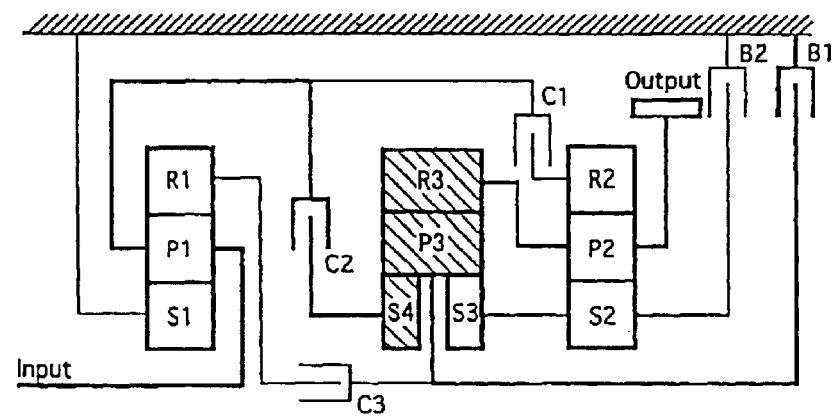

FIG. 28a 1st
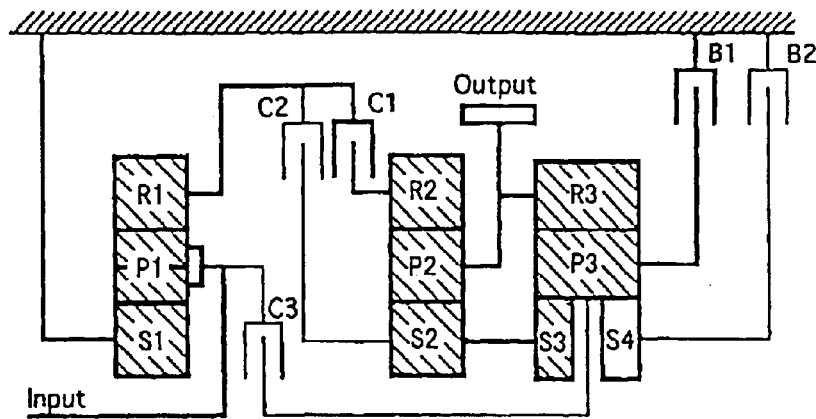
FIG. 28b 2nd
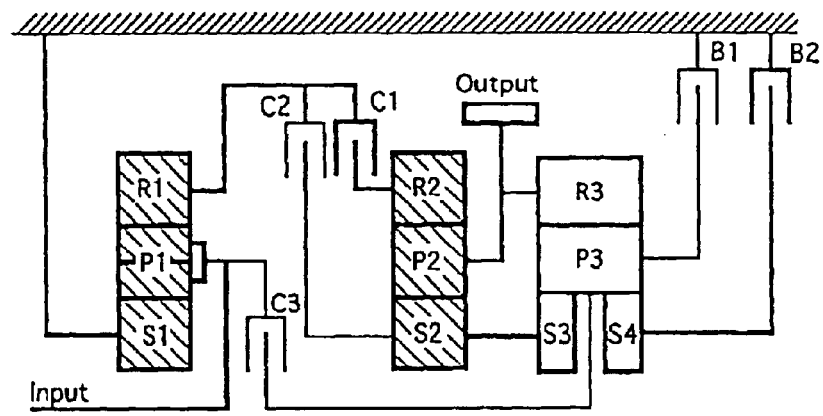
FIG. 28c 3rd
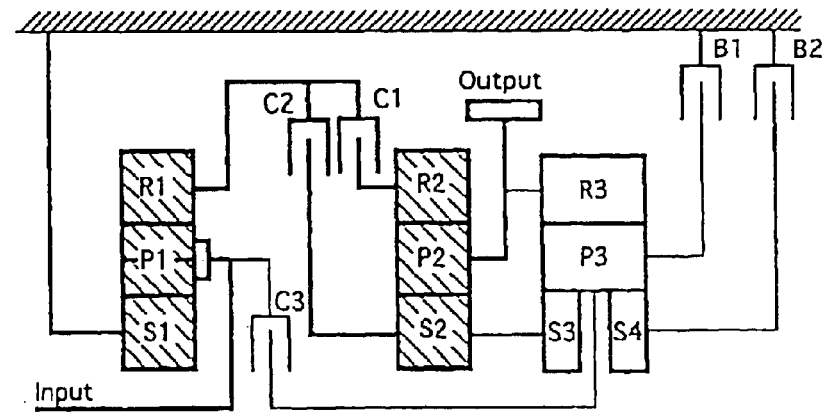

FIG. 29a 4th
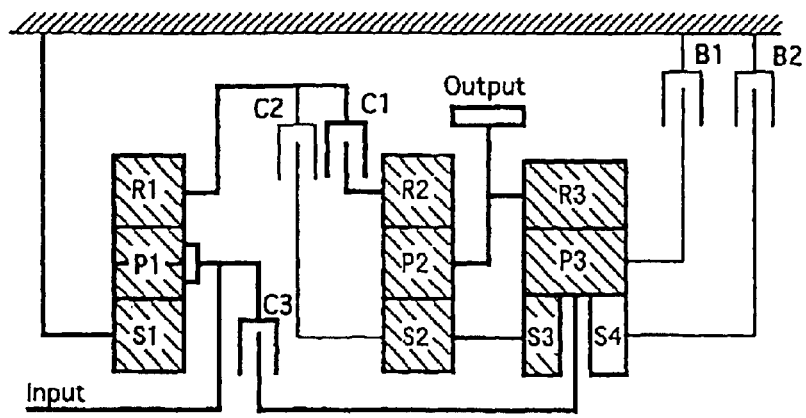
FIG. 29b 5th
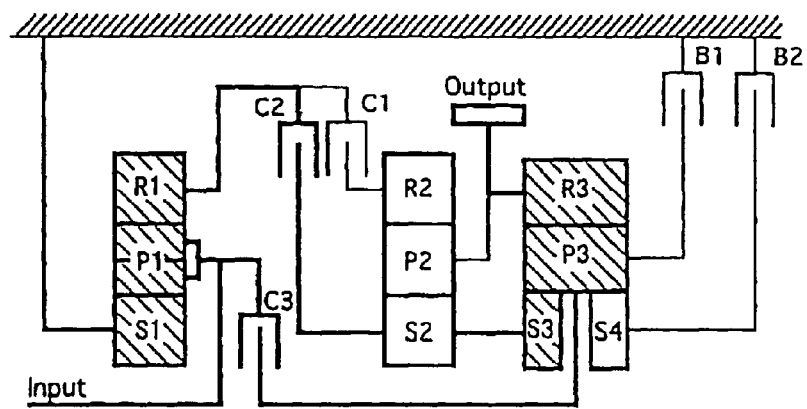
FIG. 29c 6th
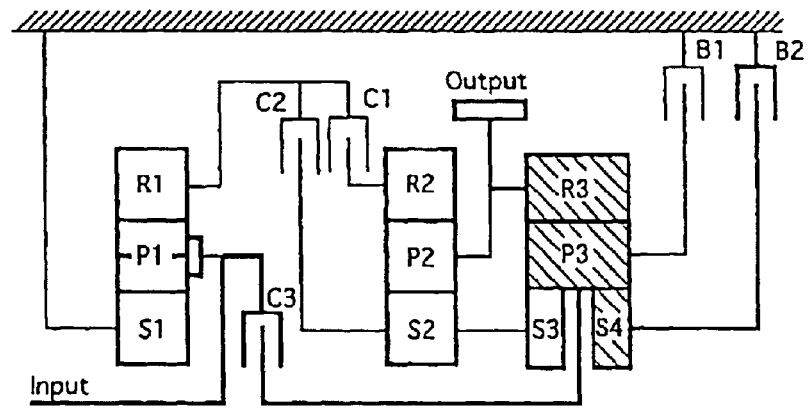

FIG. 31
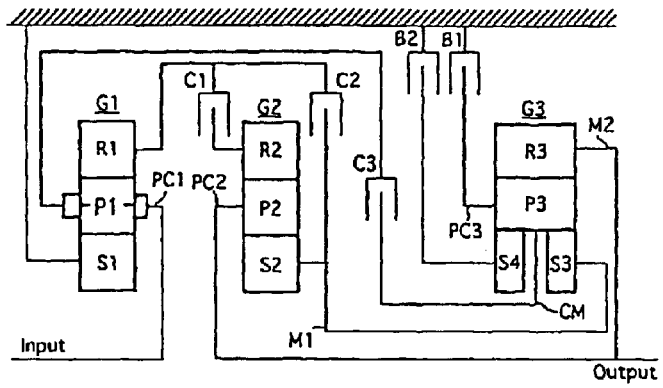
FIG. 32a 1st
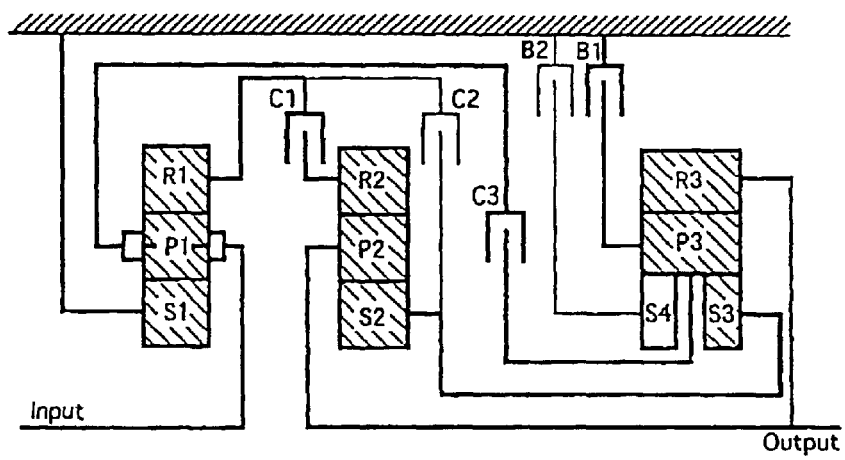
FIG. 32b 2nd
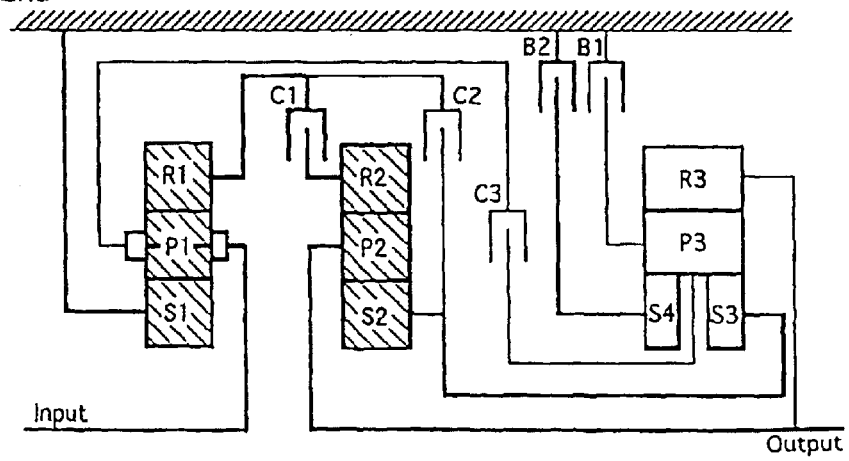

FIG. 33a 3rd
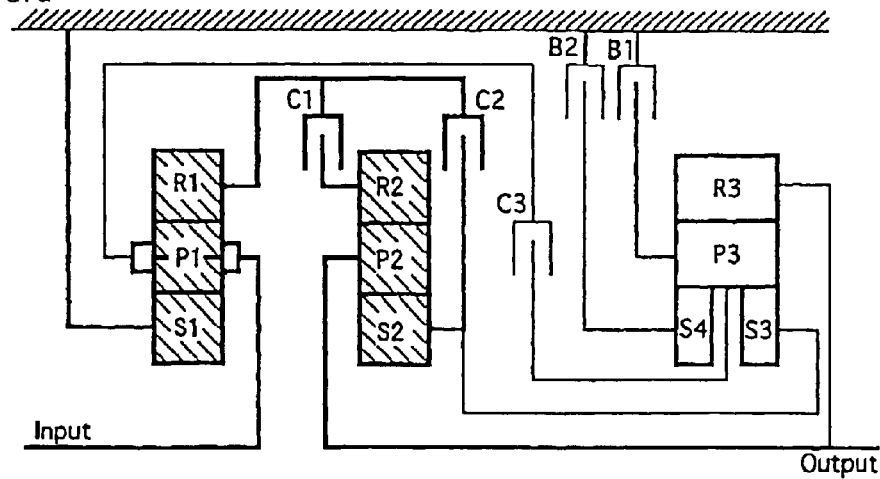
FIG. 33b 4th
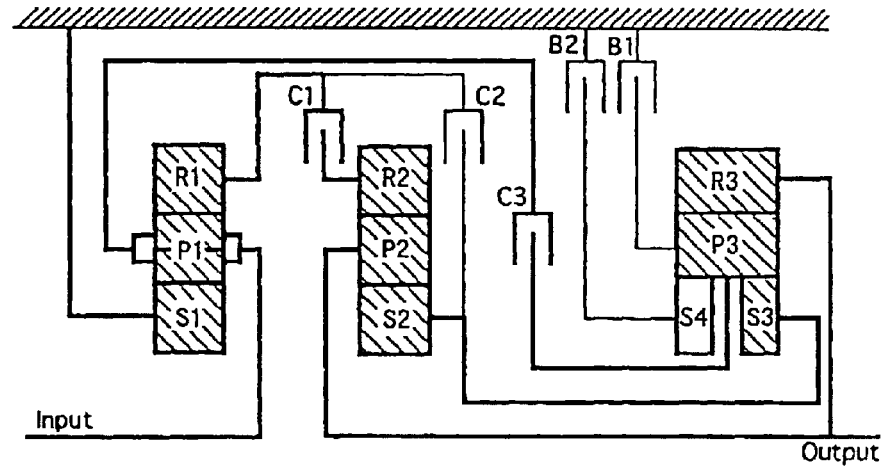
FIG. 33c 5th
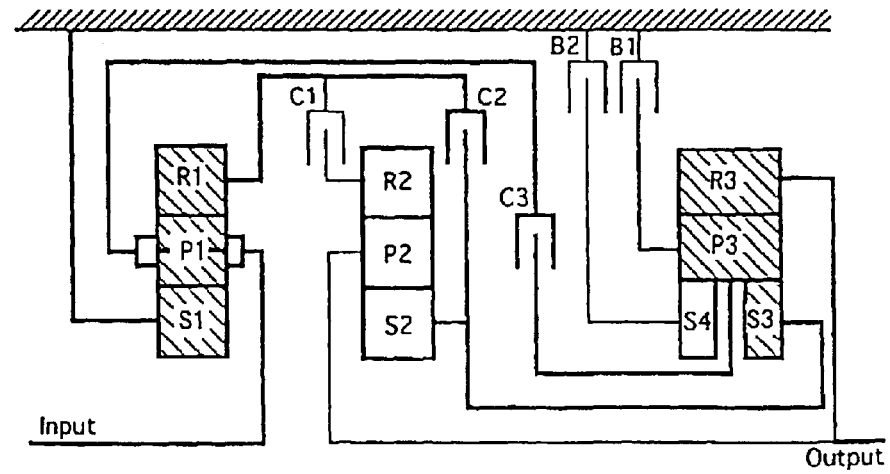

FIG. 34a 6th
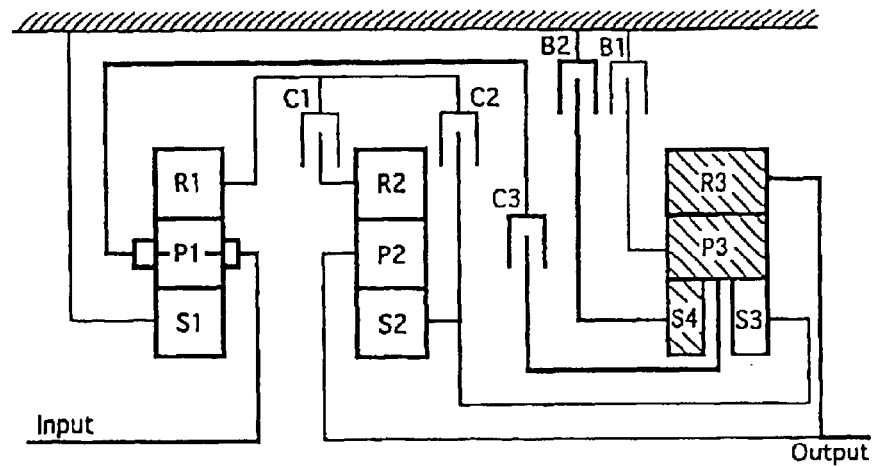
FIG. 34b Rev
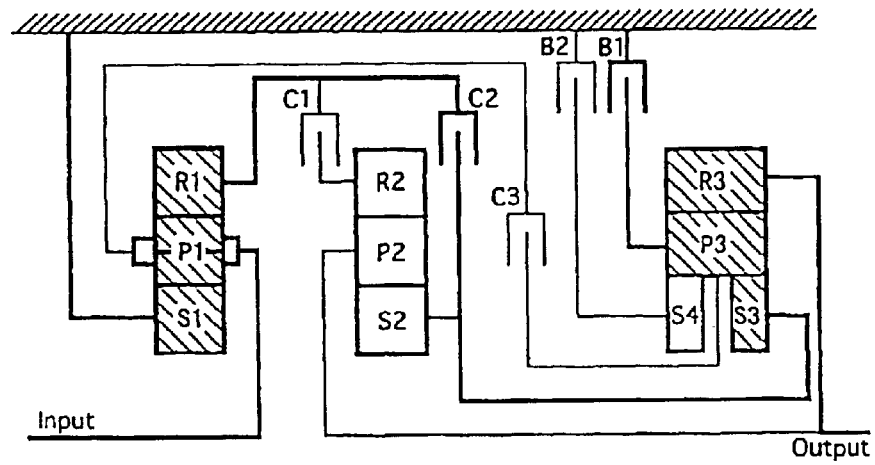

FIG. 35
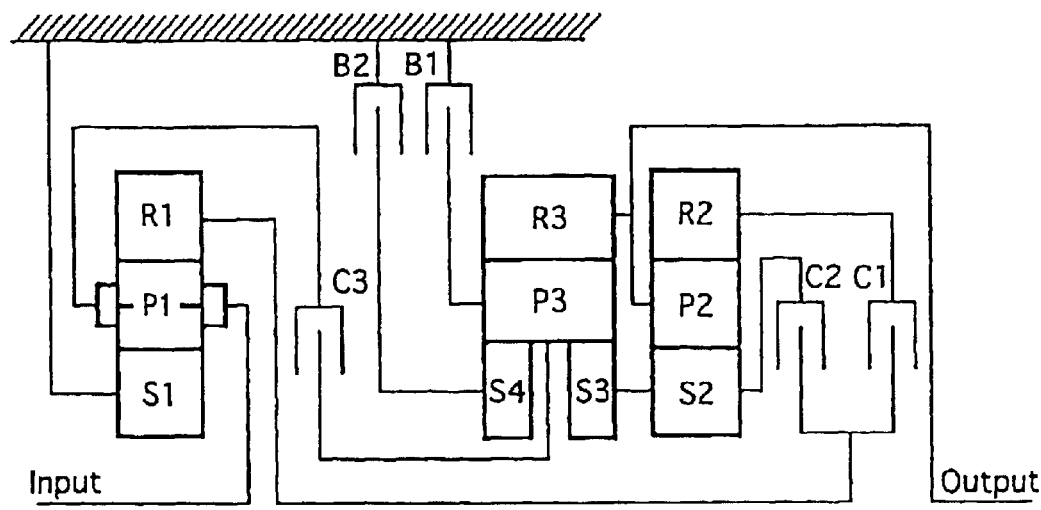
FIG. 36a 1st
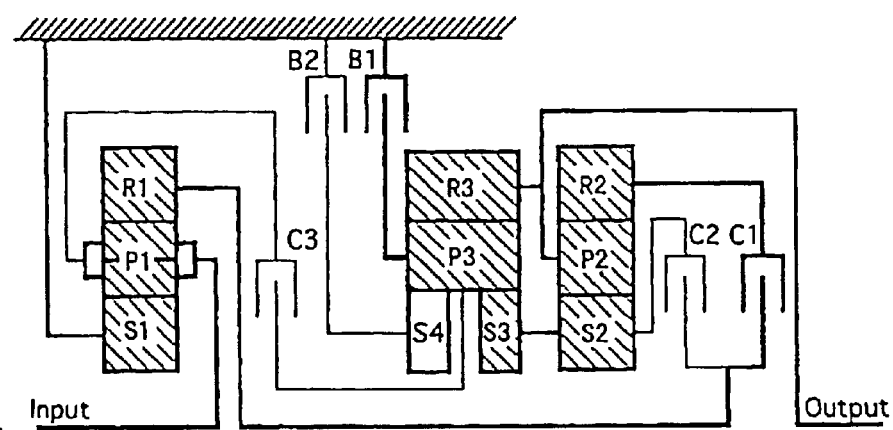
FIG. 36b 2nd
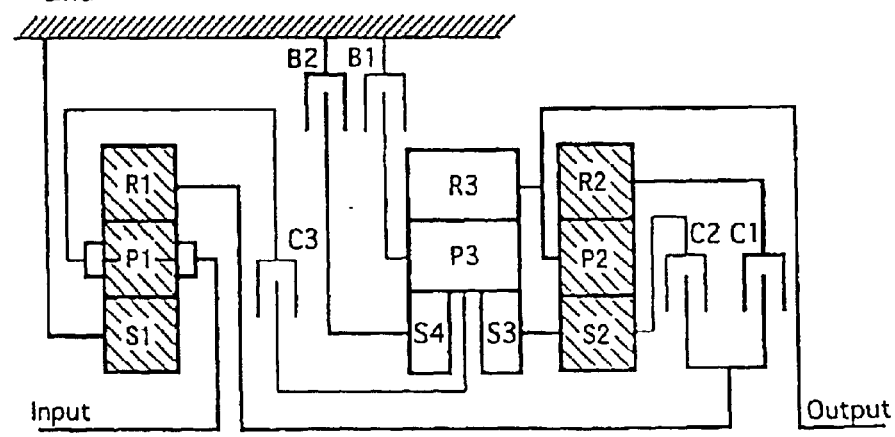

FIG. 37a 3rd
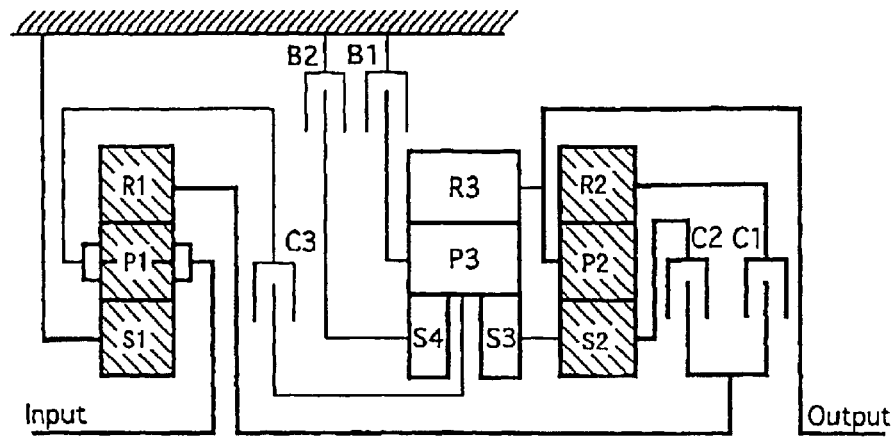
FIG. 37b 4th
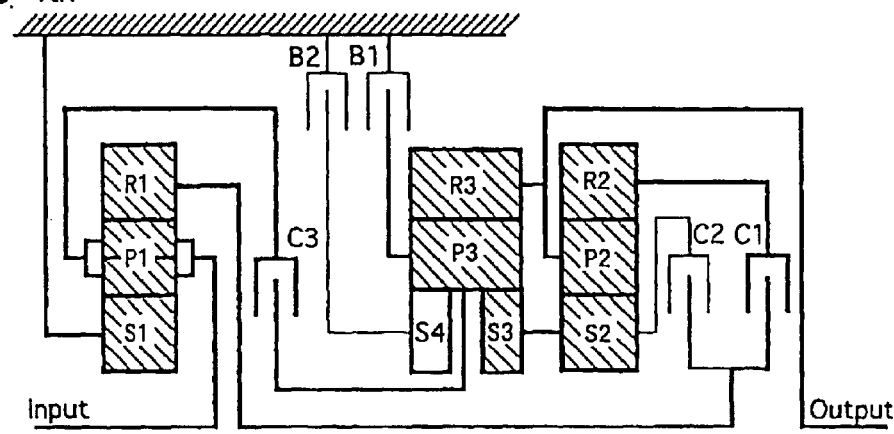
FIG. 37c 5th
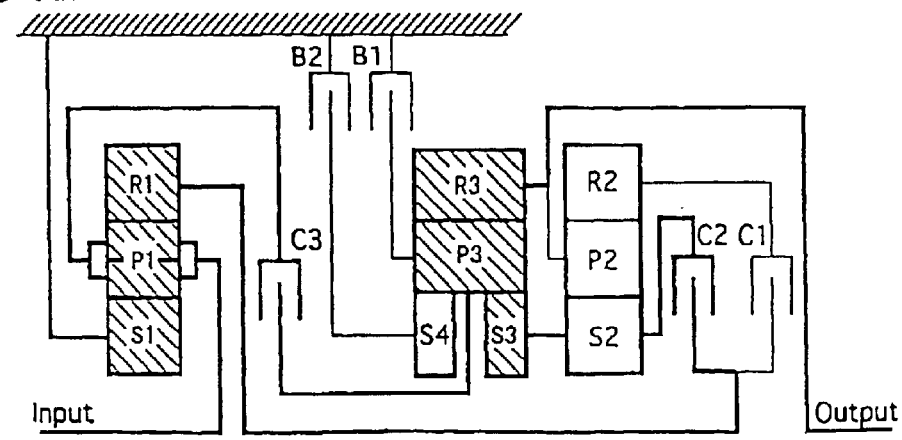

FIG. 38a 6th
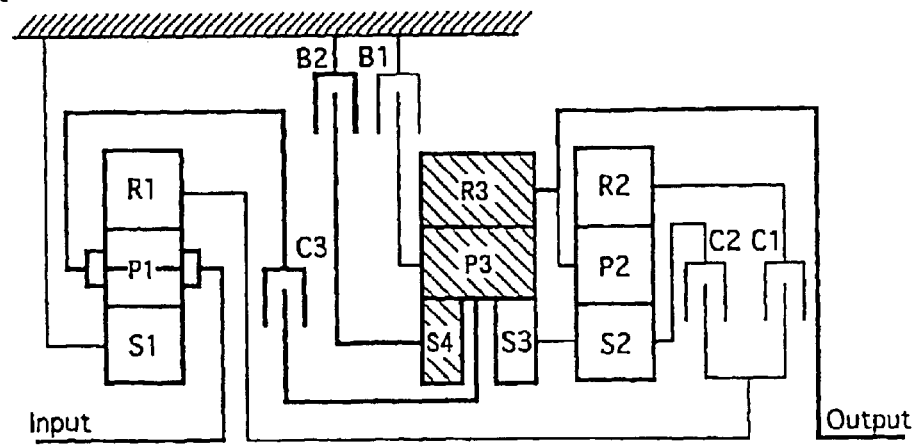
FIG. 38b Rev
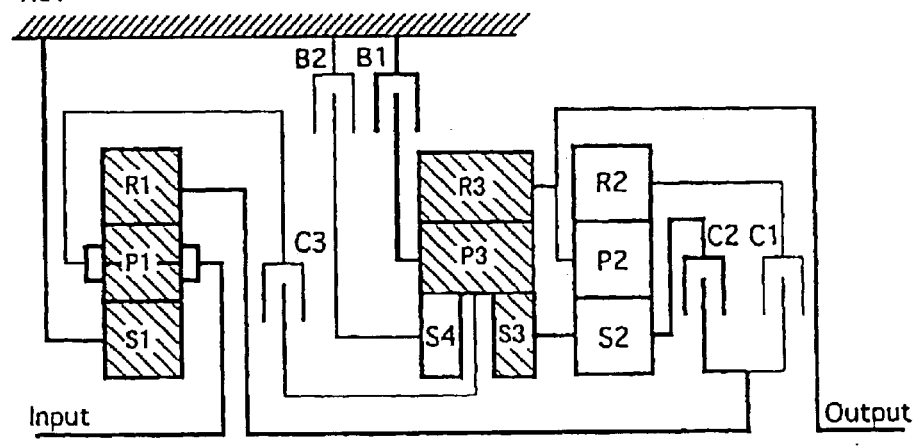

FIG. 39
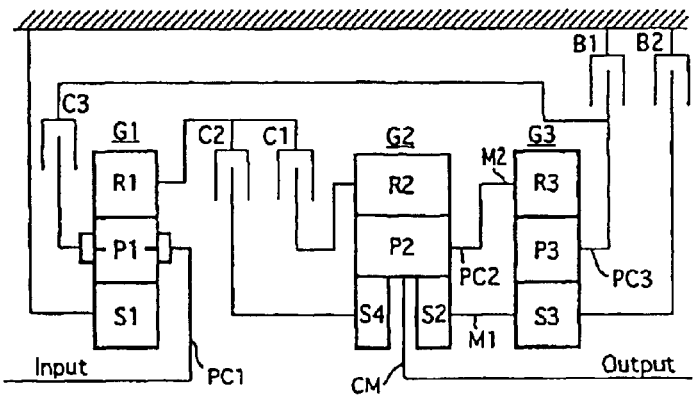
FIG. 40a 1st
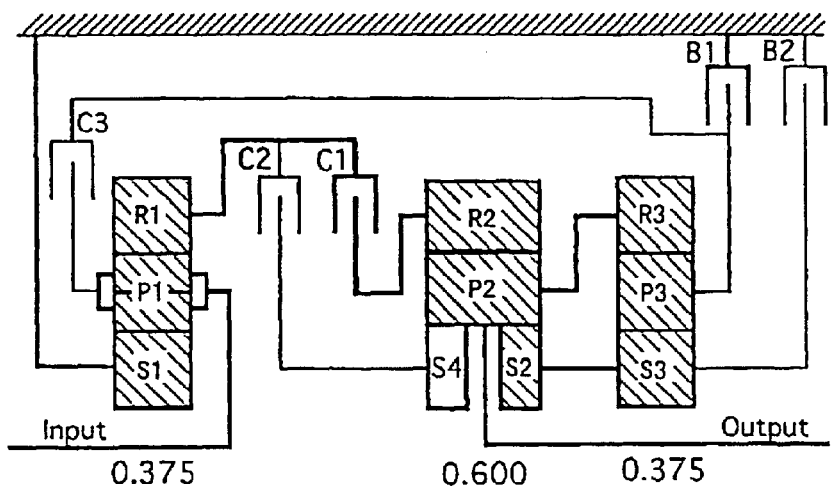
FIG. 40b 2nd
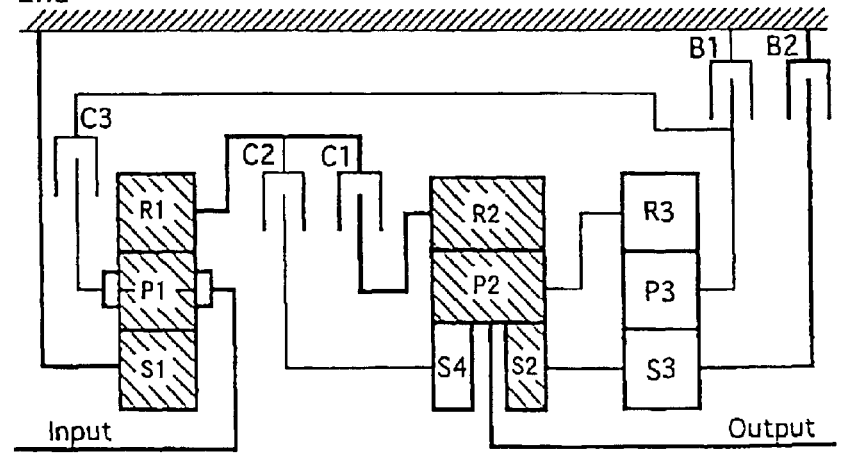

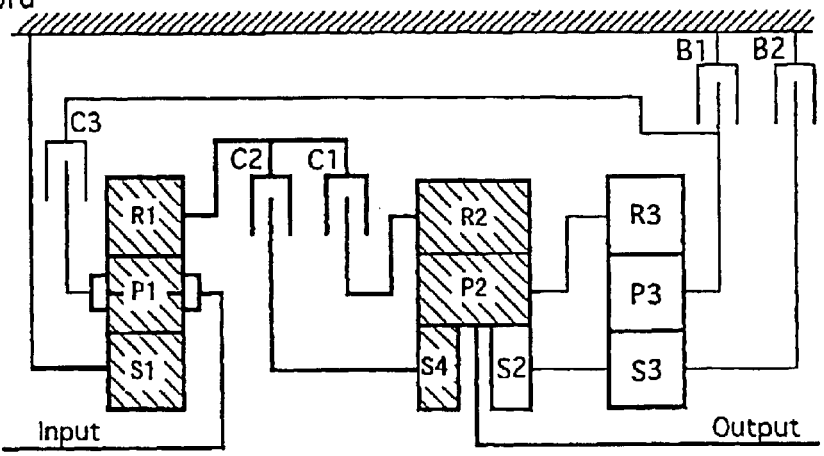
FIG. 41a 3rd
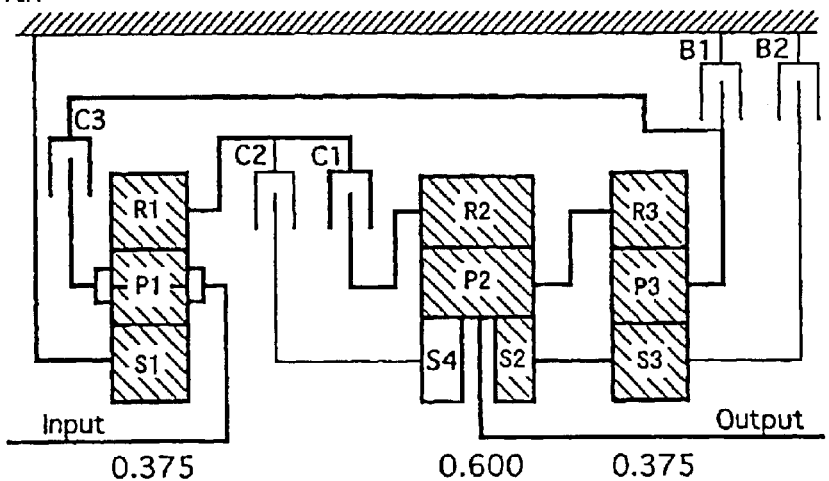
FIG. 41b 4th
0.375   0.600   0.375
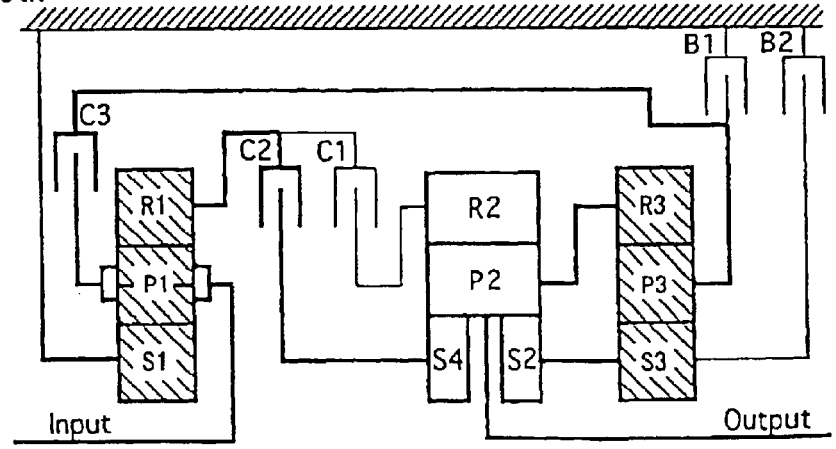
FIG. 41c 5th FIG. 42a 6th
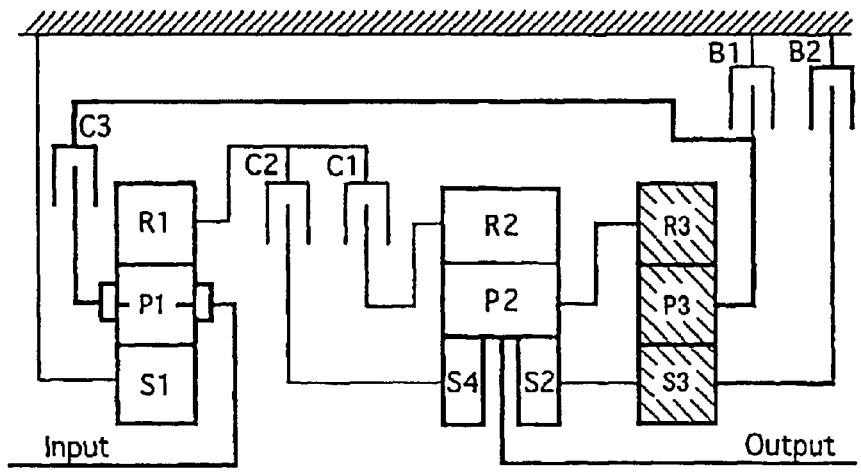
FIG. 42b Rev
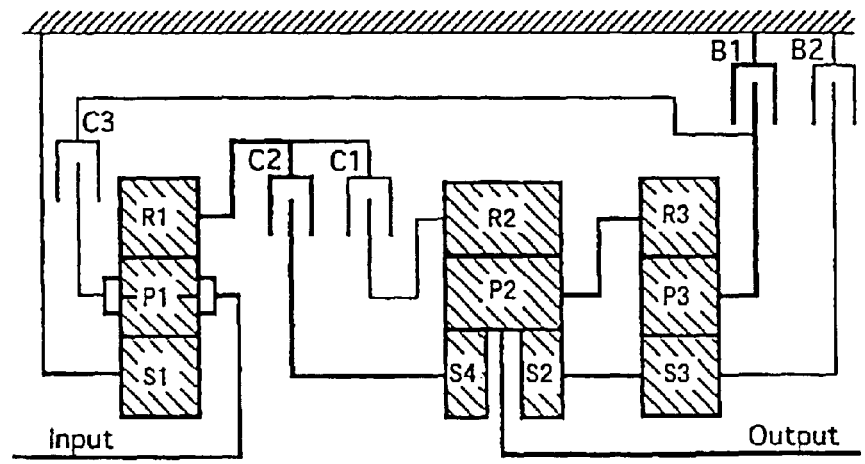

FIG. 45a 1st
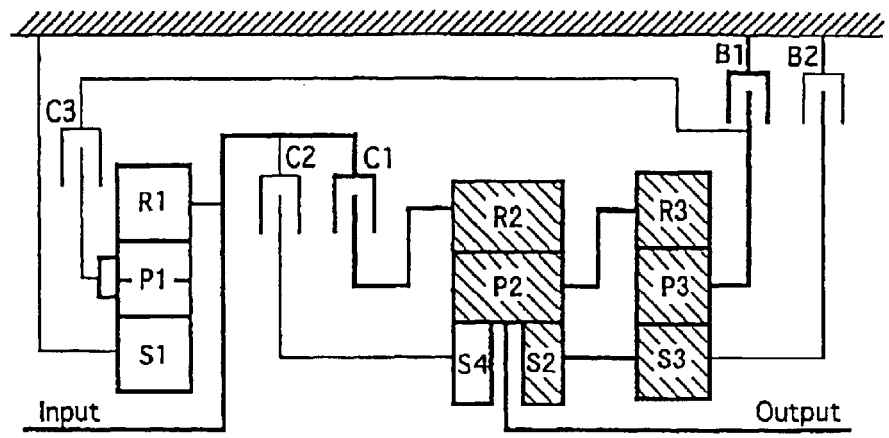
FIG. 45b 2nd
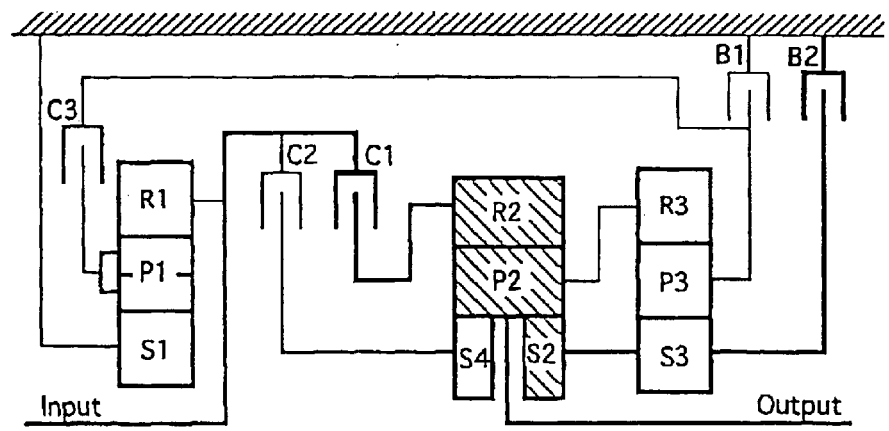
FIG. 45c 3rd
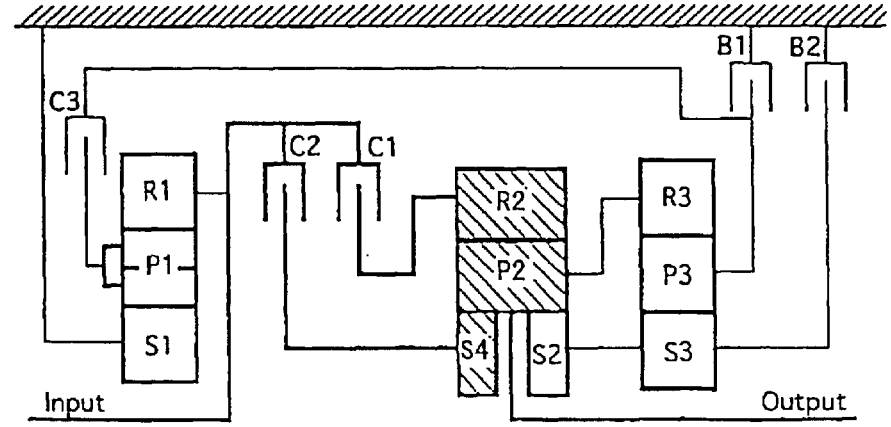

FIG. 46a 4th
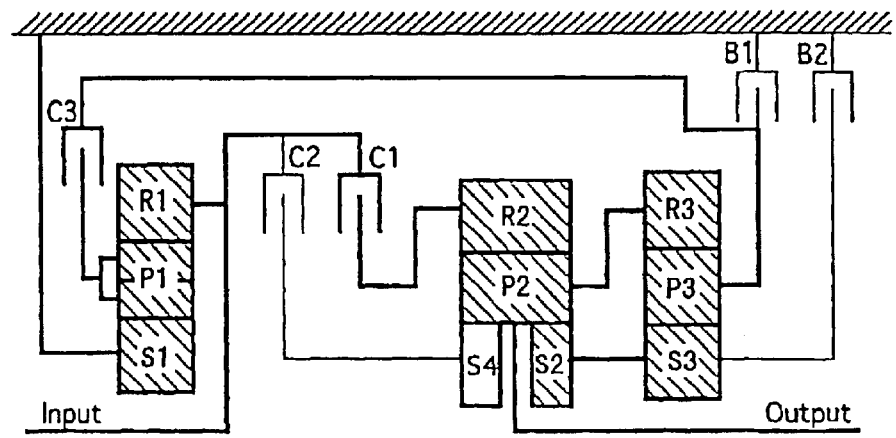
FIG. 46b 5th
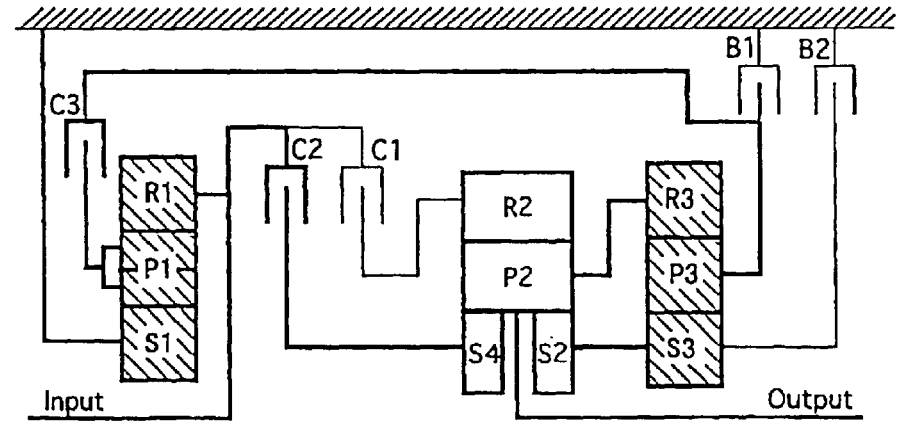
FIG. 46c 6th
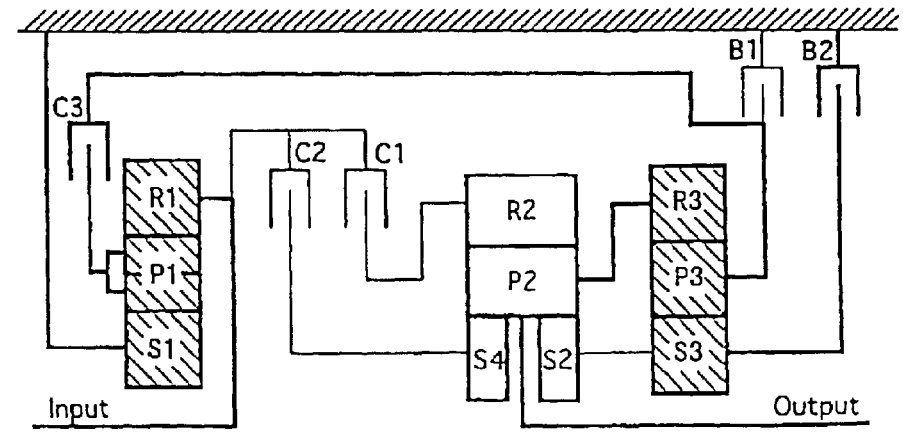

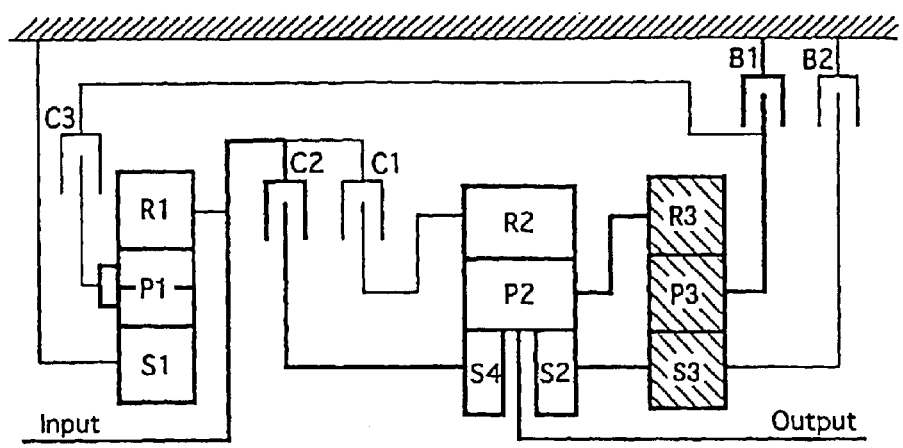
FIG. 47 Rev

GEAR SHIFTER FOR AUTOMATIC TRANSMISSION

TECHNICAL FIELD

This invention relates to a gear shift control apparatus for an automatic transmission, which is constructed to include an input portion, three sets of planetary gears, three clutches, two brakes and an output portion and which can achieve at least six forward speeds and one reverse speed by properly engaging/releasing the three clutches and the two brakes that function as gear shift control elements.

BACKGROUND TECHNIQUE

A gear shift control apparatus for an automatic transmission, which is constructed to include an input shaft, one set of single-pinion type planetary gear, a Simpson type planetary gear train having two sets of single-pinion type planetary gearsets, three clutches, two brakes and an output shaft and which is enabled to achieve six forward speeds and one reverse speed by properly engaging/releasing the three clutches and the two brakes properly that function as gear shift control elements, has been proposed in the prior art in FIG. 2 of JP-A-4-219553.

This gear shift control apparatus constructed of one single-pinion type planetary gear and a Simpson type planetary gear train has the features, as enumerated in the following.

(1) An advantage is taken at the strength because the flow of the torque transmission at the 1st speed for the highest torque of the Simpson type planetary gear train is borne through all members.

(2) An advantage is taken at the gear strength, the gear lifetime, the carrier rigidity and so on, because the Simpson type planetary gear train employs the ring gear input so that the tangential force is reduced to about one half of that of the sun gear input.

(3) For the gear range of an overdrive, there is needed a carrier input to the Simpson type planetary gear train. If the input shaft and the output shaft are coaxially arranged, the input route to the carrier is not satisfied by the single-pinion type planetary gear in which the number of rotary members is limited to three. In order to secure the input route to the carrier, therefore, the input shaft and the output shaft have to be positioned in parallel on the different axis thereby to enlarge the size of the automatic transmission.

In order to solve the aforementioned problem (3), therefore, a gear shift control apparatus using a Ravigneaux type composite planetary gear train (i.e., the composite planetary gear train having sun gears meshing individually with double pinions) in place of the Simpson type planetary gear train has been proposed in FIG. 13, FIG. 14 and FIG. 15 of JP-A-4-219553.

However, the gear shift control apparatus adopting that Ravigneaux type composite planetary gear train has the problems, as enumerated in the following.

(5) The strength is at a disadvantage because the maximum torque (for a 1st speed) of the gear train is borne by the double-pinion type planetary gear on one side of the Ravigneaux type composite planetary gear train.

(6) Another disadvantage resides in the gear strength, the gear lifetime or the carrier rigidity, because the torque augmented by one single-pinion type planetary gear acting as a speed-reducing device is inputted from the sun gear of the Ravigneaux type composite planetary gear train so that the tangential force becomes higher than that of the ring gear input.

(7) The Ravigneaux type composite planetary gear train has to be enlarged to enlarge the automatic transmission, because there are demanded both the securement of the strength (e.g., the gear strength or the gear lifetime) at the 1st speed and the improvement in the carrier rigidity of the Ravigneaux type composite planetary gear train.

(8) Depending upon the gear range, a torque circulation occurs in the Ravigneaux type composite planetary gear train so that the transmission efficiency drops to deteriorate the fuel economy at the gear range where the torque circulation occurs.

In short, the gear shift control apparatus, in which one set of single-pinion type planetary gear and the Ravigneaux type composite planetary gear train, cannot be avoided in the size enlargement of the automatic transmission, because both the aforementioned advantages (1) and (2) of the gear shift control apparatus using one single-pinion type planetary gear and the Simpson type planetary gear train are offset and because the Ravigneaux type composite planetary gear train is enlarged for the aforementioned reason (3).

The present invention has been conceived noting the above-specified problems and has an object to provide a gear shift control apparatus for an automatic transmission, which can make the degree of freedom for selecting a gear ratio higher than that of the case using the Ravigneaux type composite planetary gear train, while achieving a strength advantage (e.g., the gear strength or the gear lifetime) of the gear train, an improvement in the fuel economy, the coaxial positioning of the input portion and the output portion and the size reduction of the automatic transmission altogether.

DISCLOSURE OF THE INVENTION

According to the present invention, more specifically, in a gear shift control apparatus for an automatic transmission, which has gear shift control means using not the Ravigneaux type composite planetary gear train but basically a gear train having two sets of combined single-pinion type planetary gears as a gear train to be combined with one set of planetary gear, thereby to establish at least six forward speeds and one reverse speed by engaging/releasing three clutches and two brakes properly, one of the aforementioned three planetary gearsets is a speed-reducing device for reducing the speed of the input rotation always or a speed-increasing device for increasing the speed of the input rotation always, and one of the remaining two planetary gearsets is a double sun gear type planetary gearset including: two sun gears; a pinion meshing with each of the two sun gears; a carrier having a center member positioned between the aforementioned two sun gears for inputting or outputting a rotation; and one ring gear meshing with the aforementioned pinion.

This double sun gear type planetary gear is similar in the basic gear performance to a single-pinion type planetary gear, but is characterized in that the member number is so larger than that of the single-pinion type planetary gear having three members as (two members from the sun gear)+(one member from the ring gear)+(two axial and radial members from the carrier)=five members.

The gear train having a single-pinion type planetary gear and a double sun gear type planetary gear combined therein will be named the "Ishimaru type planetary gear train" by quoting the name of the inventor so that it may be discriminated from the "Ravigneaux type composite planetary gear train" or the "Simpson type planetary gear train".

Thus, the construction is made by combining one set of planetary gear and the Ishimaru type planetary gear train having a fundamental performance similar to that of the Simpson type planetary gear train. It is, therefore, possible to achieve both the strength advantage of the planetary gear because of the possibility of the ring gear input and the advantage of the gear strength or the gear lifetime of the planetary gear because the torque flow at the 1st speed can be borne through all members.

The construction is also made such that the Ishimaru type planetary gear train is used as the remaining two planetary gearsets but not the Ravigneaux type composite planetary gear train. Therefore, the improvement in the fuel economy can be achieved by the high transmission efficiency having no torque circulation.

Of the remaining two sets of planetary gears (or Ishimaru type planetary gear train), moreover, one planetary gearset is exemplified by the double sun gear type planetary gear having the center member positioned between the two sun gears. Therefore, an input route to the carrier can be formed to accomplish such coaxial positioning the input shaft and the output shaft as is suited for the automatic transmission of an FR car.

With the construction not using the Ravigneaux type composite planetary gear train but positioning the input portion and the output portion coaxially, moreover, the gear shift control apparatus can be made compact to achieve the size reduction of the automatic transmission.

At the time of setting a gear ratio (=sun gear tooth number/ring gear tooth number), still moreover, considering the conditions of a generally applicable gear ratio range and the smaller ratio between ranges for the higher gear ranges, the Ishimaru type planetary gear train can have a wider applicable gear ratio range and a higher degree of freedom for selecting the gear ratio than those of the Ravigneaux type composite planetary gear train.

BRIEF DESCRIPTION OF THE DRAWINGS

FIGS. 4a–4c present torque flow diagrams of the automatic transmission gear shift control apparatus of the first embodiment at 1st, 2nd and 3rd speeds.

FIGS. 5a–5c present torque flow diagrams of the automatic transmission gear shift control apparatus of the first embodiment at 4th, 5th and 6th speeds.

FIG. 11 is a diagram showing performance comparisons of a gear shift control apparatus using the Ravigneaux type composite planetary gear train and a gear shift control apparatus using the Ishimaru type planetary gear train.

FIG. 13 is a schematic diagram showing a gear shift control apparatus for an automatic transmission of a second embodiment.

FIGS. 14a and 14b present torque flow diagrams of the automatic transmission gear shift control apparatus of the second embodiment at 1st and 2nd speeds.

FIGS. 15a–15c present torque flow diagrams of the automatic transmission gear shift control apparatus of the second embodiment at 3rd, 4th and 5th speeds.

FIGS. 16a and 16b present torque flow diagrams of the automatic transmission gear shift control apparatus of the second embodiment at 6th and reverse speeds.

FIGS. 19a–19c present torque flow diagrams of the automatic transmission gear shift control apparatus of the third embodiment at 1st, 2nd and 3rd speeds.

FIGS. 20a–20c present torque flow diagrams of the automatic transmission gear shift control apparatus of the third embodiment at 4th, 5th and 6th speeds.

FIG. 22 is a schematic diagram showing a gear shift control apparatus for an automatic transmission of a fourth embodiment.

FIGS. 23a and 23b present torque flow diagrams of the automatic transmission gear shift control apparatus of the fourth embodiment at 1st and 2nd speeds.

FIGS. 24a–24c present torque flow diagrams of the automatic transmission gear shift control apparatus of the fourth embodiment at 3rd, 4th and 5th speeds.

FIGS. 25a and 25b present torque flow diagrams of the automatic transmission gear shift control apparatus of the fourth embodiment at 6th and reverse speeds.

FIGS. 28a–28c present torque flow diagrams of the automatic transmission gear shift control apparatus of the 5-1st embodiment at 1st, 2nd and 3rd speeds.

FIGS. 29a–29c present torque flow diagrams of the automatic transmission gear shift control apparatus of the 5-1st embodiment at 4th, 5th and 6th speeds.

FIG. 31 is a schematic diagram showing a gear shift control apparatus for an automatic transmission of a 5-2nd embodiment.

FIGS. 32*a* and 32*b* present torque flow diagrams of the automatic transmission gear shift control apparatus of the 5-2nd embodiment at 1st and 2nd speeds.

FIGS. 33*a*–33*c* present torque flow diagrams of the automatic transmission gear shift control apparatus of the 5-2nd embodiment at 3rd, 4th and 5th speeds.

FIGS. 34*a* and 34*b* present torque flow diagrams of the automatic transmission gear shift control apparatus of the 5-2nd embodiment at 6th and reverse speeds.

FIG. 35 is a schematic diagram showing a gear shift control apparatus for an automatic transmission of a 5-3rd embodiment.

FIGS. 36*a* and 36*b* present torque flow diagrams of the automatic transmission gear shift control apparatus of the 5-3rd embodiment at 1st and 2nd speeds.

FIGS. 37*a*–37*c* present torque flow diagrams of the automatic transmission gear shift control apparatus of the 5-3rd embodiment at 3rd, 4th and 5th speeds.

FIGS. 38*a* and 38*b* present torque flow diagrams of the automatic transmission gear shift control apparatus of the 5-3rd embodiment at 6th and reverse speeds.

FIG. 39 is a schematic diagram showing a gear shift control apparatus for an automatic transmission of a sixth embodiment.

FIGS. 40*a* and 40*b* present torque flow diagrams of the automatic transmission gear shift control apparatus of the sixth embodiment at 1st and 2nd speeds.

FIGS. 41*a*–41*c* present torque flow diagrams of the automatic transmission gear shift control apparatus of the sixth embodiment at 3rd, 4th and 5th speeds.

FIGS. 42*a* and 42*b* present torque flow diagrams of the automatic transmission gear shift control apparatus of the sixth embodiment at 6th and reverse speeds.

FIGS. 45*a*–45*c* present torque flow diagrams of the automatic transmission gear shift control apparatus of the seventh embodiment at 1st, 2nd and 3rd speeds.

FIGS. 46*a*–46*c* present torque flow diagrams of the automatic transmission gear shift control apparatus of the seventh embodiment at 4th, 5th and 6th speeds.

FIG. 47 is a torque flow diagram of the automatic transmission gear shift control apparatus of the seventh embodiment at a reverse speed.

BEST MODES FOR CARRYING OUT THE INVENTION

First to sixteenth embodiments for realizing the gear shift control apparatus for the automatic transmission of the present invention will be described with reference to the accompanying drawings.

First Embodiment

First of all, the construction will be described in the following.

Figures 1, 2:
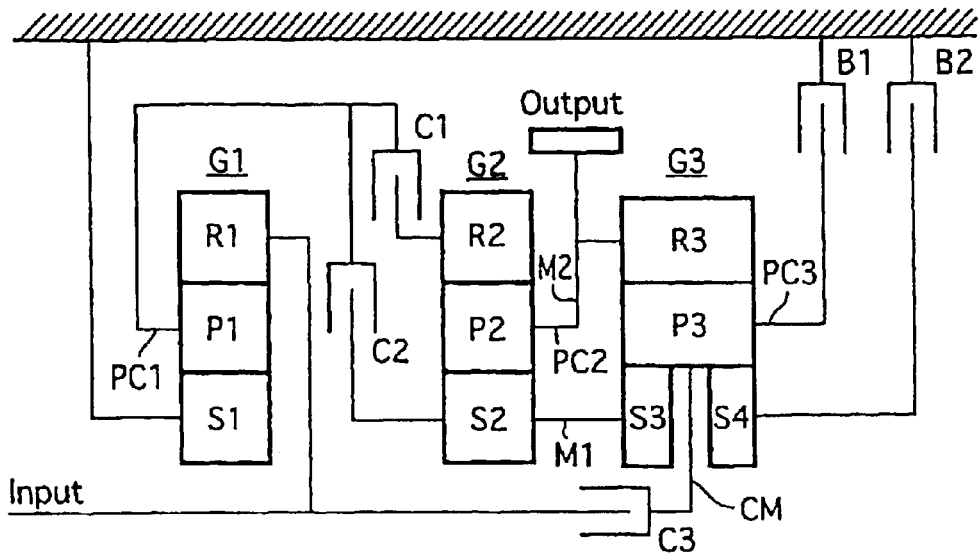
FIG. 1 is a schematic diagram showing a gear shift control apparatus for an automatic transmission of a first embodiment.
FIG. 2 is an engagement table of the automatic transmission gear shift control apparatus of the first embodiment.

The first embodiment is directed to automatic transmission gear shift control apparatus corresponding to inventions defined in Claims 1, 3, 7, 8 and 16, and FIG. 1 is a schematic diagram showing the automatic transmission gear shift control apparatus of the first embodiment.

In FIG. 1: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

The automatic transmission gear shift control apparatus (of a speed-reducing single type 1) of the first embodiment is an example, in which the first planetary gearset G1 of a single-pinion type is positioned as a speed-reducing device at the lefthand end portion of FIG. 1, in which the second planetary gearset G2 of a single-pinion type is positioned at the central portion and in which the third planetary gearset G3 of a double sun gear type is positioned at the righthand end portion. And, the aforementioned second planetary gearset G2 and third planetary gearset G3 construct the so-called "Ishimaru type planetary gear train".

The aforementioned first planetary gearset G1 is the single-pinion type planetary gearset acting as the speed-reducing device, which includes: a first sun gear S1; a first ring gear R1; and a first carrier PC1 for supporting a first pinion P1 meshing with the two gears S1 and R1.

The aforementioned second planetary gearset G2 is the single-pinion type planetary gearset, which includes: a second sun gear S2; a second ring gear R2; and a second carrier PC2 for supporting a second pinion P2 meshing with the two gears S2 and R2.

The aforementioned third planetary gearset G3 is the double sun gear type planetary gearset, which includes: two third sun gear S3 and fourth sun gear S4; a third pinion P3 meshing individually with the third and fourth sun gears S3 and S4; an axial third carrier PC3 for supporting the third pinion P3; a center member CM connected to the third carrier PC3 and positioned between the aforementioned two sun gears S3 and S4; and one third ring gear R3 meshing with the aforementioned third pinion P3.

Here, the aforementioned center member CM is coupled to the third carrier PC3 at spatial positions of the third pinion P3 adjoining on the circumference of the third carrier PC3.

The aforementioned input shaft Input is connected to the first ring gear R1 and receives a rotational driving force from the not-shown engine or driving source through a torque converter or the like.

The aforementioned output gear Output is connected to the second carrier PC2 and transmits the outputted rotational driving force to driven wheels through the not-shown final gear or the like.

The aforementioned first connection member M1 is the member for connecting the second sun gear S2 and the third sun gear S3 integrally.

The aforementioned second connection member M2 is the member for connecting the second carrier PC2 and the third ring gear R3 integrally.

The aforementioned first clutch C1 is the clutch for connecting/disconnecting the first carrier PC1 and the second ring gear R2 selectively.

The aforementioned second clutch C2 is the clutch for connecting/disconnecting the first carrier PC1 and the second sun gear S2 selectively.

The aforementioned third clutch C3 is the clutch for connecting/disconnecting the input shaft Input and the center member CM selectively.

The aforementioned first brake B1 is the brake for stopping the rotation of the third carrier PC3 selectively.

The aforementioned second brake B2 is the brake for stopping the rotation of the fourth sun gear S4 selectively.

To the aforementioned individual clutches C1, C2 and C3 and individual brakes B1 and B2, there is connected the not-shown hydraulic gear shift control device (or gear shift control means) for establishing engagement pressures (with circle symbols) and release pressures (with no symbol) at individual speed ranges, as shown in an engagement table of FIG. 2. As the hydraulic gear shift control device, here is adopted the hydraulic control type, the electronic control type, the hydraulic+electronic control type or the like.

The actions will be described in the following.

[Shifting Actions]

Figure 3:
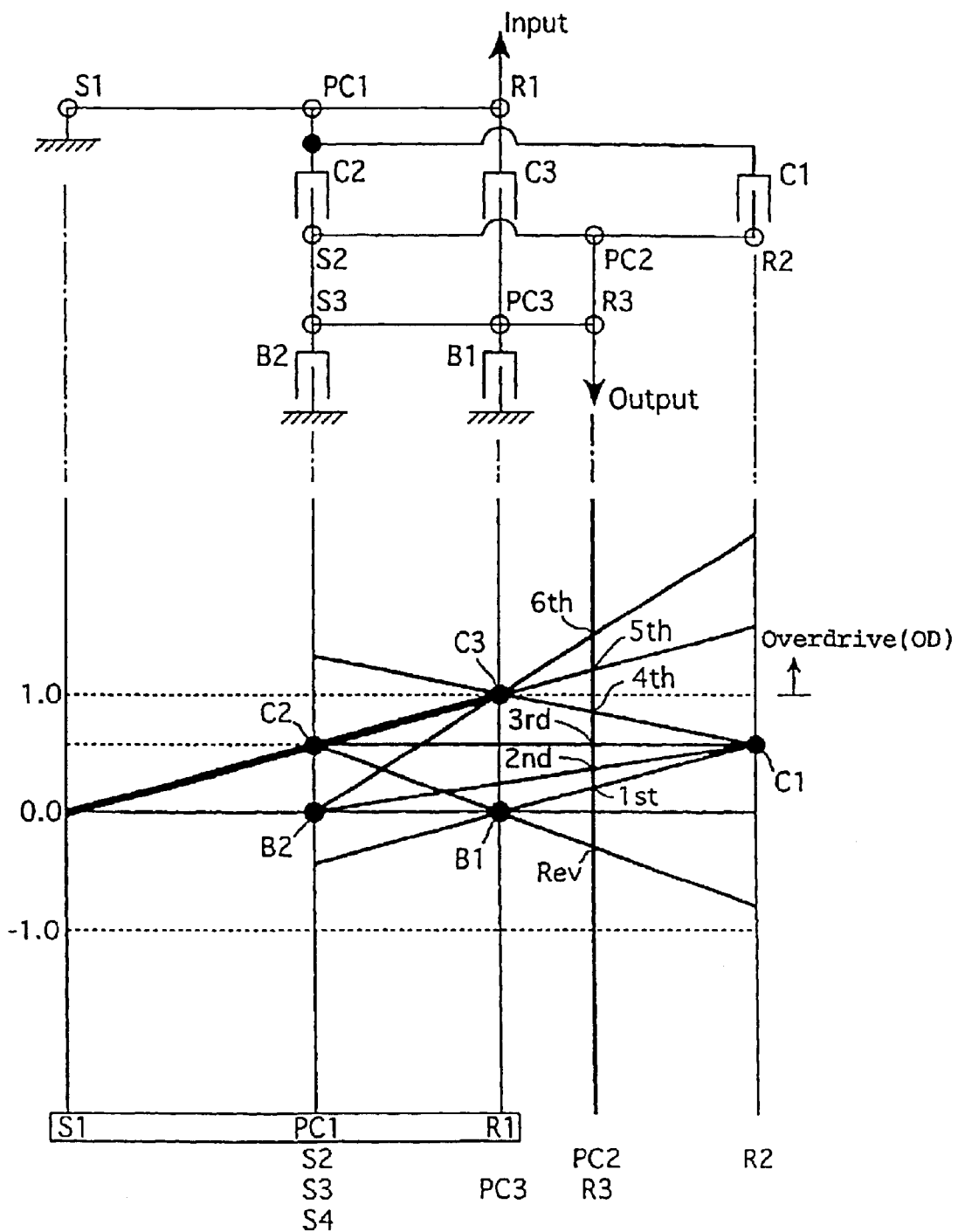
FIG. 3 is a collinear diagram in the automatic transmission gear shift control apparatus of the first embodiment.
Figure 6:
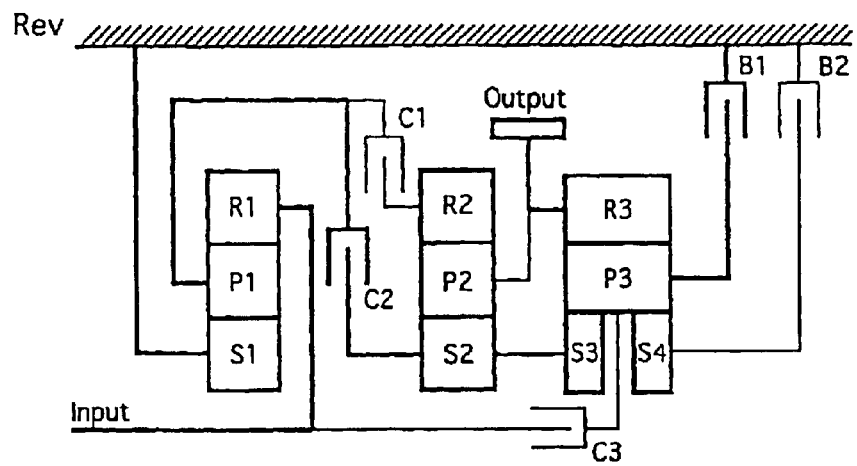
FIG. 6 is a torque flow diagram of the automatic transmission gear shift control apparatus of the first embodiment at a reverse speed.

FIG. 2 is a diagram showing the engagement table in the automatic transmission gear shift control apparatus of the first embodiment; FIG. 3 is a collinear diagram showing the rotation stopping states of members at the individual gear ranges in the automatic transmission gear shift control apparatus of the first embodiment; and FIG. 4 to FIG. 6 are diagrams showing the torque flows at the individual gear ranges in the automatic transmission gear shift control apparatus of the first embodiment. In FIG. 2, thick lines indicate the collinear diagram of the first planetary gearset G1, and intermediate lines indicate the collinear diagram of the Ishimaru planetary gear trains. In FIG. 4 to FIG. 6, the torque transmission routes of the clutches/brakes/members are indicated by thick lines, and the torque transmission routes of the gears are indicated by hatching them.

<1st Speed>

As shown in FIG. 2, the 1st speed is achieved by the engagements of the first clutch C1 and the first brake B1.

At this 1st speed, in the second planetary gearset G2, the speed-reduced rotation from the first planetary gearset G1 is inputted to the second ring gear R2 by the engagement of the first clutch C1.

In the third planetary gearset G3, on the other hand, the third carrier PC3 is fixed on the case by the engagement of the first brake B1 so that the rotation of the third sun gear S3 is the speed-reduced rotation reversed from the output rotation of the third ring gear R3. And, this rotation of the third sun gear S3 is transmitted through the first connection member M1 to the second sun gear S2 of the second planetary gearset G2.

In the second planetary gearset G2, therefore, the forward speed-reduced rotation is inputted from the second ring gear R2, and the backward speed-reduced rotation is inputted from the second sun gear S2 to the second planetary gearset G2 so that the rotation further reduced in speed from the speed-reduced rotation of the second ring gear R2 is outputted from the second carrier PC2 through the second connection member M2 to the output gear Output.

As shown in the collinear diagram of FIG. 3, more specifically, the 1st speed is defined by the line which joins the engagement point of the first clutch C1 for inputting the speed-reduced rotation from the first planetary gearset G1 to the second ring gear R2 and the engagement point of the first brake B1 for stopping the rotation of the third carrier PC3, and the rotation inputted from the input shaft Input is reduced in speed and outputted from the output gear Output.

In the torque flow at this 1st speed, as shown in FIG. 4(a), the torque is applied to the first clutch C1, the first brake B1 and the individual members, as indicated by the thick lines, and to the first planetary gearset G1, the second planetary gearset G2 and the third planetary gearset G3 (excepting the fourth sun gear S4), as hatched. In short, at the 1st speed, the first planetary gearset G1, and the second planetary gearset G2 and the third planetary gearset G3, as constructing the Ishimaru type planetary gear train, participate in the torque transmission.

<2nd Speed>

As shown in FIG. 2, the 2nd speed is achieved by releasing the first brake B1 at the 1st speed and engaging the second brake B2, that is, by engaging the first clutch C1 and the second brake B2.

At this 2nd speed, in the second planetary gearset G2, the speed-reduced rotation from the first planetary gearset G1 is inputted to the second ring gear R2 by the engagement of the first clutch C1.

In the third planetary gearset G3, on the other hand, the fourth sun gear S4 is fixed on the case by the engagement of the second brake B2 so that the third sun gear S3 connected by the third pinion P3 is fixed. And, the second sun gear S2 connected to the third sun gear S3 through the first connection member M1 is fixed on the case.

In the second planetary gearset G2, therefore, the forward speed-reduced rotation is inputted from the second ring gear R2 to fix the second sun gear S2, and the rotation further reduced to a speed lower than that of the speed-reduced rotation from the second ring gear R2 is outputted from the second carrier PC2 through the second connection member M2 to the output gear Output.

As shown in the collinear diagram of FIG. 3, more specifically, the 2nd speed is defined by the line which joins the engagement point of the first clutch C1 for inputting the speed-reduced rotation from the first planetary gearset G1 to the second ring gear R2 and the engagement point of the second brake B2 for stopping the rotation of the fourth sun gear S4, and the rotation inputted from the input shaft Input is reduced to a speed (higher than that of the 1st speed) and outputted from the output gear Output.

In the torque flow at this 2nd speed, as shown in FIG. 4(b), the torque is applied to the first clutch C1, the second brake B2 and the individual members, as indicated by the thick lines, and to the first planetary gearset G1 and the second planetary gearset G2, as hatched. Here in the third planetary gearset G3, the unconstrained third pinion P3 revolves about the two fixed sun gears S3 and S4 in accordance with the output rotation of the third ring gear R3 so that it functions as a rotary member but does not participate in the torque transmission.

<3rd Speed>

As shown in FIG. 2, the 3rd speed is achieved by releasing the second brake B2 at the 2nd speed and engaging the second clutch C2, that is, by engaging the first clutch C1 and the second clutch C2.

At this 3rd speed, in the second planetary gearset G2, the speed-reduced rotation from the first planetary gearset G1 is inputted to the second ring gear R2 by the engagement of the first clutch C1. At the same time, this speed-reduced rotation is inputted to the second sun gear S2 of the second planetary gearset G2 by the engagement of the second clutch C2.

In the second planetary gearset G2, therefore, the same speed-reduced rotations are inputted from the second ring gear R2 and the second sun gear S2 so that the speed-reduced rotation (=the speed-reduced rotation of the first planetary gearset G1) is outputted from the second carrier PC2 rotating integrally with the two gears R2 and S2, through the second connection member M2 to the output gear Output.

As shown in the collinear diagram of FIG. 3, more specifically, the 3rd speed is defined by the line which joins the engagement point of the first clutch C1 for inputting the speed-reduced rotation from the first planetary gearset G1 to the second ring gear R2 and the engagement point of the second clutch C2 for inputting the speed-reduced rotation from the first planetary gearset G1 to the second sun gear S2, and the rotation inputted from the input shaft Input is reduced at a ratio (=the reduction ratio of the first planetary gearset G1) and outputted from the output gear Output.

In the torque flow at this 3rd speed, as shown in FIG. 4(c), the torque is applied to the first clutch C1, the second clutch C2 and the individual members, as indicated by the thick lines, and to the first planetary gearset G1 and the second planetary gearset G2, as hatched. In short, the third planetary gearset G3 does not participate in the torque transmission in the least.

<4th Speed>

As shown in FIG. 2, the 4th speed is achieved by releasing the second clutch C2 at the 3rd speed and engaging the third clutch C3, that is, by engaging the first clutch C1 and the third clutch C3.

At this 4th speed, in the second planetary gearset G2, the speed-reduced rotation from the first planetary gearset G1 is inputted to the second ring gear R2 by the engagement of the first clutch C1.

In the third planetary gear G3, on the other hand, the input rotation from the input shaft Input is inputted through the center member CM to the third carrier PC3 by the engagement of the third clutch C3. As a result the rotation of the third sun gear S3 is increased to a higher speed than that of the output rotation of the third ring gear R3 and is transmitted through the first connection member M1 to the second sun gear S2.

In the second planetary gearset G2, therefore, the speed-reduced rotation is inputted from the second ring gear R2, and the speed-increased rotation is inputted from the second sun gear S2, so that the rotation (at a low speed than that of the input rotation) increased in speed from the speed-reduced rotation of the second ring gear R2 is outputted from the second carrier PC2 through the second connection member M2 to the output gear Output.

As shown in the collinear diagram of FIG. 3, more specifically, the 4th speed is defined by the line which joins the engagement point of the first clutch C1 for inputting the speed-reduced rotation from the first planetary gearset G1 to the second ring gear R2 and the engagement point of the third clutch C3 for inputting the rotation of the third carrier PC3, and the rotation inputted from the input shaft Input is slightly reduced in speed and outputted from the output gear Output.

In the torque flow at this 4th speed, as shown in FIG. 5(a), the torque is applied to the first clutch C1, the third clutch C3 and the individual members, as indicated by the thick lines, and to the first planetary gearset G1, the second planetary gearset G2 and the third planetary gearset G3 (excepting the fourth sun gear S4), as hatched.

<5th Speed>

As shown in FIG. 2, the 5th speed is achieved by releasing the first clutch C1 at the 4th speed and engaging the second clutch C2, that is, by engaging the second clutch C2 and the third clutch C3.

At this 5th speed, the speed-reduced rotation from the first planetary gearset G1 is inputted through the second sun gear S2 and the first connection member M1 to the third sun gear S3 by the engagement of the second clutch C2. At the same time, the input rotation from the input shaft Input is inputted through the center member CM to the third carrier PC3 by the engagement of the third clutch C3.

In the third planetary gearset G3, therefore, the input rotation is inputted to the third carrier PC3, and the speed-reduced rotation from the first planetary gearset G1 is inputted to the third sun gear S3, so that the rotation increased in speed to a higher speed than that of the input rotation is outputted from the third ring gear R3 through the second connection member M2 to the output gear Output.

As shown in the collinear diagram of FIG. 3, specifically, the 5th speed is defined by the line which joins the engagement point of the second clutch C2 for inputting the speed-reduced rotation from the first planetary gearset G1 to the third sun gear S3 and the engagement point of the third clutch C3 for inputting the rotation of the third carrier PC3, and the rotation inputted from the input shaft Input is slightly increased in speed and outputted from the output gear Output.

In the torque flow at this 5th speed, as shown in FIG. 5(b), the torque is applied to the second clutch C2, the third clutch C3 and the individual members, as indicated by the thick lines, and to the first planetary gearset G1 and the third planetary gearset G3 (excepting the fourth sun gear S4), as hatched.

<6th Speed>

As shown in FIG. 2, the 6th speed is achieved by releasing the second clutch C2 at the 5th speed and engaging the second brake B2, that is, by engaging the third clutch C3 and the second brake B2.

At this 6th speed, the input rotation of the input shaft Input is inputted through the center member CM of the third planetary gearset G3 to the third carrier PC3 by the engagement of the third clutch C3. By the engagement of second brake B2, moreover, the fourth sun gear S4 of the third planetary gearset G3 is fixed on the case.

In the third planetary gearset G3, therefore, the input rotation is inputted to the third carrier PC3, and the fourth sun gear S4 is fixed on the case, so that the rotation increased to a higher speed than that of the input rotation is outputted from the third ring gear R3 through the second connection member M2 to the output gear Output.

As shown in the collinear diagram of FIG. 3, more specifically, the 6th speed is defined by the line which joins the engagement point of the third clutch C3 for inputting the rotation of the third carrier PC3 and the engagement point of the second brake B2 for fixing the fourth sun gear S4 on the case, and the rotation inputted from the input shaft Input is increased in speed and outputted from the output gear Output.

In the torque flow at this 6th speed, as shown in FIG. 5(c), the torque is applied to the third clutch C3, the second brake B2 and the individual members, as indicated by the thick lines, and to the third planetary gearset G3 (excepting the third sun gear S3), as hatched.

Reverse Speed

As shown in FIG. 2, the reverse speed is achieved by engaging the second clutch C2 and the first brake B1.

At this reverse speed, the speed-reduced rotation from the first planetary gearset G1 is inputted through the second sun gear S2 and the first connection member M1 to the third sun gear S3 by the engagement of the second clutch C2. By the engagement of the first brake B1, on the other hand, the third carrier PC3 is fixed on the case.

In the third planetary gearset G3, therefore, the forward speed-reduced rotation is inputted to the third sun gear S3, and the third carrier PC3 is fixed on the case, so that the speed-reduced backward rotation is outputted from the third ring gear R3 through the second connection member M2 to the output gear Output.

As shown in the collinear diagram of FIG. 3, more specifically, the reverse speed is defined by the line which joins the engagement point of the second clutch C2 for inputting the speed-reduced rotation from the first planetary gearset G1 to the third sun gear S3 and the engagement point of the first brake B1 for stopping the rotation of the third carrier PC3, and the rotation inputted from the input shaft Input is reduced backward in speed and outputted from the output gear Output.

In the torque flow at this reverse speed, as shown in FIG. 6, the torque is applied to the second clutch C2, the first brake B1 and the individual members, as indicated by the thick lines, and to the first planetary gearset G1 and the third planetary gearset G3 (excepting the fourth sun gear S4), as hatched.

[Advantages by Contrasts]

The basic concept of the automatic transmission gear shift control apparatus of the present invention is to provide a gear shift control apparatus which achieves six forward speeds with three clutches and two brakes, which solves the problems of the Simpson type planetary gear train although based on the planetary gearset+the Simpson planetary gear train and which overcomes the gear shift control apparatus according to the planetary gearset+the Ravigneaux type composite planetary gear train. The advantages will be described in contrast to the gear shift control apparatus adopting the Simpson type planetary gear train and the Ravigneaux type complex planetary gear train.

Figures 8A, 8B:
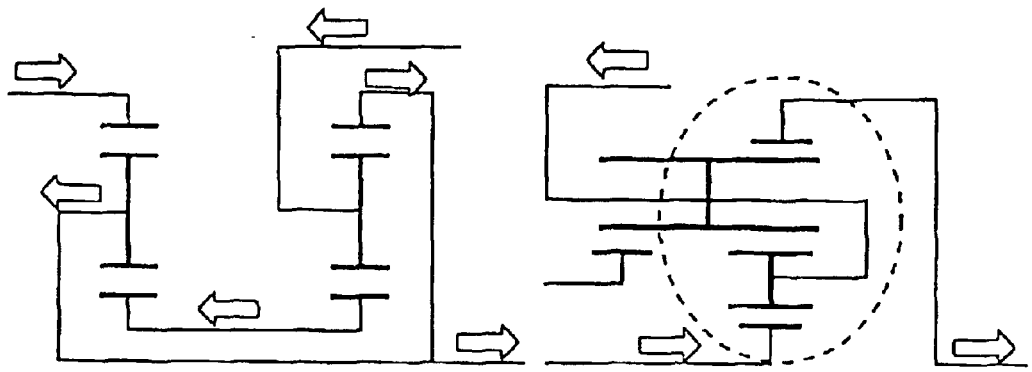
FIGS. 8a and 8b present diagrams showing torque transmission routes at the 1st speed in the Simpson type planetary gear train and the Ravigneaux type composite planetary gear train.

Features of Simpson Type Planetary Gear Train (1) The Simpson type planetary gear train is advantageous in strength because the flow of the torque transmission at the 1st speed for the maximum torque is shared among all members, as shown in FIG. 8(a).

Figure 9:
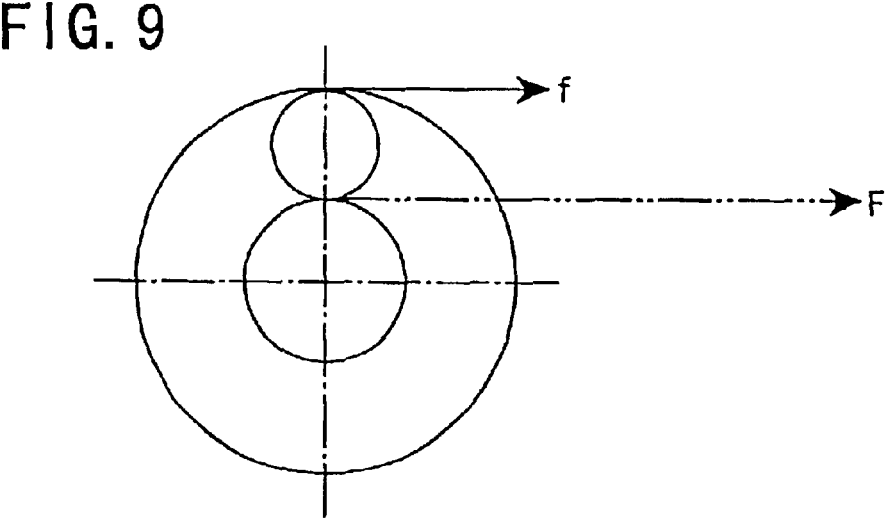
FIG. 9 is a diagram for explaining that a ring gear input is more advantageous than a carrier input.

(2) The Simpson type planetary gear train is advantageous in gear strength, gear lifetime, carrier rigidity and so on, because it uses the ring gear input so that the tangential force is about one half of the sun gear input. In case the same torque is inputted to the planetary gear, as shown in FIG. 9, a ring gear input f is reduced in tangential force to ½ to ½.5 of a sun gear input F.

Figures 10A, 10B, 10C:
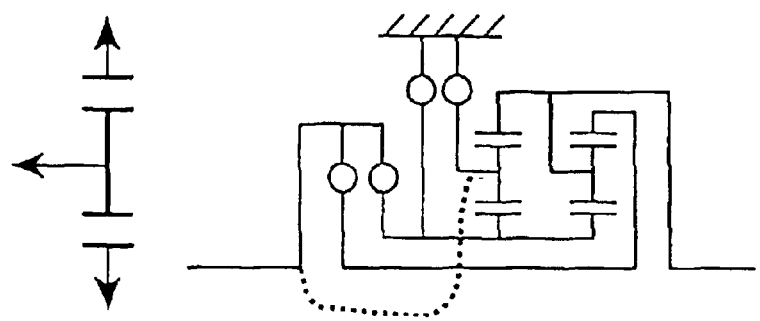
FIGS. 10a–10c present diagrams for explaining that a carrier input for achieving an overdrive gear cannot be realized in the case of the Simpson type planetary gear train, and that a double sun gear type planetary gearset has live members.

(3) For achieving an overdrive gear, there is needed the carrier input to the Simpson type planetary gear train. If the input shaft and the output shaft are positioned on a common axis, the number of the rotary members in the single-pinion type planetary gearset is limited to three, as shown in FIG. 10(a), so that the input route to the carrier is not formed, as indicated by a dotted line in FIG. 10(b).

For this input route to the carrier, therefore, it is necessary to position the input shaft and the output shaft in parallel on different axes. As a result, the problem is to invite a large size of the automatic transmission.

Problems of Ravigneaux Type Composite Planetary Gear Train

In order to solve the aforementioned problem (3), therefore, the gear shift control apparatus adopts the Ravigneaux type composite planetary gear train in place of the Simpson type planetary gear train. This gear shift control apparatus can achieve the coaxial positioning of the input shaft and the output shaft but has the problems, as enumerated in the following.

(5) The gear shift control apparatus is disadvantageous in strength because the maximum toque (at the 1st speed) of the gear train is borne by the double-pinion type planetary gearset on one side of the Ravigneaux type composite planetary gear train, as shown in FIG. 8(b).

Figure 7:
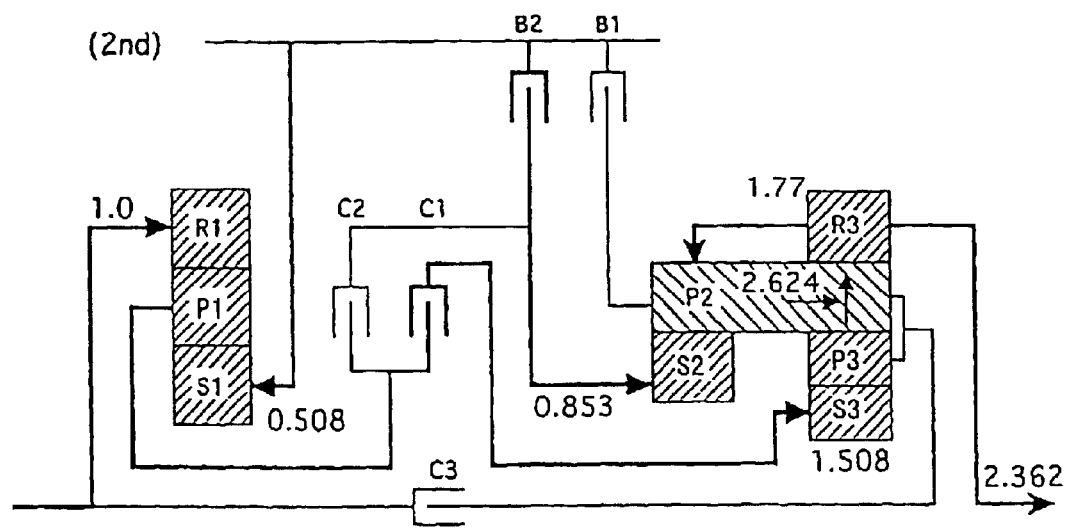
FIG. 7 is a torque circulation explaining diagram at the 2nd speed in a gear shift control apparatus for an automatic transmission using the Ravigneaux type composite planetary gear train.

(6) The torque, as raised by one set of single-pinion type planetary gearset as the speed-reducing device, is inputted from the sun gear of the Ravigneaux type composite planetary gear train, as shown in FIG. 7. For the aforementioned reason (2), therefore, the tangential force gets higher than the ring gear input so that disadvantages are involved in gear strength, gear lifetime, carrier rigidity and so on.

(7) In demand for securement of the strength (i.e., the gear strength or the gear lifetime) or improvement in the carrier rigidity of the Ravigneaux type composite planetary gear train at the 1st speed, it is necessary to enlarge the dimensions of the Ravigneaux type composite planetary gear train. This invites a large size of the automatic transmission.

(8) At the 2nd speed, as shown in FIG. 7, a torque circulation occurs in the Ravigneaux type composite planetary gear train so that the transmission efficiency drops to deteriorate the fuel economy at the 2nd speed where the torque circulation occurs. Here in the torque circulation, as shown in FIG. 7, there are branched from the third ring gear R3 an output torque (2,362) and a circulation torque (1.77), of which the circulation torque circulates inside of the third ring gear R3 and the second pinion P2 in the 2nd speed range.

Features of Ishimaru Type Planetary Gear Train

Here will be described the features of the Ishimaru type planetary gear train which is adopted in the present invention in combination of the single-pinion type planetary gearset and the double sun gear type planetary gearset.

(a) For achieving the overdrive gear, there is needed the carrier input. With this carrier input being achieved, the Ishimaru type planetary gear train can position the input portion and the output portion on a common line as in the Ravigneaux type composite planetary gear train. As shown in FIG. 10(c), more specifically, the double sun gear type planetary gearset constructing the Ishimaru type planetary gear train increases the member number to five=(two members from the sun gear)+(one member from the ring gear)+(two members in axial and radial directions from the carrier). The input can be extracted radially from between the two sun gears by the center member thereby to achieve the carrier input in which higher speed ranges (e.g., 4th to 6th speeds in the first embodiment) including the overdrive hold.

(b) The Ishimaru type planetary gear train is advantageous in strength, because the maximum torque (at the 1st speed) of the gear train is borne by both the second planetary gearset G2 and the third planetary gearset G3 of the Ishimaru type planetary gear train, as shown in FIG. 5(a), so that the torque flow at the 1st speed can be shared among all members.

(c) The torque, as raised by one set of first planetary gearset G1 as the speed-reducing device, is inputted, as shown in FIG. 4(a) and FIG. 4(b), from the second ring gear R2 of the Ishimaru type planetary gear train at the 1st and 2nd speeds where the transmission torque is high. In comparison with the Ravigneaux type composite planetary gear train of the sun gear input, therefore, the tangential force is lowered to give an advantage (for the smaller size) in gear strength, gear lifetime, carrier rigidity and so on.

(d) As compared with the Ravigneaux type composite planetary gear train, the Ishimaru type planetary gear train is advantageous not only in strength but also in gear strength, gear lifetime, carrier rigidity and so on. Like the Ravigneaux type composite planetary gear train, moreover, the Ishimaru type planetary gear train can have the construction in which the input portion and the output portion are coaxially positioned. Therefore, the gear shift control apparatus can be made compact to achieve the size reduction of the automatic transmission.

(e) At the 2nd speed of the Ishimaru type planetary gear train, as shown in FIG. 4(b), no torque circulation occurs to improve the transmission efficiency and the fuel economy better than those of the Ravigneaux type composite-planetary gear train at the 2nd speed where the torque circulation occurs.

Specifically, FIG. 11 shows the contrasts between the Ravigneaux type composite planetary gear train and the Ishimaru type planetary gear train, in the case of considering a generally applicable gear ratio range ($\alpha$=0.35 to 0.65) of a gear ratio $\alpha$ (=sun gear tooth number/ring gear tooth number) and a preferable condition under which the gear ratio is the smaller for the higher speed range. In view of the transmission efficiency at the 2nd speed, the Ravigneaux type composite planetary gear train takes a transmission efficiency of 0.950 or 0.952, and the Ishimaru type planetary gear train takes a transmission efficiency of 0.972, in case the first planetary gearset G1 is of the single-pinion type, and 0.968 in case the same is of the double-pinion type.

(f) The Ravigneaux type composite planetary gear train is regulated by a constant ring gear tooth number when the gear ratio $\alpha$ is to be set. Considering the condition of the generally applicable gear ratio range ($\alpha$=0.35 to 0.65) and the preferable condition of the smaller gear ratio for the higher speed range, therefore, the ratio coverage or the applicable gear ratio range (=1st speed gear ratio/6th speed gear ratio) is 4.81 at the minimum to 7.20 at the maximum, as shown in FIG. 11.

As compared with the Ravigneaux type composite planetary gear train, on the contrary, the Ishimaru type planetary gear train capable of setting gear ratios $\alpha 2$ and $\alpha 3$ of the two planetary gearsets G2 and G3 independently of each other, as shown in FIG. 11 can have the applicable ratio coverage enlarged to enhance the degree of freedom for selecting the gear ratio such as 4.81 at the minimum to 7.80 at the maximum of the case, in which the first planetary gearset G1 is of the single-pinion type, or 5.08 at the minimum to 9.02 at the maximum of the case, in which the same is of the double-pinion type, as indicated by the numerical values of FIG. 2 (wherein the numerical values 5.5 to 7.0 at the highest row indicate the ratio coverage).

The effects will be described in the following.

As has been described hereinbefore, the automatic transmission gear shift control apparatus of the first embodiment can achieve the effects to be enumerated in the following.

(1) In a gear shift control apparatus for an automatic transmission comprising an input shaft Input for inputting a rotation from a drive source; an output gear Output for outputting a shifted-gear rotation; three sets of planetary gearsets G1, G2 and G3; a plurality of members M1 and M2 for connecting a plurality of rotary elements integrally; three selectively connecting/disconnecting clutches C1, C2 and C3 and two selectively fixing brakes B1 and B2 positioned between respective rotary elements of the input shaft Input, the output gear Output, the connection members M1 and M2 and the three planetary gearsets G1, G2 and G3; and gear shift control means for obtaining at least six forward speeds and one reverse speed by engaging/releasing the three clutches C1, C2 and C3 and two brakes B1 and B2 properly, one planetary gearset G1 of the three planetary gearsets G1, G2 and G3 is a speed-reducing device for reducing the speed of the input rotation always, and one planetary gearset G3 of the remaining two planetary gearsets G2 and G3 is a double sun gear type planetary gearset including: two sun gears S3 and S4; a pinion P3 meshing with each of the two sun gears S3 and S4; a carrier having a center member CM positioned between the two sun gears S3 and S4 for inputting or outputting a rotation; and one ring gear R3 meshing with the pinion P3. Therefore, the automatic transmission gear shift control apparatus can achieve the effects, as enumerated in the following (corresponding to Claim 1).

(1) The Ishimaru type planetary gear train, as constructed of the two planetary gearsets G2 and G3, can achieve strength advantages such as the gear strength, gear lifetime.
(2) The fuel economy can be improved by eliminating the torque circulation at the 2nd speed.
(3) The input shaft Input and the output gear Output can be coaxially positioned.
(4) The automatic transmission can be made compact by the coaxial positioning of the input shaft Input and the output gear Output and by the size reduction of the Ishimaru type planetary gear train of a low request strength.
(5) The degree of freedom for selecting the gear ratio can be enhanced to a higher level than that of the case using the Ravigneaux type composite planetary gear train.
(6) One planetary gearset G1 is made to act as the speed-reducing device for reducing the speed of the input rotation always, so that the size reduction of the speed-reducing device can be achieved to make the automatic transmission compact.

(2) The first planetary gearset G1 acting as the speed-reducing device is a single-pinion type planetary gearset. Therefore, the gear noise and the parts number can be reduced while improving the transmission efficiency and the fuel economy (corresponding to Claim 3).

(3) Assuming that the planetary gearset that functions as the speed-reducing device is the first planetary gearset G1, the double sun gear type planetary gearset is the third planetary gearset G3 and the remaining planetary gearset is the second planetary gearset G2, the second planetary gearset G2 and the third planetary gearset G3 are the planetary gearsets which are constructed of five rotary members including the connection members M1 and M2 for connecting the rotary members of the second planetary gearset G2 and the rotary members of the third planetary gearset G3 integrally. The gear shift control apparatus comprises a first rotary member connected to a second brake B2 capable of stopping (or fixing) one fourth sun gear S4 of the aforementioned third planetary gearset G3 selectively; a second rotary member connected to a second clutch C2 capable of connecting/disconnecting the other third sun gear S3 of the aforementioned third planetary gearset G3 and a first carrier PC1 of the aforementioned first planetary gearset G1 selectively; a third rotary member connected to the output gear Output through the second connection member M2; a third rotary member connected to the output gear Output through the second connection member M2; a fourth rotary member connected to a third clutch C3 capable of connecting/disconnecting the first ring gear R1 of the aforementioned first planetary gearset G1 selectively and a first brake B1 capable of stopping (or fixing) selectively; a fifth rotary member connected to the first clutch C1 capable of connecting/disconnecting the first carrier PC1 of the aforementioned first planetary gearset G1, and a hydraulic gear shift control device for obtaining a 1st speed by engagement of the first clutch C1 and the first brake B1, a 2nd speed by engagement of the first clutch C1 and the second brake B2, a 3rd speed by engagement of the first clutch C1 and the second clutch C2, a 4th speed by engagement of the first clutch C1 and the third clutch C3, a 5th speed by engagement of the second clutch C2 and the third clutch C3, a 6th speed by engagement of the third clutch C3 and the second brake B2, and a reverse speed by engagement of the second clutch C2 and the first brake B1, thereby establishing six forward speeds and one reverse speed. By enhancing the positioning layout of the clutches/the brakes/the individual members with the planetary gearset constructed of the five rotary members, i.e., the so-called the "Ishimaru type planetary gear train", it is possible to provide the gear shift control apparatus (corresponding to Claim 7) of the six forward speeds and one reverse speed, which is enabled to improve the fuel economy to a high level by eliminating the torque circulation at the 2nd speed.

(4) The automatic transmission gear shift control apparatus comprises the single-pinion type first planetary gearset G1 acting as the speed-reducing device having the first sun gear S1, the first ring gear R1, and the first carrier PC1 for supporting the first pinion P1 meshing with the two gears S1 and R1; the single-pinion type second planetary gearset G2 having the second sun gear S2, the second ring gear R2, and the second carrier PC2 for supporting the second pinion P2 meshing with the two gears S2 and R2; the double sun gear type third planetary gearset G3 having the two third sun gear S3 and fourth sun gear S4, the third carrier PC3 and the center member CM for supporting the third pinion P3 meshing individually with the two sun gears S3 and S4, and one third ring gear R3 meshing with the third pinion P3; the input shaft Input connected to the first ring gear R1; the output gear Output connected to the second carrier PC2; the first connection member M1 for connecting the second sun gear S2 and the third sun gear S3 integrally; the second connection member M2 for connecting the second carrier PC2 and the third ring gear R3 integrally; the first clutch C1 for connecting/disconnecting the first carrier PC1 and the second ring gear R2 selectively; the second clutch C2 for connecting/disconnecting the first carrier PC1 and the second sun gear S2 selectively; the third clutch C3 for connecting/disconnecting the input shaft Input and the center member CM selectively; the first brake B1 for stopping the rotation of the third carrier PC3 selectively; the second brake B2 for stopping the rotation of the fourth sun gear S4 selectively, and the hydraulic gear shift control device for achieving the six forward speeds and one reverse speed. At the 1st speed and 2nd speed, therefore, the ring gear input can be achieved for the so-called "Ishimaru type planetary gear train", which is constructed of the second planetary gearset G2 and the third planetary gearset G3, and the automatic transmission can be made compact (corresponding to Claim 8).

(5) The third planetary gearset G3 or the double sun gear type planetary gearset is the planetary gearset including the two sun gears S3 and S4 having the same tooth number, and the pinion P3 meshing individually with the two sun gears S3 and S4. Therefore, it is easy to machine the pinion P3 and to achieve an effect of easy manufacture. Moreover, a remarkable advantage is obtained for noise and vibration (corresponding to Claim 16).

Specific Example of First Embodiment Apparatus

Figure 12:
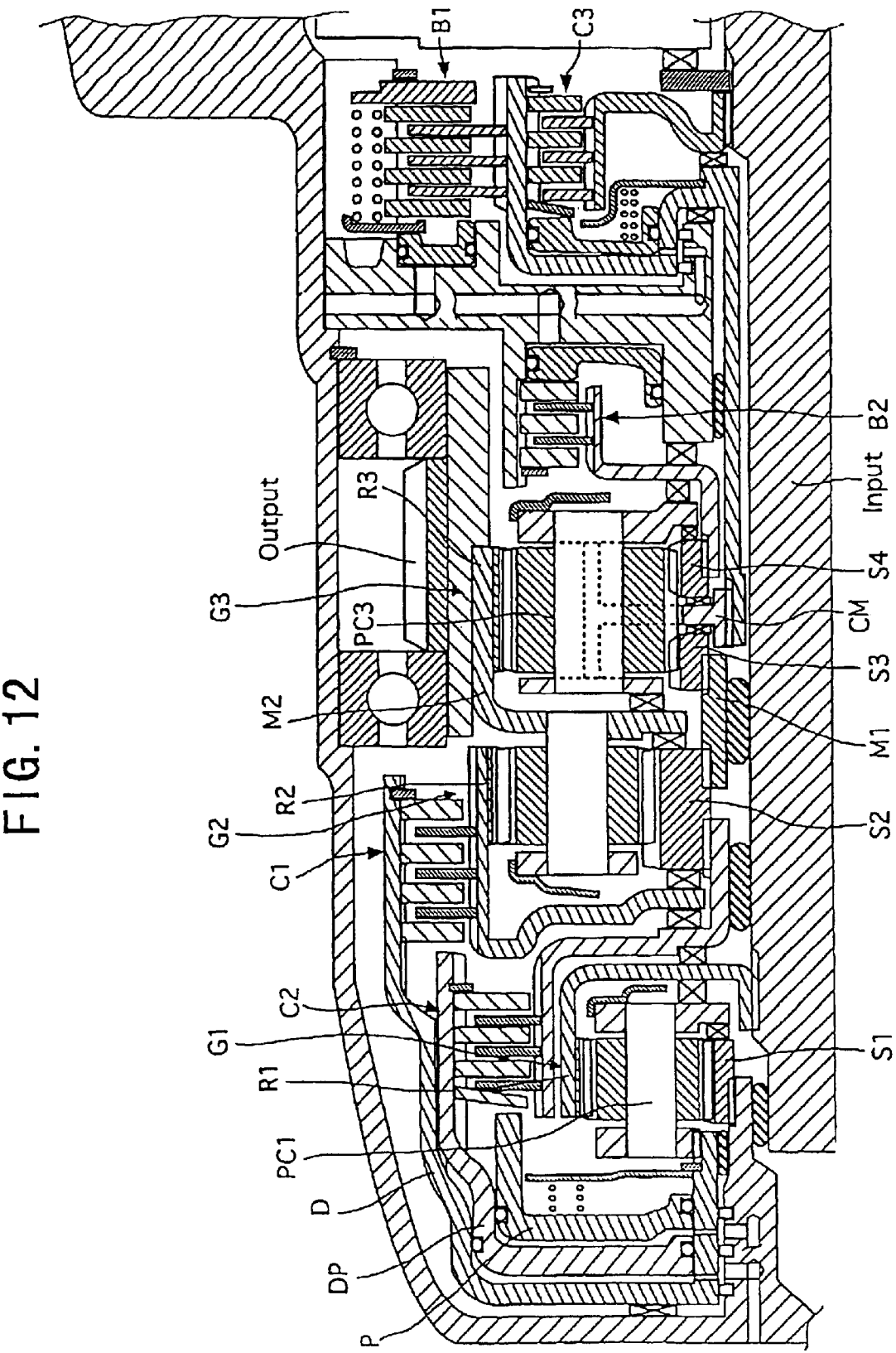
FIG. 12 is a section showing one example of the case in which the gear shift control apparatus of the first embodiment is concretely applied to an automatic transmission.

FIG. 12 is a section showing a concrete construction of the case in which the gear shift control apparatus of the first embodiment is adopted in an automatic transmission.

In contrast to the schematic diagram shown in FIG. 1, this specific example is different in that the input shaft Input is positioned on the right-hand side of the Drawing and in that both the third clutch C3 and the first brake B1 are extracted from the center member CM. Here in FIG. 12: letter D designates the clutch drum of the first clutch C1; DP a drum piston acting as both the clutch drum of the second clutch C2 and the piston of the first clutch C1; and P the piston of the second clutch C2, and the clutch drum D and the drum piston DP of the first clutch C1 are splined to each other.

The first and second clutches C1 and C2 are included in the aforementioned clutch drum D so that the control of the oil pressure is simplified by selecting the engaging force properly at the simultaneous engaging time of the first and second clutches C1 and C2 at the 3rd speed. In other words, the first clutch C1 and the second clutch C2 are simultaneously engaged at the 3rd speed. At this time, the ratio between the torque TC1 to be inputted to the first clutch C1 and the torque TC2 to be inputted to the second clutch C2 is expressed, if the gear ratio of the second planetary gearset G2 is designated by α2:

$$TC1:TC2=\{1/(1+\alpha2)\}:\{\alpha2/(1+\alpha2)\}.$$

Therefore, a feature that the oil pressure control can be simplified without any need for feeding different oil pressures can be attained by setting the ratio between the effective sectional area of the drum piston DP and the effective sectional area of the piston P, as follows:

Effective Sectional Area of DP: Effective Sectional Area of P $$=\{1/(1+\alpha2)\}:\{\alpha2/(1+\alpha2)\}.$$

Second Embodiment

First of all, the construction will be described in the following.

The second embodiment is directed to automatic transmission gear shift control apparatus corresponding to inventions defined in Claims 1, 3, 7, 9 and 16, and FIG. 13 is a schematic diagram showing the automatic transmission gear shift control apparatus of the second embodiment.

In FIG. 13: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

The automatic transmission gear shift control apparatus (of a speed-reducing single type 2) of the second embodiment is an example, in which the first planetary gearset G1 of a single-pinion type is positioned as a speed-reducing device at the left-hand end portion of FIG. 13, in which the third planetary gearset G3 of a double sun gear type is positioned at the central portion and in which the second planetary gearset G2 of a single-pinion type is positioned at the right-hand end portion. And, the aforementioned second planetary gearset G2 and third planetary gearset G3 construct the so-called "Ishimaru type planetary gear train".

The aforementioned first planetary gearset G1 is the speed-reducing device, which includes: a first sun gear S1; a first ring gear R1; and a first carrier PC1 for supporting a first pinion P1 meshing with the two gears S1 and R1.

The aforementioned second planetary gearset G2 is the single-pinion type planetary gearset, which includes: a second sun gear S2; a second ring gear R2; and a second carrier PC2 for supporting a second pinion P2 meshing with the two gears S2 and R2.

The aforementioned third planetary gearset G3 is the double sun gear type planetary gearset, which includes: two third sun gear S3 and fourth sun gear S4; a center member CM for supporting a third pinion P3 meshing individually with the two sun gears S3 and S4; and one third ring gear R3 meshing with the aforementioned third pinion P3.

The aforementioned input shaft Input is connected to the first ring gear R1, and the aforementioned output gear Output is connected to the second carrier PC2.

The aforementioned first connection member M1 connects the second sun gear S2 and the third sun gear S3 integrally. The aforementioned second connection member M2 connects the second carrier PC2 and the third ring gear R3 integrally.

The aforementioned first clutch C1 connects/disconnects the first carrier PC1 and the second ring gear R2 selectively. The aforementioned second clutch C2 connects/disconnects the first carrier PC1 and the fourth sun gear S4 selectively. The aforementioned third clutch C3 connects/disconnects the input shaft Input and the center member CM selectively.

The aforementioned first brake B1 stops the rotation of the center member CM selectively. The aforementioned second brake B2 stops the rotation of the second sun gear S2 selectively.

To the aforementioned individual clutches C1, C2 and C3 and individual brakes B1 and B2, as in the first embodiment, there is connected the hydraulic gear shift control device which establishes the six forward speeds and one reverse speed: the 1st speed by the engagement of the first clutch C1 and the first brake B1, the 2nd speed by the engagement of the first clutch C1 and the second brake B2, the 3rd speed by the engagement of the first clutch C1 and the second clutch C2, the 4th speed by the engagement of the first clutch C1 and the third clutch C3, the 5th speed by the engagement of the second clutch C2 and the third clutch C3, the 6th speed by the engagement of the third clutch C3 and the second brake B2, and the reverse speed by the engagement of the second clutch C2 and the first brake B1 (as referred to FIG. 2).

The actions will be described in the following.

[Shifting Actions]

FIG. 14 to FIG. 16 are diagrams showing the torque flows at the individual gear ranges of the automatic transmission gear shift control apparatus of the second embodiment. In FIG. 14 to FIG. 16, the torque transmission routes of clutches, brakes and members are indicated by thick lines, and the torque transmission routes of gears are indicated by hatching them.

Here, the engagement tables of the second embodiment gear shift control apparatus are identical to those of the first embodiment gear shift control apparatus shown in FIG. 2, and the collinear diagrams showing the rotation-stopped state of the members at the individual gear ranges in the second embodiment gear shift control apparatus are identical to those of the first embodiment gear shift control apparatus, as shown in FIG. 3, so that their illustrations and descriptions are omitted.

<1st Speed>

As shown in FIG. 2, the 1st speed is achieved by the engagements of the first clutch C1 and the first brake B1.

In the torque flow at this 1st speed, as shown in FIG. 14(a), the torque is applied to the first clutch C1, the first brake B1 and the individual members, as indicated by the thick lines, and to the first planetary gearset G1, the second planetary gearset G2 and the third planetary gearset G3 (excepting the fourth sun gear S4), as hatched. In short, at the 1st speed, the second planetary gearset G2 and the third planetary gearset G3, as constructing the Ishimaru type planetary gear train, participate in the torque transmission.

<2nd Speed>

As shown in FIG. 2, the 2nd speed is achieved by releasing the first brake B1 at the 1st speed and engaging the second brake B2, that is, by engaging the first clutch C1 and the second brake B2.

In the torque flow at this 2nd speed, as shown in FIG. 4(b), the torque is applied to the first clutch C1, the second brake B2 and the individual members, as indicated by the thick lines, and to the first planetary gearset G1 and the second planetary gearset G2, as hatched. Here, the third planetary gearset G3 functions only as a rotary member but does not participate in the torque transmission in the least.

<3rd Speed>

As shown in FIG. 2, the 3rd speed is achieved by releasing the second brake B2 at the 2nd speed and engaging the second clutch C2, that is, by engaging the first clutch C1 and the second clutch C2.

In the torque flow at this 3rd speed, as shown in FIG. 15(a), the torque is applied to the first clutch C1, the second clutch C2 and the individual members, as indicated by the thick lines, and to the first planetary gearset G1 and the second planetary gearset G2, as hatched. Here in the third planetary gearset G3, the unconstrained third pinion P3 revolves only on its axis and about the two speed-reduced sun gears S3 and S4 in accordance with the output rotation of the third ring gear R3 so that it does not participate in the torque transmission.

<4th Speed>

As shown in FIG. 2, the 4th speed is achieved by releasing the second clutch C2 at the 3rd speed and engaging the third clutch C3, that is, by engaging the first clutch C1 and the third clutch C3.

In the torque flow at this 4th speed, as shown in FIG. 15(b), the torque is applied to the first clutch C1, the third clutch C3 and the individual members, as indicated by the thick lines, and to the first planetary gearset G1, the second planetary gearset G2 and the third planetary gearset G3 (excepting the fourth sun gear S4), as hatched.

<5th Speed>

As shown in FIG. 2, the 5th speed is achieved by releasing the first clutch C1 at the 4th speed and engaging the second clutch C2, that is, by engaging the second clutch C2 and the third clutch C3.

In the torque flow at this 5th speed, as shown in FIG. 5(c), the torque is applied to the second clutch C2, the third clutch C3 and the individual members, as indicated by the thick lines, and to the first planetary gearset G1 and the third planetary gearset G3 (excepting the third sun gear S3), as hatched.

<6th Speed>

As shown in FIG. 2, the 6th speed is achieved by releasing the second clutch C2 at the 5th speed and engaging the second brake B2, that is, by engaging the third clutch C3 and the second brake B2.

In the torque flow at this 6th speed, as shown in FIG. 16(a), the torque is applied to the third clutch C3, the second brake B2 and the individual members, as indicated by the thick lines, and to the third planetary gearset G3 (excepting the fourth sun gear S4), as hatched.

(Reverse Speed)

As shown in FIG. 2, the reverse speed is achieved by engaging the second clutch C2 and the first brake B1.

In the torque flow at this reverse speed, as shown in FIG. 16(b), the torque is applied to the second clutch C2, the first brake B1 and the individual members, as indicated by the thick lines, and to the first planetary gearset G1 and the third planetary gearset G3 (excepting the third sun gear S3), as hatched.

The effects will be described in the following.

As has been described hereinbefore, the automatic transmission gear shift control apparatus of the second embodiment can obtain the following effects in addition to the effects (1), (2), (3) and (5) of the first embodiment gear shift control apparatus.

(6) The automatic transmission gear shift control apparatus comprises the single-pinion type first planetary gearset G1 acting as the speed-reducing device and having the first sun gear S1, the first ring gear R1, and the first carrier PC1 for supporting the first pinion P1 meshing with the two gears S1 and R1; the single-pinion type second planetary gearset G2 having the second sun gear S2, the second ring gear R2, and the second carrier PC2 for supporting the second pinion P2 meshing with the two gears S2 and R2; the double sun gear type third planetary gearset G3 having the two third sun gear S3 and fourth sun gear S4, the center member CM for supporting the third pinion P3 meshing with each of the two sun gears S3 and S4, and one third ring gear R3 meshing with the third pinion P3; the input shaft Input connected to the first ring gear R1; the output gear Output connected to the second carrier PC2; the first connection member M1 for connecting the second sun gear S2 and the third sun gear S3 integrally; the second connection member M2 for connecting the second carrier PC2 and the third ring gear R3 integrally; the first clutch C1 for connecting/disconnecting the first carrier PC1 and the second ring gear R2 selectively; the second clutch C2 for connecting/disconnecting the first carrier PC1 and the fourth sun gear S4 selectively; the third clutch C3 for connecting/disconnecting the input shaft Input and the center member CM selectively; the first brake B1 for stopping the rotation of the center member CM selectively; the second brake B2 for stopping the rotation of the second sun gear S2 selectively; and the hydraulic gear shift control device for achieving the six forward speeds and one reverse speed. At the 1st speed and 2nd speed, therefore, the ring gear input can be achieved for the so-called "Ishimaru type planetary gear train", which is constructed of the second planetary gearset G2 and the third planetary gearset G3, and the automatic transmission can be made compact. At the 2nd speed, the torque circulation disappears so that the transmission efficiency at the 2nd speed can be improved to improve the fuel economy. At the 2nd speed, moreover, the second sun gear S2 of the third planetary gearset G2 is fixed not through the third and fourth sun gears S3 and S4 but directly by the second brake B2 so that the transmission efficiency is enhanced to a higher level than that of the first embodiment apparatus to contribute to an improvement in the fuel economy (corresponding to Claim 9).

Third Embodiment

First of all, the construction will be described in the following.

Figure 17:
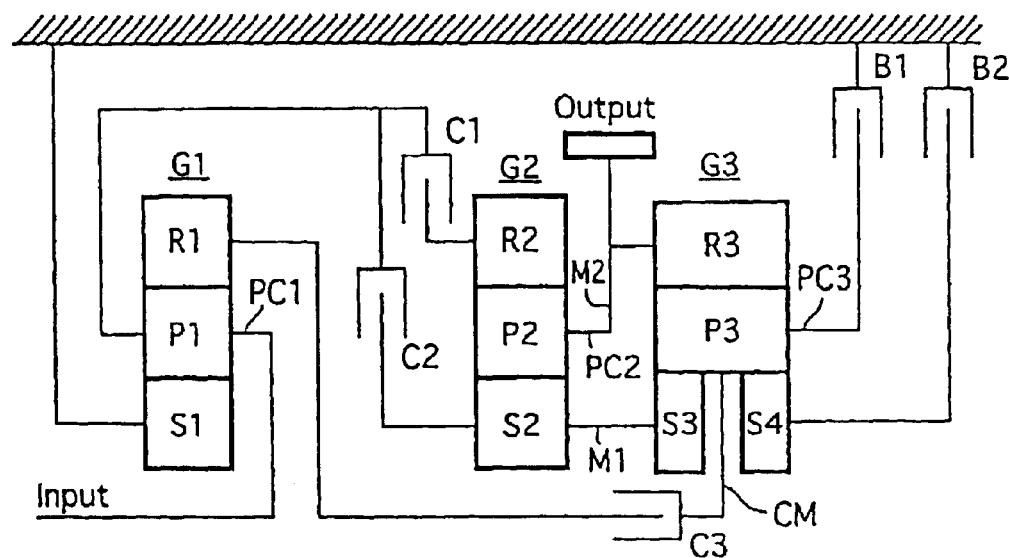
FIG. 17 is a schematic diagram showing a gear shift control apparatus for an automatic transmission of a third embodiment.

The third embodiment is directed to automatic transmission gear shift control apparatus corresponding to inventions defined in Claims 2, 5, 7, 10 and 16, and FIG. 17 is a schematic diagram showing the automatic transmission gear shift control apparatus of the third embodiment.

In FIG. 17: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

The automatic transmission gear shift control apparatus (of a speed-increasing single type 1) of the third embodiment is an example, in which the first planetary gearset G1 of a single-pinion type is positioned as a speed-reducing device at the left-hand end portion of FIG. 17, in which the second planetary gearset G2 of a single-pinion type is positioned at the central portion and in which the third planetary gearset G3 of a double sun gear type is positioned at the right-hand end portion. And, the aforementioned second planetary gearset G2 and third planetary gearset G3 construct the so-called "Ishimaru type planetary gear train".

The aforementioned first planetary gearset G1 is the speed-increasing device, which includes: a first sun gear S1; a first ring gear R1; and a first carrier PC1 for supporting a first pinion P1 meshing with the two gears S1 and R1.

The aforementioned second planetary gearset G2 is the single-pinion type planetary gearset, which includes: a second sun gear S2; a second ring gear R2; and a second carrier PC2 for supporting a second pinion P2 meshing with the two gears S2 and R2.

The aforementioned third planetary gearset G3 is the double sun gear type planetary gearset, which includes: two third sun gear S3 and fourth sun gear S4; a third carrier PC3 and a center member CM for supporting a third pinion P3 meshing individually with the two sun gears S3 and S4; and one third ring gear R3 meshing with the aforementioned third pinion P3.

The aforementioned input shaft Input is connected to the first carrier PC1, and the aforementioned output gear Output is connected to the second carrier PC2.

The aforementioned first connection member M1 connects the second sun gear S2 and the third sun gear S3 integrally, and the aforementioned second connection member M2 connects the second carrier PC2 and the third ring gear R3 integrally.

The aforementioned first clutch C1 connects/disconnects the first carrier PC1 and the second ring gear R2 selectively. The aforementioned second clutch C2 connects/disconnects the first carrier PC1 and the second sun gear S2 selectively. The aforementioned third clutch C3 connects/disconnects the first ring gear R1 and the center member CM selectively.

To the aforementioned individual clutches C1, C2 and C3 and individual brakes B1 and B2, as in the first embodiment, there is connected the hydraulic gear shift control device which establishes the six forward speeds and one reverse speed: the 1st speed by the engagement of the first clutch C1 and the first brake B1, the 2nd speed by the engagement of the first clutch C1 and the second brake B2, the 3rd speed by the engagement of the first clutch C1 and the second clutch C2, the 4th speed by the engagement of the first clutch C1 and the third clutch C3, the 5th speed by the engagement of the second clutch C2 and the third clutch C3, the 6th speed by the engagement of the third clutch C3 and the second brake B2, and the reverse speed by the engagement of the second clutch C2 and the first brake B1 (as referred to FIG. 2).

The actions will be described in the following.

[Shifting Actions]

Figure 18:
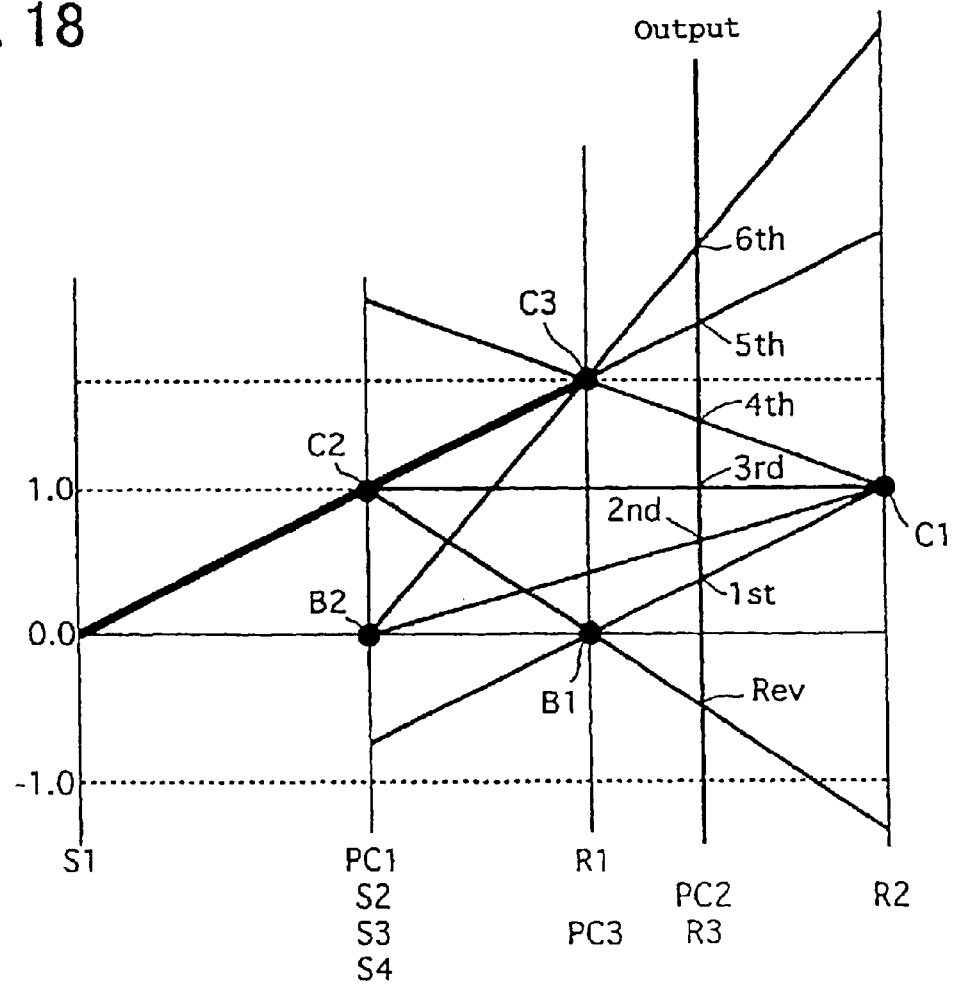
FIG. 18 is a collinear diagram in the automatic transmission gear shift control apparatus of the third embodiment.
Figure 21:
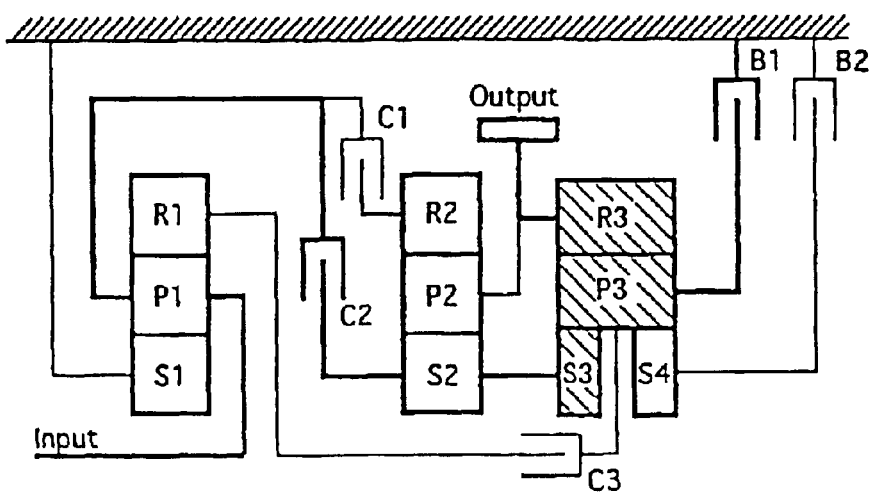
FIG. 21 is a torque flow diagram of the automatic transmission gear shift control apparatus of the third embodiment at a reverse speed.

FIG. 18 is a collinear diagram showing the rotation-stopped states of members at the individual gear ranges in the automatic transmission gear shift control apparatus of the third embodiment. FIG. 19 to FIG. 21 are diagrams showing the torque flows at the individual gear ranges of the automatic transmission gear shift control apparatus of the third embodiment.

Here in FIG. 19 to FIG. 21, the torque transmission routes of clutches, brakes and members are indicated by thick lines, and the torque transmission routes of gears are indicated by hatching them. Here, the engagement tables of the third embodiment gear shift control apparatus are identical to those of the first embodiment gear shift control apparatus shown in FIG. 2, so that their illustrations are omitted.

<1st Speed>

As shown in FIG. 2, the 1st speed is achieved by the engagements of the first clutch C1 and the first brake B1.

At this 1st speed, in the second planetary gearset G2, the input rotation is inputted to the second ring gear R2 by the engagement of the first clutch C1.

In the third planetary gearset G3, on the other hand, the third carrier PC3 is fixed on the case by the engagement of the first brake B1. Therefore, the rotation of the third sun gear S3 is the speed-reduced rotation reversed from the output rotation of the third ring gear R3, and this rotation of the third sun gear S3 is transmitted through the first connection member M1 to the second sun gear S2.

In the second planetary gearset G2, therefore, the forward input rotation is inputted from the second ring gear R2, and the backward speed-reduced rotation is inputted from the second sun gear S2 to the second planetary gearset G2, so that the rotation reduced in speed from the input rotation of the second ring gear R2 is outputted from the second carrier PC2 through the second connection member M2 to the output gear Output.

As shown in the collinear diagram of FIG. 18, more specifically, the 1st speed is defined by the line which joins the engagement point of the first clutch C1 for inputting the input rotation from the input shaft Input to the second ring gear R2 and the engagement point of the first brake B1 for stopping the rotation of the third carrier PC3, and the input rotation of the input shaft Input is reduced in speed and outputted from the output gear Output.

In the torque flow at this 1st speed, as shown in FIG. 19(a), the torque is applied to the first clutch C1, the first brake B1 and the individual members, as indicated by the thick lines, and to the second planetary gearset G2 and the third planetary gearset G3 (excepting the fourth sun gear S4), as hatched. In short, at the 1st speed, the second planetary gearset G2 and the third planetary gearset G3, as constructing the Ishimaru type planetary gear train, participate in the torque transmission.

<2nd Speed>

As shown in FIG. 2, the 2nd speed is achieved by releasing the first brake B1 at the 1st speed and engaging the second brake B2, that is, by engaging the first clutch C1 and the second brake B2.

At this 2nd speed, in the second planetary gearset G2, the input rotation from the first planetary gearset G1 is inputted to the second ring gear R2 by the engagement of the first clutch C1.

In the third planetary gearset G3, on the other hand, the fourth sun gear S4 is fixed on the case by the engagement of the second brake B2. Therefore, the third sun gear S3 connected by the third pinion P3 is fixed. And, the second sun gear S2 connected to the third sun gear S3 through the first connection member M1 is fixed on the case.

In the second planetary gearset G2, therefore, the input rotation of the input shaft Input is inputted from the second ring gear R2 to fix the second sun gear S2, and the rotation reduced to a speed lower than that of the input rotation from the second ring gear R2 is outputted from the second carrier PC2 through the second connection member M2 to the output gear Output.

As shown in the collinear diagram of FIG. 18, more specifically, the 2nd speed is defined by the line which joins the engagement point of the first clutch C1 for inputting the input rotation from the input shaft Input to the second ring gear R2 and the engagement point of the second brake B2 for stopping the rotation of the fourth sun gear S4, and the input rotation of the input shaft Input is reduced to a speed (higher than that of the 1st speed) and outputted from the output gear Output.

In the torque flow at this 2nd speed, as shown in FIG. 19(b), the torque is applied to the first clutch C1, the second brake B2 and the individual members, as indicated by the thick lines, and to the second planetary gearset G2, as hatched. Here in the third planetary gearset G3, the unconstrained third pinion P3 revolves about the two fixed sun gears S3 and S4 in accordance with the output rotation of the third ring gear R3 so that it functions as a rotary member but does not participate in the torque transmission.

<3rd Speed>

As shown in FIG. 2, the 3rd speed is achieved by releasing the second brake B2 at the 2nd speed and engaging the second clutch C2, that is, by engaging the first clutch C1 and the second clutch C2.

At this 3rd speed, the input rotation of the input shaft Input is inputted to the second ring gear R2 by the engagement of the first clutch C1. At the same time, the input rotation of the input shaft Input is inputted to the second sun gear S2 by the engagement of the second clutch C2.

In the second planetary gearset G2, therefore, the same input rotations are inputted from the second ring gear R2 and the second sun gear S2 so that the rotation resulting from the input rotation is outputted from the second carrier PC2 rotating integrally with the two gears R2 and S2, through the second connection member M2 to the output gear Output.

As shown in the collinear diagram of FIG. 18, more specifically, the 3rd speed is defined by the line which joins the engagement point of the first clutch C1 for inputting the input rotation from the input shaft Input to the second ring gear R2 and the engagement point of the second clutch C2 for inputting the input rotation from the input shaft Input to the second sun gear S2, and the same rotation (i.e., the direct-engagement rotation) as the input rotation of the input shaft Input is outputted from the output gear Output.

In the torque flow at this 3rd speed, as shown in FIG. 19(c), the torque is applied to the first clutch C1, the second clutch C2 and the individual members, as indicated by the thick lines, and to the second planetary gearset G2, as hatched. In short, the first planetary gearset G1 and the third planetary gearset G3 do not participate in the torque transmission in the least.

<4th Speed>

As shown in FIG. 2, the 4th speed is achieved by releasing the second clutch C2 at the 3rd speed and engaging the third clutch C3, that is, by engaging the first clutch C1 and the third clutch C3.

At this 4th speed, the input rotation of the input shaft Input is inputted to the second ring gear R2 by the engagement of the first clutch C1.

In the third planetary gearset G3, on the other hand, by the engagement of the third clutch C3, the rotation increased in speed from the input rotation of the input shaft Input is inputted through the center member CM to the third carrier PC3. Therefore, the rotation of the third sun gear S3 is increased to a higher speed of the rotation of the third carrier PC3, and this speed-increased rotation of the third sun gear S3 is transmitted through the first connection member M1 to the second sun gear S2.

In the second planetary gearset G2, therefore, the input rotation is inputted from the second ring gear R2, and the speed-increased rotation is inputted from the second sun gear S2, so that the rotation increased in speed from the input rotation of the second ring gear R2 is outputted from the second carrier PC2 through the second connection member M2 to the output gear Output.

As shown in the collinear diagram of FIG. 18, more specifically, the 4th speed is defined by the line which joins the engagement point of the first clutch C1 for inputting the input rotation from the input shaft Input to the second ring gear R2 and the engagement point of the third clutch C3 for using the input rotation to the third carrier PC3 as the speed-increased rotation of the second sun gear S2, and the rotation inputted from the input shaft Input is increased in speed and outputted from the output gear Output.

In the torque flow at this 4th speed, as shown in FIG. 20(a), the torque is applied to the first clutch C1, the third clutch C3 and the individual members, as indicated by the thick lines, and to the first planetary gearset G1, the second planetary gearset G2 and the third planetary gearset G3 (excepting the fourth sun gear S4), as hatched.

<5th Speed>

As shown in FIG. 2, the 5th speed is achieved by releasing the first clutch C1 at the 4th speed and engaging the second clutch C2, that is, by engaging the second clutch C2 and the third clutch C3.

At this 5th speed, the input rotation from of the input shaft Input is inputted to the third sun gear S3 through the first carrier PC1→the second clutch C2→the second sun gear S2→the first connection member M1 by the engagement of the second clutch C2.

By the engagement of the third clutch C3, on the other hand, the rotation increased in speed at the first planetary gearset G1 from the input rotation of the input shaft Input is inputted through the first ring gear R1→the third clutch C3→the center member CM to the third carrier PC3.

In the third planetary gearset G3, therefore, the speed-increased rotation is inputted to the third carrier PC3, and the input rotation is inputted to the third sun gear S3, so that the rotation increased to a higher speed than that of the input rotation is outputted from the second carrier PC2 through the second connection member M2 to the output gear Output.

As shown in the collinear diagram of FIG. 18, more specifically, the 5th speed is defined by the line which joins the engagement point of the second clutch C2 for inputting the rotation of the third sun gear S3 and the engagement point of the third clutch C3 for increasing the rotation of the third carrier PC3, and the rotation inputted from the input shaft Input is increased in speed and outputted from the output gear Output.

In the torque flow at this 5th speed, as shown in FIG. 20(b), the torque is applied to the second clutch C2, the third clutch C3 and the individual members, as indicated by the thick lines, and to the first planetary gearset G1 and the third planetary gearset G3 (excepting the fourth sun gear S4), as hatched.

(6th Speed)

As shown in FIG. 2, the 6th speed is achieved by releasing the second clutch C2 at the 5th speed and engaging the second brake B2, that is, by engaging the third clutch C3 and the second brake B2.

At this 6th speed, the speed-increased rotation at the first planetary gearset G1 from the input rotation from the input shaft Input is inputted to the third carrier PC3 through the first ring gear R→the third clutch C3→the center member CM by the engagement of the third clutch C3. By the engagement of the second brake B2, moreover, the fourth sun gear S4 of the third planetary gearset G3 is fixed on the case.

In the third planetary gearset G3, therefore, the speed-increased rotation is inputted to the third carrier PC3, and the fourth sun gear S4 is fixed on the case, so that so that the rotation increased to a higher speed than that of the input rotation is outputted from the second carrier PC2 through the second connection member M2 to the output gear Output.

As shown in the collinear diagram of FIG. 18, more specifically, the 6th speed is defined by the line which joins the engagement point of the third clutch C3 for increasing the speed of the rotation of the third carrier PC3 and the engagement point of the second brake B2 for fixing the fourth sun gear S4 on the case, and the rotation inputted from the input shaft Input is increased in speed and outputted from the output gear Output.

In the torque flow at this 6th speed, as shown in FIG. 20(c), the torque is applied to the third clutch C3, the second brake B2 and the individual members, as indicated by the thick lines, and to the first planetary gearset G1 and the third planetary gearset G3 (excepting the third sun gear S3), as hatched.

(Reverse Speed)

As shown in FIG. 2, the reverse speed is achieved by engaging the second clutch C2 and the first brake B1.

At this reverse speed, the input rotation from the input shaft Input is inputted through the first carrier PC1→the second clutch C2→the second sun gear S2→the first connection member M1 to the third sun gear S3 by the engagement of the second clutch C2. By the engagement of the first brake B1, moreover, the third carrier PC3 is fixed on the case.

In the third planetary gearset G3, therefore, the input rotation is inputted to the third sun gear S3, and the third carrier PC3 is fixed on the case, so that the speed-reduced backward rotation is outputted from the third ring gear R3 through the second connection member M2 to the output gear Output.

As shown in the collinear diagram of FIG. 18, more specifically, the reverse speed is defined by the line which joins the engagement point of the second clutch C2 for inputting the input rotation from the input shaft Input to the third sun gear S3 and the engagement point of the first brake B1 for stopping the rotation of the third carrier PC3, and the rotation inputted from the input shaft Input is reduced backward in speed and outputted from the output gear Output.

In the torque flow at this reverse speed, as shown in FIG. 21, the torque is applied to the second clutch C2, the first brake B1 and the individual members, as indicated by the thick lines, and to the third planetary gearset G3 (excepting the fourth sun gear S4), as hatched.

The effects will be described in the following.

As has been described hereinbefore, the automatic transmission gear shift control apparatus of the third embodiment can obtain the effects to be enumerated in the following, in addition to the effects (3) and (5) of the first embodiment.

(7) In a gear shift control apparatus for an automatic transmission comprising an input shaft Input for inputting a rotation from a drive source; an output gear Output for outputting a shifted-gear rotation; three sets of planetary gearsets G1, G2 and G3; a plurality of members M1 and M2 for connecting a plurality of rotary elements integrally; three selectively connecting/disconnecting clutches C1, C2 and C3 and two selectively fixing brakes B1 and B2 positioned between respective rotary elements of the input shaft Input, the output gear Output, the connection members M1 and M2 and the three planetary gearsets G1, G2 and G3, and a gear shift control means for achieving at least six forward speeds and one reverse speed by engaging/releasing the three clutches C1, C2 and C3 and two brakes B1 and B2 properly, one planetary gearset G1 of the three planetary gearsets G1, G2 and G3 is a speed-increasing device for speed-increasing the input rotation always, and one planetary gearset G3 of the remaining two planetary gearsets G2 and G3 is a double sun gear type planetary gearset including: two sun gears S3 and S4; a pinion P3 meshing individually with the two sun gears S3 and S4; a carrier having a center member CM positioned between the two sun gears S3 and S4 for inputting or outputting a rotation; and one ring gear R3 meshing with the pinion P3. Therefore, the automatic transmission gear shift control apparatus can enhance the degree of freedom for selecting the gear ratio to a higher level than that of the case using the Ravigneaux type composite planetary gear train, while achieving the strength advantage of the gear train constructed of the two planetary gearsets G2 and G3, the advantage such as the gear strength or the gear lifetime of the gear train constructed of the two planetary gearsets G2 and G3, the improvement in the fuel economy by eliminating the torque circulation, the coaxial positioning of the input shaft Input and the output gear Output, and the size reduction of the automatic transmission altogether.

In addition, one planetary gearset G1 is exemplified by the speed-increasing device for increasing the speed of the input rotation always, so that the gear ratio range can be further made wider to the higher gear range than those of the first and second embodiments having the speed-reducing device, thereby to improve the degree of freedom for selecting the gear ratio and to enhance the degree of freedom for the design (corresponding to Claim 2).

(8) The first planetary gearset G1 acting as the speed-reducing device is a single-pinion type planetary gearset. Therefore, the gear noise and the parts number can be reduced while improving the transmission efficiency and the fuel economy (corresponding to Claim 5).

(9) The automatic transmission gear shift control apparatus comprises the single-pinion type first planetary gearset G1 acting as the speed-increasing device and having the first sun gear S1, the first ring gear R1, and the first carrier PC1 for supporting the first pinion P1 meshing with the two gears S1 and R1; the single-pinion type second planetary gearset G2 having the second sun gear S2, the second ring gear R2, and the second carrier PC2 for supporting the second pinion P2 meshing with the two gears S2 and R2; the double sun gear type third planetary gearset G3 having the two third sun gear S3 and fourth sun gear S4, the third carrier PC3 and the center member CM for supporting the third pinion P3 meshing individually with the two sun gears S3 and S4, and one third ring gear R3 meshing with the third pinion P3; the input shaft Input connected to the first carrier PC1; the output gear Output connected to the second carrier PC2; the first connection member M1 for connecting the second sun gear S2 and the third sun gear S3 integrally; the second connection member M2 for connecting the second carrier PC2 and the third ring gear R3 integrally; the first clutch C1 for connecting/disconnecting the first carrier PC1 and the second ring gear R2 selectively; the second clutch C2 for connecting/disconnecting the first carrier PC1 and the second sun gear S2 selectively; the third clutch C3 for connecting/disconnecting the first ring gear R1 and the center member CM selectively; the first brake B1 for stopping the rotation of the third carrier PC3 selectively; the second brake B2 for stopping the rotation of the fourth sun gear S4 selectively, and the hydraulic gar shift control device for achieving the six forward speeds and one reverse speed. At the 1st speed and 2nd speed, therefore, the ring gear input can be achieved for the so-called "Ishimaru type planetary gear train", which is constructed of the second planetary gearset G2 and the third planetary gearset G3, and the automatic transmission can be made compact. At the 2nd speed, moreover, the torque circulation can be eliminated to improve the transmission efficiency at the 2nd speed and the fuel economy (corresponding to Claim 10).

Fourth Embodiment

First of all, the construction will be described in the following.

The fourth embodiment is directed to automatic transmission gear shift control apparatus corresponding to inventions defined in Claims 2, 5, 7, 11, and 16, and FIG. 22 is asthmatic diagram showing the automatic transmission gear shift control apparatus of the fourth embodiment.

In FIG. 22: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

The automatic transmission gear shift control apparatus (of a speed-increasing single type 2) of the fourth embodiment is an example, in which the first planetary gearset G1 of a single-pinion type is positioned as a speed-reducing device at the left-hand end portion of FIG. 22, in which the third planetary gearset G3 of a double sun gear type is positioned at the central portion and in which the second planetary gearset G2 of a single-pinion type is positioned at the right-hand end portion. And, the aforementioned second planetary gearset G2 and third planetary gearset G3 construct the so-called "Ishimaru type planetary gear train".

The aforementioned first planetary gearset G1 is the speed-increasing device, which includes: a first sun gear S1; a first ring gear R1; and a first carrier PC1 for supporting a first pinion P1 meshing with the two gears S1 and R1.

The aforementioned second planetary gearset G2 is the single-pinion type planetary gearset, which includes: a second sun gear S2; a second ring gear R2; and a second carrier PC2 for supporting a second pinion P2 meshing with the two gears S2 and R2.

The aforementioned third planetary gearset G3 is the double sun gear type planetary gearset, which includes: two third sun gear S3 and fourth sun gear S4; a third carrier PC3 and a center member CM for supporting a third pinion P3 meshing individually with the two sun gears S3 and S4; and one third ring gear R3 meshing with the aforementioned third pinion P3.

The aforementioned input shaft Input is connected to the first carrier PC1, and the aforementioned output gear Output is connected to the second carrier PC2.

The aforementioned first connection member M1 connects the second sun gear S2 and the third sun gear S3 integrally, and the aforementioned second connection member M2 connects the second carrier PC2 and the third ring gear R3 integrally.

The aforementioned first clutch C1 connects/disconnects the first carrier PC1 and the second ring gear R2 selectively. The aforementioned second clutch C2 connects/disconnects the first carrier PC1 and the second sun gear S2 selectively.

The aforementioned third clutch C3 connects/disconnects the first ring gear R1 and the center member CM selectively.

To the aforementioned individual clutches C1, C2 and C3 and individual brakes B1 and B2, as in the first embodiment, there is connected the hydraulic gear shift control device which establishes the six forward speeds and one reverse speed: the 1st speed by the engagement of the first clutch C1 and the first brake B1, the 2nd speed by the engagement of the first clutch C1 and the second brake B2, the 3rd speed by the engagement of the first clutch C1 and the second clutch C2, the 4th speed by the engagement of the first clutch C1 and the third clutch C3, the 5th speed by the engagement of the second clutch C2 and the third clutch C3, the 6th speed by the engagement of the third clutch C3 and the second brake B2, and the reverse speed by the engagement of the second clutch C2 and the first brake B1 (as referred to FIG. 2).

The actions will be described in the following.
[Shifting Actions]

FIG. 23 to FIG. 25 are diagrams showing the torque flows at the individual gear ranges of the automatic transmission gear shift control apparatus of the fourth embodiment. In FIG. 23 to FIG. 25, the torque transmission routes of clutches, brakes and members are indicated by thick lines, and the torque transmission routes of gears are indicated by hatching them.

Here, the collinear diagrams showing the rotation-stopped state of the members at the individual gear ranges in the fourth embodiment gear shift control apparatus are identical to those of the third embodiment gear shift control apparatus, as shown in FIG. 18, so that their illustrations are omitted. The engagement tables of the fourth embodiment gear shift control apparatus are identical to those of the first embodiment gear shift control apparatus shown in FIG. 2, so that their illustrations are omitted.

<1st Speed>

As shown in FIG. 2, the 1st speed is achieved by the engagements of the first clutch C1 and the first brake B1.

In the torque flow at this 1st speed, as shown in FIG. 23(a), the torque is applied to the first clutch C1, the first brake B1 and the individual members, as indicated by the thick lines, and to the second planetary gearset G2 and the third planetary gearset G3 (excepting the fourth sun gear S4), as hatched. In short, at the 1st speed, the second planetary gearset G2 and the third planetary gearset G3, as constructing the Ishimaru type planetary gear train, participate in the torque transmission.

<2nd Speed>

As shown in FIG. 2, the 2nd speed is achieved by releasing the first brake B1 at the 1st speed and engaging the second brake B2, that is, by engaging the first clutch C1 and the second brake B2.

In the torque flow at this 2nd speed, as shown in FIG. 23(b), the torque is applied to the first clutch C1, the second brake B2 and the individual members, as indicated by the thick lines, and to the second planetary gearset G2, as hatched. Here, the first planetary gearset G1 and the third planetary gearset G3 do not participate in the torque transmission in the least.

<3rd Speed>

As shown in FIG. 2, the 3rd speed is achieved by releasing the second brake B2 at the 2nd speed and engaging the second clutch C2, that is, by engaging the first clutch C1 and the second clutch C2.

In the torque flow at this 3rd speed, as shown in FIG. 24(a), the torque is applied to the first clutch C1, the second clutch C2 and the individual members, as indicated by the thick lines, and to the second planetary gearset G2, as hatched. Specifically, the first planetary gearset G1 and the third planetary gearset G3 do not participate in the torque transmission in the least.

<4th Speed>

As shown in FIG. 2, the 4th speed is achieved by releasing the second clutch C2 at the 3rd speed and engaging the third clutch C3, that is, by engaging the first clutch C1 and the third clutch C3.

In the torque flow at this 4th speed, as shown in FIG. 24(b), the torque is applied to the first clutch C1, the third clutch C3 and the individual members, as indicated by the thick lines, and to the first planetary gearset G1, the second planetary gearset G2 and the third planetary gearset G3 (excepting the fourth sun gear S4), as hatched.

<5th Speed>

As shown in FIG. 2, the 5th speed is achieved by releasing the first clutch C1 at the 4th speed and engaging the second clutch C2, that is, by engaging the second clutch C2 and the third clutch C3.

In the torque flow at this 5th speed, as shown in FIG. 24(c), the torque is applied to the second clutch C2, the third clutch C3 and the individual members, as indicated by the thick lines, and to the first planetary gearset G1 and the third planetary gearset G3 (excepting the fourth sun gear S4), as hatched.

(6th Speed)

As shown in FIG. 2, the 6th speed is achieved by releasing the second clutch C2 at the 5th speed and engaging the second brake B2, that is, by engaging the third clutch C3 and the second brake B2.

In the torque flow at this 6th speed, as shown in FIG. 25(a), the torque is applied to the third clutch C3, the second brake B2 and the individual members, as indicated by the thick lines, and to the first planetary gearset G1 and the third planetary gearset G3 (excepting the third sun gear S3), as hatched.

(Reverse Speed)

As shown in FIG. 2, the reverse speed is achieved by engaging the second clutch C2 and the first brake B1.

In the torque flow at this reverse speed, as shown in FIG. 25(b), the torque is applied to the second clutch C2, the first brake B1 and the individual members, as indicated by the thick lines, and to the third planetary gearset G3 (excepting the third sun gear S3), as hatched.

The effects will be described in the following.

As has been described hereinbefore, the automatic transmission gear shift control apparatus of the fourth embodiment can obtain the following effects in addition to the effect (3) and (5) of the first embodiment and the effects (7) and (8) of the third embodiment.

(10) The automatic transmission gear shift control apparatus comprises the single-pinion type first planetary gearset G1 acting as the speed-increasing device having the first sun gear S1, the first ring gear R1, and the first carrier PC1 for supporting the first pinion P1 meshing with the two gears S1 and R1; the single-pinion type second planetary gearset G2 having the second sun gear S2, the second ring gear R2, and the second carrier PC2 for supporting the second pinion P2 meshing with the two gears S2 and R2; the double sun gear type third planetary gearset G3 having the two third sun gear S3 and fourth sun gear S4, the center member CM for supporting the third pinion P3 meshing individually with the two sun gears S3 and S4, and one third ring gear R3 meshing with the third pinion P3; the input shaft Input connected to the first carrier PC1; the output gear Output connected to the second carrier PC2; the first connection member M1 for connecting the second sun gear S2 and the third sun gear S3 integrally; the second connection member M2 for connecting the second carrier PC2 and the third ring gear R3 integrally; the first clutch C1 for connecting/disconnecting the first carrier PC1 and the second ring gear R2 selectively; the second clutch C2 for connecting/disconnecting the first carrier PC1 and the second sun gear S2 selectively; the third clutch C3 for connecting/disconnecting the first ring gear R1 and the center member CM selectively; the first brake B1 for stopping the rotation of the center member CM selectively; the second brake B2 for stopping the rotation of the second sun gear S2 selectively, and the hydraulic gear shift control device for achieving the six forward speeds and one reverse speed. At the 1st speed and 2nd speed, therefore, the ring gear input can be achieved for the so-called "Ishimaru type planetary gear train", which is constructed of the second planetary gearset G2 and the third planetary gearset G3, and the automatic transmission can be made compact. At the 2nd speed, moreover, the torque circulation can be eliminated to improve the transmission efficiency at the 2nd speed and the fuel economy.

Moreover, the second sun gear S2 of the second planetary gearset G2 is fixed not through the third and fourth sun gears S3 and S4 but directly by the second brake B2 so that the transmission efficiency of the gear is higher than that of the speed-increasing single-pinion type 1 of the third embodiment to contribute to an improvement in the fuel economy (corresponding to Claim 11).

Fifth Embodiment

The fifth embodiment is directed to automatic transmission gear shift control apparatus corresponding to inventions defined in Claims 1, 4, 7, 12 and 16. Here will be described the 5-1st embodiment, the 5-2nd embodiment and the 5-3rd embodiment of different types.

5-1st Embodiment

First of all, the construction will be described in the following.

Figure 26:
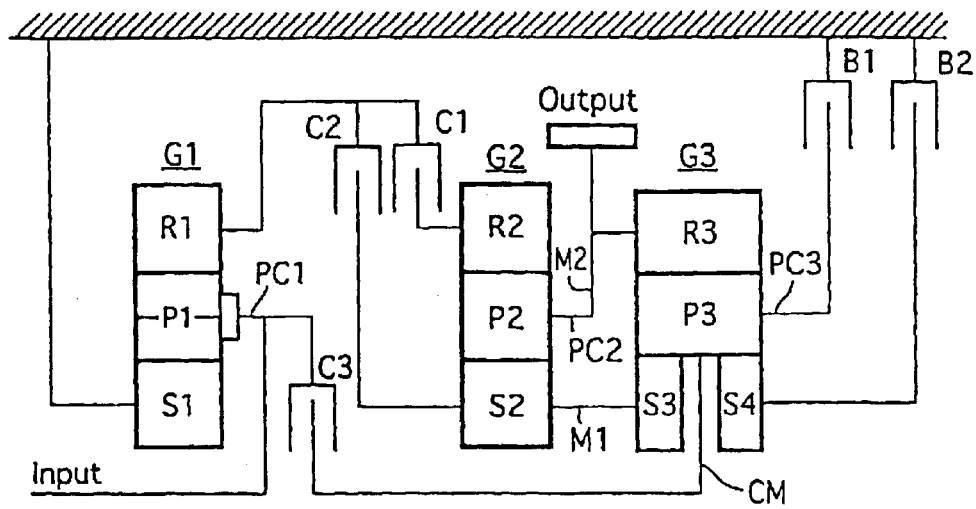
FIG. 26 is a schematic diagram showing a gear shift control apparatus for an automatic transmission of a 5-1st embodiment.

FIG. 26 is a schematic diagram showing the automatic transmission gear shift control apparatus of the 5-1st embodiment.

In FIG. 26: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

The automatic transmission gear shift control apparatus (of a speed-reducing double type 1) of the 5-1st embodiment is an example, in which the first planetary gearset G1 of a double-pinion type is positioned as a speed-reducing device at the left-hand end portion of FIG. 26, in which the second planetary gearset G2 of a single-pinion type is positioned at the central portion and in which the third planetary gearset G3 of a double sun gear type is positioned at the right-hand end portion. And, the aforementioned second planetary gearset G2 and third planetary gearset G3 construct the so-called "Ishimaru type planetary gear train".

The aforementioned first planetary gearset G1 is the double-pinion type planetary gearset acting as the speed-reducing device, which includes: a first sun gear S1; a first ring gear R1; and a first carrier PC1 for supporting a first double pinions P1 meshing with the two gears S1 and R1.

The aforementioned second planetary gearset G2 is the single-pinion type planetary gearset, which includes: a second sun gear S2; a second ring gear R2; and a second carrier PC2 for supporting a second pinion P2 meshing with the two gears S2 and R2.

The aforementioned third planetary gearset G3 is the double sun gear type planetary gearset, which includes: two third sun gear S3 and fourth sun gear S4; a third pinion P3 meshing individually with the third and fourth sun gears S3 and S4; an axial third carrier PC3 for supporting the third pinion P3; a center member CM connected to the third carrier PC3 and positioned between the aforementioned two sun gears S3 and S4; and one third ring gear R3 meshing with the aforementioned third pinion P3.

The aforementioned input shaft Input is connected to the first carrier PC1 and receives a rotational driving force from the not-shown engine or driving source through a torque converter or the like.

The aforementioned output gear Output is connected to the second carrier PC2 and transmits the outputted rotational driving force to driven wheels through the not-shown final gear or the like.

The aforementioned first connection member M1 connects the second sun gear S2 and the third sun gear S3 integrally. The aforementioned second connection member M2 connects the second carrier PC2 and the third ring gear R3 integrally.

The aforementioned first clutch C1 is the clutch for connecting/disconnecting the first ring gear R1 and the second ring gear R2 selectively. The aforementioned second clutch C2 is the clutch for connecting/disconnecting the first ring gear R1 and the second sun gear S2 selectively. The aforementioned third clutch C3 is the clutch for connecting/disconnecting the input shaft Input and the center member CM selectively.

The aforementioned first brake B1 is the brake for stopping the rotation of the third carrier PC3 selectively. The aforementioned second brake B2 is the brake for stopping the rotation of the fourth sun gear S4 selectively.

To the aforementioned individual clutches C1, C2 and C3 and individual brakes B1 and B2, there is connected the not-shown hydraulic gear shift control device (or gear shift control means) for establishing engagement pressures (with circle symbols) and release pressures (with no symbol) at individual speed ranges, as shown in an engagement table of FIG. 2. As the hydraulic gear shift control device, here is adopted the hydraulic control type, the electronic control type, the hydraulic+electronic control type or the like.

The actions will be described in the following.

[Shifting Actions]

Figure 27:
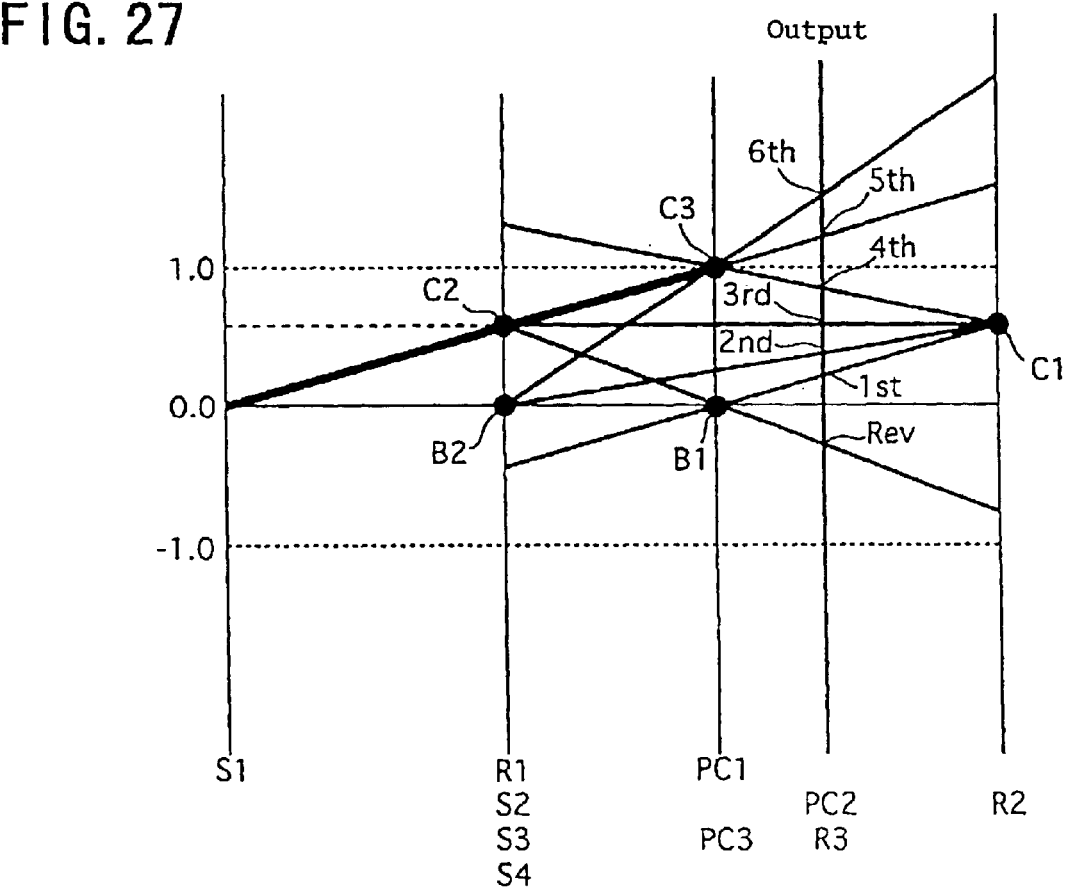
FIG. 27 is a collinear diagram in the automatic transmission gear shift control apparatus of the 5-1st embodiment.
Figure 30:
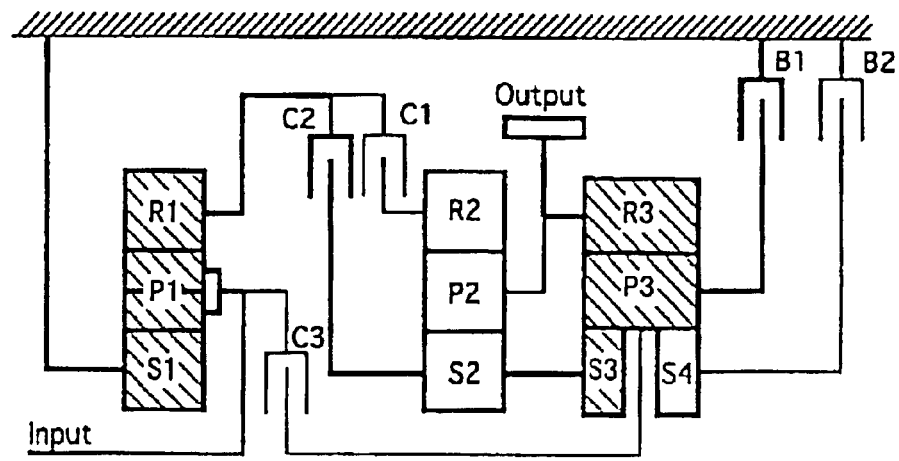
FIG. 30 is a torque flow diagram of the automatic transmission gear shift control apparatus of the 5-1st embodiment at a reverse speed.

FIG. 27 is a collinear diagram showing the rotation-stopped states of members at the individual gear ranges in the automatic transmission gear shift control apparatus of the fifth embodiment. FIG. 28 to FIG. 30 are diagrams showing the torque flows at the individual gear ranges of the automatic transmission gear shift control apparatus of the 5-1st embodiment.

Here in FIG. 28 to FIG. 30, the torque transmission routes of clutches, brakes and members are indicated by thick lines, and the torque transmission routes of gears are indicated by hatching them.

<1st Speed>

As shown in FIG. 2, the 1st speed is achieved by the engagements of the first clutch C1 and the first brake B1.

At this 1st speed, in the second planetary gearset G2, the input rotation reduced in speed by the first planetary gearset G1 is inputted to the second ring gear R2 of the second planetary gearset G2 by the engagement of the first clutch C1.

In the third planetary gearset G3, on the other hand, the third carrier PC3 is fixed on the case by the engagement of the first brake B1. Therefore, the third planetary gearset G3 has its carrier fixed with the ring gear input so that the rotation of the third sun gear S3 is reduced in speed and reversed. This speed-reduced and reversed rotation of the third sun gear S3 is transmitted through the first connection member M1 to the second sun gear S2.

Therefore, the forward speed-reduced rotation is inputted from the second ring gear R2, and the backward speed-reduced rotation is inputted from the second sun gear S2 to the second planetary gearset G2, so that the rotation further reduced in speed from the speed-reduced rotation of the second ring gear R2 is outputted from the second carrier PC2 through the second connection member M2 to the output gear Output.

As shown in the collinear diagram of FIG. 27, more specifically, the 1st speed is defined by the line which joins the engagement point of the first clutch C1 for inputting the speed-reduced rotation from the first planetary gearset G1 to the second ring gear R2 and the engagement point of the first brake B1 for stopping the rotation of the third carrier PC3, and the rotation inputted from the input shaft Input is reduced in speed and outputted from the output gear Output.

In the torque flow at this 1st speed, as shown in FIG. 28($a$), the torque is applied to the first clutch C1, the first brake B1 and the individual members, as indicated by the thick lines, and to the first planetary gearset G1, the second planetary gearset G2 and the third planetary gearset G3 (excepting the fourth sun gear S4), as hatched. In short, at the 1st speed, the first planetary gearset G1, and the second planetary gearset G2 and the third planetary gearset G3, as constructing the Ishimaru type planetary gear train, participate in the torque transmission.

<2nd Speed>

As shown in FIG. 2, the 2nd speed is achieved by releasing the first brake B1 at the 1st speed and engaging the second brake B2, that is, by engaging the first clutch C1 and the second brake B2.

At this 2nd speed, in the second planetary gearset G2, the input rotation reduced in speed by the first planetary gearset G1 is inputted to the second ring gear R2 of the second planetary gearset G2 by the engagement of the first clutch C1.

In the third planetary gearset G3, on the other hand, the fourth sun gear S4 is fixed on the case by the engagement of the second brake B2. Therefore, the third sun gear S3 connected by the third pinion P3 is fixed, and the second sun gear S2 connected to the third sun gear S3 through the first connection member M1 is fixed on the case.

In the second planetary gearset G2, therefore, the forward speed-reduced rotation is inputted from the second ring gear R2 to fix the second sun gear S2, and the rotation further reduced to a speed lower than that of the speed-reduced rotation from the second ring gear R2 is outputted from the second carrier PC2 through the second connection member M2 to the output gear Output.

As shown in the collinear diagram of FIG. 27, more specifically, the 2nd speed is defined by the line which joins the engagement point of the first clutch C1 for inputting the speed-reduced rotation from the first planetary gearset G1 to the second ring gear R2 and the engagement point of the second brake B2 for stopping the rotation of the fourth sun gear S4, and the rotation inputted from the input shaft Input is reduced to a speed (higher than that of the 1st speed) and outputted from the output gear Output.

In the torque flow at this 2nd speed, as shown in FIG. 28($b$), the torque is applied to the first clutch C1, the second brake B2 and the individual members, as indicated by the thick lines, and to the first planetary gearset G1 and the second planetary gearset G2, as hatched. Here in the third planetary gearset G3, the unconstrained third pinion P3 revolves about the two fixed sun gears S3 and S4 in accordance with the output rotation of the third ring gear R3 so that it functions as a rotary member but does not participate in the torque transmission.

<3rd Speed>

As shown in FIG. 2, the 3rd speed is achieved by releasing the second brake B2 at the 2nd speed and engaging the second clutch C2, that is, by engaging the first clutch C1 and the second clutch C2.

At this 3rd speed, in the second planetary gearset G2, the input rotation reduced in speed by the first planetary gearset G1 is inputted to the second ring gear R2 of the second planetary gearset G2 by the engagement of the first clutch C1. At the same time, the input rotation reduced in speed by the first planetary gearset G1 is inputted to the second sun gear S2 of the second planetary gearset G2 by the engagement of the second clutch C2.

In the second planetary gearset G2, therefore, the same speed-reduced rotations are inputted from the second ring gear R2 and the second sun gear S2 so that the speed-reduced rotation (=the speed-reduced rotation of the first planetary gearset G1) is outputted from the second carrier PC2 rotating integrally with the two gears R2 and S2, through the second connection member M2 to the output gear Output.

As shown in the collinear diagram of FIG. 27, more specifically, the 3rd speed is defined by the line which joins the engagement point of the first clutch C1 for inputting the speed-reduced rotation from the first planetary gearset G1 to the second ring gear R2 and the engagement point of the second clutch C2 for inputting the speed-reduced rotation from the first planetary gearset G1 to the second sun gear S2, and the rotation inputted from the input shaft Input is reduced at a ratio (=the reduction ratio of the first planetary gearset G1) and outputted from the output gear Output.

In the torque flow at this 3rd speed, as shown in FIG. 28(c), the torque is applied to the first clutch C1, the second clutch C2 and the individual members, as indicated by the thick lines, and to the first planetary gearset G1 and the second planetary gearset G2, as hatched. In short, the third planetary gearset G3 does not participate in the torque transmission in the least.

<4th Speed>

As shown in FIG. 2, the 4th speed is achieved by releasing the second clutch C2 at the 3rd speed and engaging the third clutch C3, that is, by engaging the first clutch C1 and the third clutch C3.

At this 4th speed, in the second planetary gearset G2, the input rotation reduced in speed by the first planetary gearset G1 is inputted to the second ring gear R2 of the second planetary gearset G2 by the engagement of the first clutch C1.

In the third planetary gearset G3, on the other hand, the input rotation from the input shaft Input is inputted through the center member CM to the third carrier PC3 by the engagement of the third clutch C3. Therefore, the rotation of the third sun gear S3 is increased to a higher speed than that of the input rotation, and this speed-increased rotation of the third sun gear S3 is transmitted through the first connection member M1 to the second sun gear S2.

In the second planetary gearset G2, therefore, the speed-reduced rotation is inputted from the second ring gear R2 and the speed-increased rotation is inputted from the second sun gear S2, so that the rotation (at a lower speed than that of the input rotation) increased in speed from the speed-reduced rotation of the second ring gear R2 is outputted from the second carrier PC2 through the second connection member M2 to the output gear-Output.

As shown in the collinear diagram of FIG. 27, more specifically, the 4th speed is defined by the line which joins the engagement point of the first clutch C1 for inputting the speed-reduced rotation from the first planetary gearset G1 to the second ring gear R2 and the engagement point of the third clutch C3 for inputting the rotation of the third carrier PC3, and the rotation inputted from the input shaft Input is slightly reduced in speed and outputted from the output gear Output.

In the torque flow at this 4th speed, as shown in FIG. 29(a), the torque is applied to the first clutch C1, the third clutch C3 and the individual members, as indicated by the thick lines, and to the first planetary gearset G1, the second planetary gearset G2 and the third planetary gearset G3 (excepting the fourth sun gear S4), as hatched.

<5th Speed>

As shown in FIG. 2, the 5th speed is achieved by releasing the first clutch C1 at the 4th speed and engaging the second clutch C2, that is, by engaging the second clutch C2 and the third clutch C3.

At this 5th speed, the speed-reduced rotation from the first planetary gearset G1 is inputted through the second sun gear S2 of the second planetary gearset G2 and the first connection member M1 to the third ring gear S3 by the engagement of the second clutch C2. At the same time, the input rotation from the input shaft Input is inputted through the center member CM to the third carrier PC3 by the engagement of the third clutch C3.

In the third planetary gearset G3, therefore, the input rotation is inputted to the third carrier PC3, and the speed-reduced rotation from the first planetary gearset G1 is inputted to the third sun gear S3, so that the rotation increased to a higher speed than that of the input rotation is outputted from the third ring gear R3 through the second connection member M2 to the output gear Output.

As shown in the collinear diagram of FIG. 27, more specifically, the 5th speed is defined by the line which joins the engagement point of the second clutch C2 for inputting the speed-reduced rotation from the first planetary gearset G1 to the third sun gear S3 and the engagement point of the third clutch C3 for inputting the rotation of the third carrier PC3, and the rotation inputted from the input shaft Input is slightly increased in speed and outputted from the output gear Output.

In the torque flow at this 5th speed, as shown in FIG. 29(b), the torque is applied to the second clutch C2, the third clutch C3 and the individual members, as indicated by the thick lines, and to the first planetary gearset G1 and the third planetary gearset G3 (excepting the fourth sun gear S4), as hatched.

(6th Speed)

As shown in FIG. 2, the 6th speed is achieved by releasing the second clutch C2 at the 5th speed and engaging the second brake B2, that is, by engaging the third clutch C3 and the second brake B2.

At this 6th speed, the input rotation of the input shaft Input is inputted through the center member CM of the third planetary gearset G3 to the third carrier PC3 by the engagement of the third clutch C3. Moreover, the fourth sun gear S4 of the third planetary gearset G3 is fixed on the case by the engagement of the second brake B2.

In the third planetary gearset G3, therefore, the input rotation is inputted to the third carrier PC3, and the fourth sun gear S4 is fixed on the case, so that the rotation increased to a higher speed than that of the input rotation from the input shaft Input is outputted from the second carrier PC2 through the second connection member M2 to the output gear Output.

As shown in the collinear diagram of FIG. 27, more specifically, the 6th speed is defined by the line which joins the engagement point of the third clutch C3 for inputting the rotation of the third carrier PC3 and the engagement point of the second brake B2 for fixing the fourth sun gear S4 on the case, and the rotation inputted from the input shaft Input is increased in speed and outputted from the output gear Output.

In the torque flow at this 6th speed, as shown in FIG. 29(c), the torque is applied to the third clutch C3, the second brake B2 and the individual members, as indicated by the thick lines, and to the third planetary gearset G3 (excepting the third sun gear S3), as hatched.

(Reverse Speed)

As shown in FIG. 2, the reverse speed is achieved by engaging the second clutch C2 and the first brake B1.

At this reverse speed, the speed-reduced rotation from the first ring gear R1 of the first planetary gearset G1 is inputted through the second sun gear S2 of the second planetary gearset G2 and the first connection member M1 to the third sun gear S3 by the engagement of the second clutch C2. By the engagement of the first brake B1, on the other hand, the third carrier PC3 is fixed on the case.

In the third planetary gearset G3, therefore, the forward speed-reduced rotation is inputted to the third sun gear S3, and the third carrier PC3 is fixed on the case, so that the backward speed-reduced rotation is outputted from the third ring gear R3 through the second connection member M2 to the output gear Output.

As shown in the collinear diagram of FIG. 27, more specifically, the reverse speed is defined by the line which joins the engagement point of the second clutch C2 for inputting the speed-reduced rotation from the first planetary gearset G1 to the third sun gear S3 and the engagement point of the first brake B1 for stopping the rotation of the third carrier PC3, and the rotation inputted from the input shaft Input is reduced backward in speed and outputted from the output gear Output.

In the torque flow at this reverse speed, as shown in FIG. 30, the torque is applied to the second clutch C2, the first brake B1 and the individual members, as indicated by the thick lines, and to the first planetary gearset G1 and the third planetary gearset G3 (excepting the fourth sun gear S4), as hatched.

5-2nd Embodiment

First of all, the construction will be described in the following.

FIG. 31 is a schematic diagram showing the automatic transmission gear shift control apparatus of the 5-2nd embodiment.

In FIG. 31: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output shaft (or an output portion).

The automatic transmission gear shift control apparatus (of a speed-reducing double type 2) of the 5-2nd embodiment is an example, in which the first planetary gearset G1 of a double-pinion type is positioned as a speed-reducing device at the left-hand end portion of FIG. 31, in which the second planetary gearset G2 of a single-pinion type is positioned at the central portion and in which the third planetary gearset G3 of a double sun gear type is positioned at the right-hand end portion. And, the aforementioned second planetary gearset G2 and third planetary gearset G3 construct the so-called "Ishimaru type planetary gear train".

The positioning relations among the first planetary gearset G1, the second planetary gearset G2 and the third planetary gearset G3 of the automatic transmission gear shift control apparatus (of the speed-reducing double type 2) of the 5-2nd embodiment are identical to those of the speed-reducing double type 1. Moreover: the first clutch C1 is positioned between the first planetary gearset G1 and the second planetary gearset G2; the second clutch C2, the third clutch C3, the first brake B1 and the second brake B2 are positioned between the second planetary gearset G2 and the third planetary gearset G3, but no clutch/brake is positioned on the outer side of the third planetary gearset G3. Thus, the output portion is exemplified by an output shaft Output made coaxial with the input shaft Input. The remaining construction is similar to that of the speed-reducing double type 1 so that its description is omitted.

FIG. 32 to FIG. 34 are diagrams showing the torque flows at the individual gear ranges of the automatic transmission gear shift control apparatus of the 5-2nd embodiment. In FIG. 32 to FIG. 34, the torque transmission routes of clutches, brakes and members are indicated by thick lines, and the torque transmission routes of gears are indicated by hatching them. The torque flows at the individual gear ranges are similar to those of the speed-reducing double type 1 so that their descriptions are omitted.

5-3rd Embodiment

First of all, the construction will be described in the following.

In FIG. 35 presenting a schematic diagram showing an automatic transmission gear shift control apparatus of the 5-3rd embodiment: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output shaft (or an output portion).

The automatic transmission gear shift control apparatus (of a speed-reducing double type 3) of the 5-3rd embodiment is an example, in which the first planetary gearset G1 of a double-pinion type is positioned as a speed-reducing device at the left-hand end portion of FIG. 35, in which the third planetary gearset G3 of a double sun gear type is positioned at the central portion and in which the second planetary gearset G2 of a single pinion type is positioned at the right-hand end portion. And, the aforementioned second planetary gearset G2 and third planetary gearset G3 construct the so-called "Ishimaru type planetary gear train".

The positioning relations among the first planetary gearset G1, the second planetary gearset G2 and the third planetary gearset G3 of the automatic transmission gear shift control apparatus (of the speed-reducing double type 3) of the 5-2nd embodiment are different from those of the speed-reducing double type 1 in that the second planetary gearset G2 and the third planetary gearset G3 are replaced by each other. Moreover: the third clutch C3, the first brake B1 and the second brake B2 are positioned between the first planetary gearset G1 and the third planetary gearset G3; no clutch/brake is positioned between the third planetary gearset G3 and the second planetary gearset G2; and the first clutch C1 and the second clutch C2 are positioned on the outer side of the second planetary gearset G2. Thus, the output portion is exemplified by the output shaft Output made coaxial with the input shaft Input. The remaining construction is similar to that of the speed-reducing double type 1 so that its description is omitted.

FIG. 36 to FIG. 38 are diagrams showing the torque flows at the individual gear ranges of the automatic transmission gear shift control apparatus of the 5-3rd embodiment. In FIG. 36 to FIG. 38, the torque transmission routes of clutches, brakes and members are indicated by thick lines, and the torque transmission routes of gears are indicated by hatching them. The torque flows at the individual gear ranges are similar to those of the speed-reducing double type 1 so that their descriptions are omitted.

The effects will be described in the following.

As has been described hereinbefore, the automatic transmission gear shift control apparatus of the fifth embodiment can obtain the following effects, in addition to the effects (1), (3) and (5) of the first embodiment.

(11) The first planetary gearset G1 of the speed-reducing device is the double-pinion type planetary gearset so that the degree of freedom for the layout can be enhanced.

Specifically, the output portion can be constructed of not only the output gear Output, as exemplified in the speed-reducing double type 1, but also the output shaft Output arranged coaxially with but on the opposite side of the input shaft Input, as exemplified in the speed-reducing double types 2 and 3. Thus, the layout to be obtained is suited not only for the automatic transmission of a front-engine/front-drive car (or an FF car) but also for the automatic transmission of a front engine/rear drive car (or an FR car).

(12) The automatic transmission gear shift control apparatus comprises the double-pinion type first planetary gearset G1 acting as the speed-reducing device having the first sun gear S1, the first ring gear R1, and the first carrier PC1 for supporting the first double pinions P1 meshing with the two gears S1 and R1; the single-pinion type second planetary gearset G2 having the second sun gear S2, the second ring gear R2, and the second carrier PC2 for supporting the second pinion P2 meshing with the two gears S2 and R2; the double sun gear type third planetary gearset G3 having the two third sun gear S3 and fourth sun gear S4, the third carrier PC3 and the center member CM for supporting the third pinion P3 meshing individually with the two sun gears S3 and S4, and one third ring gear R3 meshing with the third pinion P3; the input shaft Input connected to the first carrier PC1; the output gear or output shaft Output connected to the second carrier PC2; the first connection member M1 for connecting the second sun gear S2 and the third sun gear S3 integrally; the second connection member M2 for connecting the second carrier PC3 and the third ring gear R3 integrally; the first clutch C1 for connecting/disconnecting the first ring gear R1 and the second ring gear R2 selectively; the second clutch C2 for connecting/disconnecting the first ring gear R1 and the second sun gear S2 selectively; the third clutch C3 for connecting/disconnecting the input shaft Input and the center member CM selectively; the first brake B1 for stopping the rotation of the third carrier PC3 selectively; the second brake B2 for stopping the rotation of the fourth sun gear S4 selectively, and the hydraulic gear shift control device for achieving at least six forward speeds and one reverse speed. At the 1st speed and 2nd speed, therefore, the ring gear input can be achieved for the so-called "Ishimaru type planetary gear train", which is constructed of the second planetary gearset G2 and the third planetary gearset G3, and the automatic transmission can be made compact. At the 2nd speed, moreover, the torque circulation is eliminated to improve the transmission efficiency at the 2nd speed and the fuel economy (corresponding to Claim 12).

Sixth Embodiment

First of all, the construction will be described in the following.

The sixth embodiment is directed to automatic transmission gear shift control apparatus corresponding to inventions defined in Claims 1, 4, 7, 13 and 16, and FIG. 39 is a schematic diagram showing the automatic transmission gear shift control apparatus of the sixth embodiment.

In FIG. 39: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output shaft (or an output portion).

The automatic transmission gear shift control apparatus (of a speed-reducing double type 4) of the sixth embodiment is an example, in which the first planetary gearset G1 of a double-pinion type is positioned as a speed-reducing device at the left-hand end portion of FIG. 39, in which the second planetary gearset G2 of a double sun gear type is positioned at the central portion and in which the third planetary gearset G3 of a single-pinion type is positioned at the right-hand end portion. And, the aforementioned second planetary gearset G2 and third planetary gearset G3 construct the so-called "Ishimaru type planetary gear train".

The aforementioned first planetary gearset G1 is a double-pinion type planetary gearset acting as the speed-reducing device, which includes: a first sun gear S1; a first ring gear R1; and a first carrier PC1 for supporting first double-pinions P1 meshing with the two gears S1 and R1.

The aforementioned second planetary gearset G2 is the double sun gear type planetary gearset, which includes: two second sun gear S2 and fourth sun gear S4; a second carrier PC2 and a center member CM for supporting second pinion P2 meshing individually with the two sun gears S2 and S4; and one second ring gear R2 meshing with the aforementioned second pinion P2.

The aforementioned third planetary gearset G3 is the single pinion type planetary gearset, which includes: a third sun gear S3; a third ring gear R3; and a third carrier PC3 for supporting a third pinion P3 meshing with the two gears S3 and R3.

The aforementioned input shaft Input is connected to the first carrier PC1, and the aforementioned output shaft Output is connected to the center member CM.

The aforementioned first connection member M1 connects the second sun gear S2 and the third sun gear S3 integrally. The aforementioned second connection member M2 connects the second carrier PC2 and the third ring gear R2 integrally.

The aforementioned first clutch C1 connects/disconnects the first ring gear R1 and the second ring gear R2 selectively. The aforementioned second clutch C2 connects/disconnects the first ring gear R1 and the fourth sun gear S4 selectively. The aforementioned third clutch C3 connects/disconnects the input shaft Input and the third carrier PC3 selectively.

The aforementioned first brake B1 stops the rotation of the third carrier PC3 selectively. The aforementioned second brake B2 stops the rotation of the third sun gear S3 selectively.

To the aforementioned individual clutches C1, C2 and C3 and individual brakes B1 and B2, as in the first embodiment, there is connected the hydraulic gear shift control device which establishes the six forward speeds and one reverse speed: the 1st speed by the engagement of the first clutch C1 and the first brake B1, the 2nd speed by the engagement of the first clutch C1 and the second brake B2, the 3rd speed by the engagement of the first clutch C1 and the second clutch C2, the 4th speed by the engagement of the first clutch C1 and the third clutch C3, the 5th speed by the engagement of the second clutch C2 and the third clutch C3, the 6th speed by the engagement of the third clutch C3 and the second brake B2, and the reverse speed by the engagement of the second clutch C2 and the first brake B1 (as referred to FIG. 2).

The actions will be described in the following.
[Shifting Actions]
FIG. 40 to FIG. 42 are diagrams showing the torque flows at the individual gear ranges of the automatic transmission gear shift control apparatus of the sixth embodiment. In FIG. 40 to FIG. 42, the torque transmission routes of clutches, brakes and members are indicated by thick lines, and the torque transmission routes of gears are indicated by hatching them.

Here, the collinear diagrams showing the rotation-stopped state of the members at the individual gear ranges in the sixth embodiment gear shift control apparatus are identical to those of the fifth embodiment gear shift control apparatus, as shown in FIG. 27, so that their illustrations are omitted. The engagement tables of the sixth embodiment gear shift control apparatus are identical to those of the first embodiment gear shift control apparatus shown in FIG. 2, so that their illustrations are omitted.

<1st Speed>

As shown in FIG. 2, the 1st speed is achieved by the engagements of the first clutch C1 and the first brake B1.

In the torque flow at this 1st speed, as shown in FIG. 40(a), the torque is applied to the first clutch C1, the first brake B1 and the individual members, as indicated by the thick lines, and to first planetary gearset G1, the second planetary gearset G2 and the third planetary gearset G3 (excepting the fourth sun gear S4), as hatched. In short, at the 1st speed, the first planetary gearset G1, and the second planetary gearset G2 and the third planetary gearset G3, as constructing the Ishimaru type planetary gear train, participate in the torque transmission.

<2nd Speed>

As shown in FIG. 2, the 2nd speed is achieved by releasing the first brake B1 at the 1st speed and engaging the second brake B2, that is, by engaging the first clutch C1 and the second brake B2.

In the torque flow at this 2nd speed, as shown in FIG. 40(b), the torque is applied to the first clutch C1, the second brake B2 and the individual members, as indicated by the thick lines, and to the first planetary gearset G1 and the second planetary gearset G2 (excepting the fourth sun gear S4), as hatched.

<3rd Speed>

As shown in FIG. 2, the 3rd speed is achieved by releasing the second brake B2 at the 2nd speed and engaging the second clutch C2, that is, by engaging the first clutch C1 and the second clutch C2.

In the torque flow at this 3rd speed, as shown in FIG. 41(a), the torque is applied to the first clutch C1, the second clutch C2 and the individual members, as indicated by the thick lines, and to the first planetary gearset G1 and the second planetary gearset G2 (excepting the second sun gear S2), as hatched. In short, the third planetary gearset G3 does not participate in the torque transmission in the least.

<4th Speed>

As shown in FIG. 2, the 4th speed is achieved by releasing the second clutch C2 at the 3rd speed and engaging the third clutch C3, that is, by engaging the first clutch C1 and the third clutch C3.

In the torque flow at this 4th speed, as shown in FIG. 41(b), the torque is applied to the first clutch C1, the third clutch C3 and the individual members, as indicated by the thick lines, and to the first planetary gearset G1, the second planetary gearset G2 (excepting the fourth sun gear S4) and the third planetary gearset G3, as hatched.

<5th Speed>

As shown in FIG. 2, the 5th speed is achieved by releasing the first clutch C1 at the 4th speed and engaging the second clutch C2, that is, by engaging the second clutch C2 and the third clutch C3.

In the torque flow at this 5th speed, as shown in FIG. 41(c), the torque is applied to the second clutch C2, the third clutch C3 and the individual members, as indicated by the thick lines, and to the first planetary gearset G1 and the third planetary gearset G3, as hatched. In short, the second planetary gearset G2 does not participate in the torque transmission in the least.

(6th Speed)

As shown in FIG. 2, the 6th speed is achieved by releasing the second clutch C2 at the 5th speed and engaging the second brake B2, that is, by engaging the third clutch C3 and the second brake B2.

In the torque flow at this 6th speed, as shown in FIG. 42(b), the torque is applied to the third clutch C3, the second brake B2 and the individual members, as indicated by the thick lines, and to the third planetary gearset G3, as hatched.

(Reverse Speed)

As shown in FIG. 2, the reverse speed is achieved by engaging the second clutch C2 and the first brake B1.

In the torque flow at this reverse speed, as shown in FIG. 42(a), the torque is applied to the second clutch C2, the first brake B1 and the individual members, as indicated by the thick lines, and to the first planetary gearset G1, the second planetary gearset G2 and the third planetary gearset G3, as hatched.

The effects will be described in the following.

As has been described hereinbefore, the automatic transmission gear shift control apparatus of the sixth embodiment can obtain the following effects in addition to the effects (1), (3) and (5) of the first embodiment and the effects (11) of the fifth embodiment.

(13) The automatic transmission gear shift control apparatus comprises the double-pinion type first planetary gearset G1 acting as the speed-reducing device and having the first sun gear S1, the first ring gear R1, and the first carrier PC1 for supporting the first double pinions P1 meshing with the two gears S1 and R1; the double sun gear type second planetary gearset G2 having the two second sun gear S2 and fourth sun gear S4, the second carrier PC2 and the center member CM for supporting the second pinion P2 meshing individually with the two sun gears S2 and S4, and one second ring gear R2 meshing with the aforementioned second pinion P2; the single-pinion type third planetary gearset G3 having the third sun gear S3, the third ring gear R3, and the third carrier PC3 for supporting the third pinion P3 meshing with the two gears S3 and R3; the input shaft Input connected to the first carrier PC1; the output shaft Output connected to the center member CM; the first connection member M1 for connecting the second sun gear S2 and the third sun gear S3 integrally; the second connection member M2 for connecting the second carrier PC2 and the third ring gear R2 integrally; the first clutch C1 for connecting/disconnecting the first ring gear R1 and the second ring gear R2 selectively; the second clutch C2 for connecting/disconnecting the first ring gear R1 and the fourth sun gear S4 selectively; the third clutch C3 for connecting/disconnecting the input shaft Input and the third carrier PC3 selectively; the first brake B1 for stopping the rotation of the third carrier PC3 selectively; the second brake B2 for stopping the rotation of the third sun gear S3 selectively, and the hydraulic gear shift control device for achieving the six forward speeds and one reverse speed. Therefore, the automatic transmission gear shift control apparatus can achieve specific effects, as enumerated in the following (corresponding to Claim 13).

(1) At the 1st speed and 2nd speed, the ring gear input can be achieved for the so-called "Ishimaru type planetary gear train", which is constructed of the second planetary gearset G2 and the third planetary gearset G3, and the automatic transmission can be made compact.

(2) At the 2nd speed, the torque circulation is eliminated to improve the transmission efficiency at the 2nd speed and the fuel economy.

(3) When the gear shift control apparatus is to be applied to the automatic transmission of the FR car, the layout can be set such that the number of members passing on the inner side of the second planetary gearset G2 of the double sun gear type is reduced to one, thereby to reduce the size of the Ishimaru type planetary gear train to make the gear shift control apparatus compact.

(4) At the 6th speed, the torque is transmitted to the single-pinion type third planetary gearset G3 so that the gear meshing ratio is improved to provide an advantage in vibration and noise.

Seventh Embodiment

First of all, the construction will be described in the following.

Figure 43:
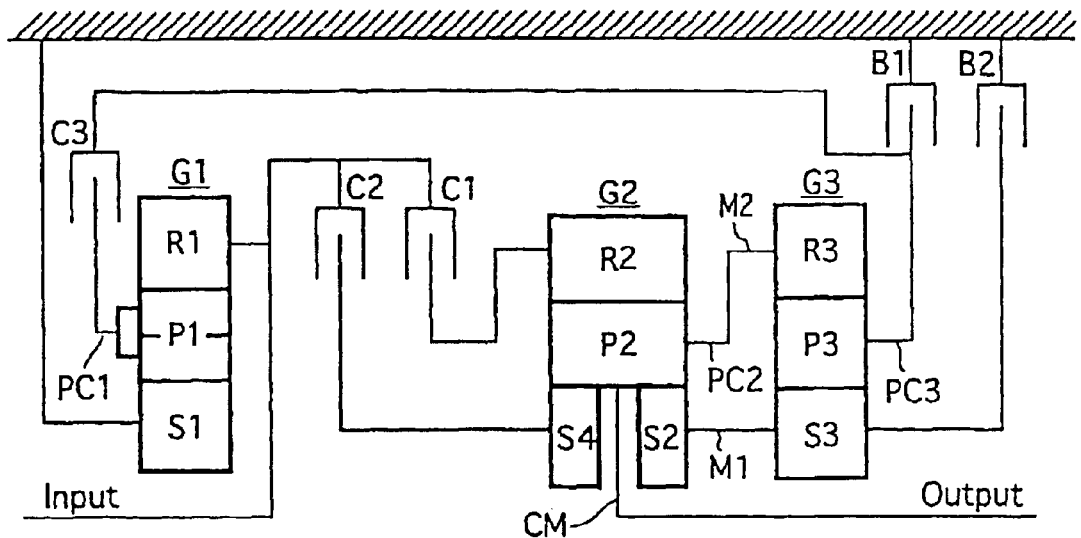
FIG. 43 is a schematic diagram showing a gear shift control apparatus for an automatic transmission of a seventh embodiment.

The seventh embodiment is directed to automatic transmission gear shift control apparatus corresponding to inventions defined in Claims 2, 6, 7, 14, and 16, and FIG. 43 is a schematic diagram showing the automatic transmission gear shift control apparatus of the seventh embodiment.

In FIG. 43: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output shaft (or an output portion).

The automatic transmission gear shift control apparatus (of a speed-increasing double type 1) of the seventh embodiment is an example, in which the first planetary gearset G1 of a double-pinion type is positioned as a speed-increasing device at the left-hand end portion of FIG. 43, in which the second planetary gearset G2 of a double sun gear type is positioned at the central portion and in which the third planetary gearset G3 of a single-pinion type is positioned at the right-hand end portion. And, the aforementioned second planetary gearset G2 and third planetary gearset G3 construct the so-called "Ishimaru type planetary gear train".

The aforementioned first planetary gearset G1 is a double-pinion type planetary gearset or the speed-increasing device, which includes: a first sun gear S1; a first ring gear R1; and a first carrier PC1 for supporting a first double pinion P1 meshing with the two gears S1 and R1.

The aforementioned second planetary gearset G2 is the double sun gear type planetary gearset, which includes: two second sun gear S2 and fourth sun gear S4; a second carrier PC2 and a center member CM for supporting a second pinion P2 meshing with the two sun gears S2 and S4; and one second ring gear R2 meshing with the aforementioned second pinion P2.

The aforementioned third planetary gearset G3 is the single-pinion type planetary gearset, which includes: a third sun gear S3; a third ring gear R3; and a third carrier PC3 for supporting a third pinion P3 meshing with the two gears S3 and R3.

The aforementioned input shaft Input is connected to the first ring gear R1, and the aforementioned output shaft Output is connected to the center member CM.

The aforementioned first connection member M1 connects the second sun gear S2 and the third sun gear S3 integrally, and the aforementioned second connection member M2 connects the second carrier PC2 and the third ring gear R3 integrally.

The aforementioned first clutch C1 connects/disconnects the first ring gear R1 and the second ring gear R2 selectively. The aforementioned second clutch C2 connects/disconnects the first ring gear R1 and the fourth sun gear S4 selectively. The aforementioned third clutch C3 connects/disconnects the first carrier PC1 and the third carrier PC3 selectively.

The aforementioned first brake B1 stops the rotation of the third carrier PC3 selectively. The aforementioned second brake B2 stops the rotation of the third sun gear S3 selectively.

To the aforementioned individual clutches C1, C2 and C3 and individual brakes B1 and B2, as in the first embodiment, there is connected the hydraulic gear shift control device which establishes the six forward speeds and one reverse speed: the 1st speed by the engagement of the first clutch C1 and the first brake B1, the 2nd speed by the engagement of the first clutch C1 and the second brake B2, the 3rd speed by the engagement of the first clutch C1 and the second clutch C2, the 4th speed by the engagement of the first clutch C1 and the third clutch C3, the 5th speed by the engagement of the second clutch C2 and the third clutch C3, the 6th speed by the engagement of the third clutch C3 and the second brake B2, and the reverse speed by the engagement of the second clutch C2 and the first brake B1 (as referred to FIG. 2).

The actions will be described in the following.
[Shifting Actions]

Figure 44:
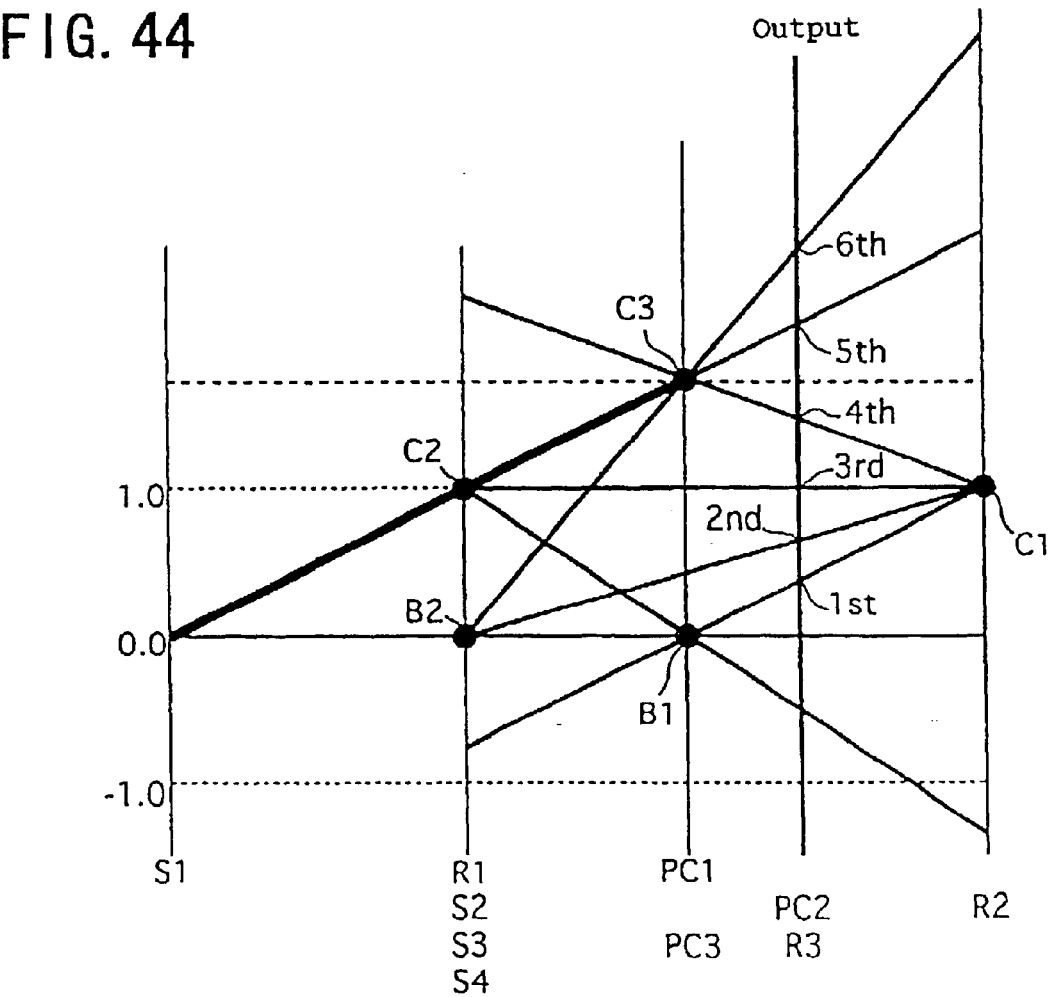
FIG. 44 is a collinear diagram in the automatic transmission gear shift control apparatus of the seventh embodiment.

FIG. 44 is a collinear diagram showing the rotation-stopped state of the members at the individual gear ranges in the automatic transmission gear shift control apparatus of the seventh embodiment, and FIG. 45 to FIG. 47 are the torque flows at the individual gear ranges of the automatic transmission gear shift control apparatus of the seventh embodiment.

In FIG. 45 to FIG. 47, the torque transmission routes of clutches, brakes and members are indicated by thick lines, and the torque transmission routes of gears are indicated by hatching them. Here, the engagement tables of the seventh embodiment gear shift control apparatus are identical to those of the first embodiment apparatus shown in FIG. 2, so that their illustrations are omitted.

<1st Speed>

As shown in FIG. 2, the 1st speed is achieved by the engagements of the first clutch C1 and the first brake B1.

At this 1st speed, in the second planetary gearset G2, the input rotation is inputted to the second ring gear R2 by the engagement of the first clutch C1.

In the third planetary gearset G3, on the other hand, the third carrier PC3 is fixed on the case by the engagement of the first brake B1. Therefore, the rotation of the third sun gear S3 is reduced in speed and reversed in rotation with respect to the output rotation from the third ring gear R3, so that this rotation of the third sun gear S3 is transmitted through the first connection member M1 to the second sun gear S2.

In the second planetary gearset G2, therefore, the forward input rotation is inputted from the second ring gear R2, and the speed-reduced backward rotation is inputted from the second sun gear S2, so that the rotation reduced in speed from the input rotation of the second ring gear R2 is outputted through the center member CM to the output shaft Output.

As shown in the collinear diagram of FIG. 44, more specifically, the 1st speed is defined by the line which joins the engagement point of the first clutch C1 for inputting the input rotation from the input shaft Input to the second ring gear R2 and the engagement point of the first brake B1 for stopping the rotation of the third carrier PC3, and the input rotation from the input shaft Input is reduced in speed and outputted from the output shaft Output.

In the torque flow at this 1st speed, as shown in FIG. 45(a), the torque is applied to the first clutch C1, the first brake B1 and the individual members, as indicated by the thick lines, and to the second planetary gearset G2 and the third planetary gearset G3 (excepting the fourth sun gear S4), as hatched. In short, at the 1st speed, the second planetary gearset G2 and the third planetary gearset G3, as constructing the Ishimaru type planetary gear train, participates in the torque transmission.

<2nd Speed>

As shown in FIG. 2, the 2nd speed is achieved by releasing the first brake B1 at the 1st speed and engaging the second brake B2, that is, by engaging the first clutch C1 and the second brake B2.

At this 2nd speed, in the second planetary gearset G2, the input rotation is inputted to the second ring gear R2 by the engagement of the first clutch C1.

In the third planetary gearset G3, on the other hand, the fourth sun gear S4 is fixed on the case by the engagement of the second brake B2. Therefore, the third sun gear S3 connected by the third pinion P3 is fixed. And, the second sun gear S2 connected through the first connection member M1 to the third sun gear S3 is fixed on the case.

In the second planetary gearset G2, therefore, the input rotation of the input shaft Input is inputted from the second ring gear R2, and the second sun gear S2 is fixed, so that the rotation reduced in speed from the input rotation of the second ring gear R2 is through the center member CM to the output shaft Output.

As shown in the collinear diagram of FIG. 44, more specifically, the 2nd speed is defined by the line which joins the engagement point of the first clutch C1 for inputting the input rotation from the input shaft Input to the second ring gear R2 and the engagement point of the second brake B2 for stopping the rotation of the second sun gear S2, and the input rotation from the input shaft Input is reduced in speed (to a higher speed than that of the 1st speed) and outputted from the output shaft Output.

In the torque flow at this 2nd speed, as shown in FIG. 45(b), the torque is applied to the first clutch C1, the second brake B2 and the individual members, as indicated by the thick lines, and to the second planetary gearset G2 (excepting the fourth sun gear S4), as hatched.

<3rd Speed>

As shown in FIG. 2, the 3rd speed is achieved by releasing the second brake B2 at the 2nd speed and engaging the second clutch C2, that is, by engaging the first clutch C1 and the second clutch C2.

At this 3rd speed, the input rotation from the input shaft Input is inputted to the second ring gear R2 by the engagement of the first clutch C1. At the same time, the input rotation from the input shaft Input is inputted to the fourth sun gear S4 by the engagement of the second clutch C2.

In the second planetary gearset G2, therefore, the same input rotations are inputted from the second ring gear R2 and the second sun gear S2 so that the rotation by the input rotation is outputted to the output shaft Output through the center member CM to rotate integrally with the two gears R2 and S2.

As shown in the collinear diagram of FIG. 44, more specifically, the 3rd speed is defined by the line which joins the engagement point of the first clutch C1 for inputting the input rotation from the input shaft Input to the second ring gear R2 and the engagement point of the second clutch C2 for inputting the input rotation from the input shaft Input to the second sun gear S2, and the same rotation (i.e., the direct-engagement rotation) as the input rotation from the input shaft Input is outputted from the output shaft Output.

In the torque flow at this 3rd speed, as shown in FIG. 45(c), the torque is applied to the first clutch C1, the second clutch C2 and the individual members, as indicated by the thick lines, and to the second planetary gearset G2 (excepting the second sun gear S2), as hatched.

<4th Speed>

As shown in FIG. 2, the 4th speed is achieved by releasing the second clutch C2 at the 3rd speed and engaging the third clutch C3, that is, by engaging the first clutch C1 and the third clutch C3.

At this 4th speed, the input rotation from the input shaft Input is inputted to the second ring gear R2 by the engagement of the first clutch C1.

In the third planetary gearset G3, on the other hand, the rotation increased in speed from the input rotation of the input shaft Input is inputted to the third carrier PC3 by engaging the third clutch C3. Therefore, the rotation of the third sun gear S3 is increased to a higher speed than that of the rotation of the third carrier PC3, and this speed-increased rotation of the third sun gear S3 is transmitted through the first connection member M1 to the second sun gear S2.

In the second planetary gearset G2, therefore, the input rotation is inputted from the second ring gear R2, and the speed-increased rotation is inputted from the second sun gear S2, so that the rotation increased in speed from the input rotation of the second ring gear R2 is outputted through the center member CM to the output shaft Output.

As shown in the collinear diagram of FIG. 44, more specifically, the 4th speed is defined by the line which joins the engagement point of the first clutch C1 for inputting the input rotation from the input shaft Input to the second ring gear R2 and the engagement point of the third clutch C3 for increasing the input rotation from the third carrier PC3 in speed to the second sun gear S2, and the rotation inputted from the input shaft Input is increased in speed and outputted from the output shaft Output.

In the torque flow at this 4th speed, as shown in FIG. 46(a), the torque is applied to the first clutch C1, the third clutch C3 and the individual members, as indicated by the thick lines, and to the first planetary gearset G1, the second planetary gearset G2 (excepting the fourth sun gear S4) and the third planetary gearset G3, as hatched.

>5th Speed>

As shown in FIG. 2, the 5th speed is achieved by releasing the first clutch C1 at the 4th speed and engaging the second clutch C2, that is, by engaging the second clutch C2 and the third clutch C3.

At this 5th speed, the input rotation from the input shaft Input is inputted to the third sun gear S3 through the second clutch C2→the fourth sun gear S4→the second pinion P2→the second sun gear S2→the first connection member M1 by the engagement of the second clutch C2.

In the third planetary gearset G3, on the other hand, the rotation increased in speed at the first planetary gearset G1 from the input rotation of the input shaft Input is inputted to the third carrier PC3 by the engagement of the third clutch C3.

In the third planetary gearset G3, therefore, the speed-increased rotation is inputted to the third carrier PC3, and the input rotation is inputted to the third sun gear S3, so that the rotation increased to a higher speed than that of the input rotation is outputted from the third ring gear R3 through the second connection member M2 and the center member CM to the output shaft Output.

As shown in the collinear diagram of FIG. 44, more specifically, the 5th speed is defined by the line which joins the engagement point of the second clutch C2 for inputting the rotation of the third sun gear S3 and the engagement point of the third clutch C3 for increasing the rotation of the third carrier PC3, and the rotation inputted from the input shaft Input is increased in speed and outputted from the output shaft Output.

In the torque flow at this 5th speed, as shown in FIG. 46(b), the torque is applied to the second clutch C2, the third clutch C3 and the individual members, as indicated by the thick lines, and to the first planetary gearset G1 and the third planetary gearset G3, as hatched. The second planetary gearset G2 functions as a rotary member but does not participate in the torque transmission.

<6th Speed>

As shown in FIG. 2, the 6th speed is achieved by releasing the second clutch C2 at the 5th speed and engaging the second brake B2, that is, by engaging the third clutch C3 and the second brake B2.

At this 6th speed, by the engagement of the third clutch C3, the speed-increased rotation increased at the first planetary gearset G1 from the input rotation of the input shaft Input is inputted to the third carrier PC3. By the engagement of the second brake B2, moreover, the third sun gear S3 of the third planetary gearset G3 is fixed on the case.

In the third planetary gearset G3, therefore, the speed-increased rotation is inputted to the third carrier PC3, and the third sun gear S3 is fixed on the case, so that the rotation increased to a higher speed than that of the input rotation is outputted from the third ring gear R2 through the second connection member M2 and the center member CM to the output shaft Output.

As shown in the collinear diagram of FIG. 44, more specifically, the 6th speed is defined by the line which joins the engagement point of the third clutch C3 for increasing the speed of the rotation of the third carrier PC3 and the engagement point of the second brake B2 for fixing the third sun gear S3 on the case, and the rotation inputted from the input shaft Input is increased in speed and outputted from the output shaft Output.

In the torque flow at this 6th speed, as shown in FIG. 46(c), the torque is applied to the third clutch C3, the second brake B2 and the individual members, as indicated by the thick lines, and to first planetary gearset G1 and the third planetary gearset G3, as hatched.

(Reverse Speed)

As shown in FIG. 2, the reverse speed is achieved by engaging the second clutch C2 and the first brake B1.

At this reverse speed, by the engagement of the second clutch C2, the input rotation from the input shaft Input is inputted through the second clutch C2→the fourth sun gear S4→the second pinion P2→the second sun gear S2→the first connection member M1 to the third sun gear S3. By the engagement of the first brake B1, moreover, the third carrier PC3 is fixed on the case.

In the third planetary gearset G3, therefore, the input rotation is inputted to the third sun gear S3, and the third carrier PC3 is fixed on the case, so that the speed-reduced backward rotation is outputted from the third ring gear R3 through the second connection member M2 to the output shaft Output.

As shown in the collinear diagram of FIG. 44, more specifically, the reverse speed is defined by the line which joins the engagement point of the second clutch C2 for inputting the input rotation from the input shaft Input to the third sun gear S3 and the engagement point of the first brake B1 for stopping the rotation of the third carrier PC3, and the rotation inputted from the input shaft Input is reduced in speed backward and outputted from the output shaft Output.

In the torque flow at this reverse speed, as shown in FIG. 47, the torque is applied to the second clutch C2, the first brake B1 and the individual members, as indicated by the thick lines, and to the third planetary gearset G3, as hatched.

The effects will be described in the following.

As has been described hereinbefore, the automatic transmission gear shift control apparatus of the seventh embodiment can obtain the following effects in addition to effects (3) and (5) of the first embodiment and the effect (7) of the third embodiment.

(14) The first planetary gearset G1 acting as the speed-increasing device is made of the double-pinion type planetary gearset so that the layout suited for the FR car, i.e., the layout having the output portion on the opposite side of the input portion can be made (corresponding to Claim 6).

(15) The automatic transmission gear shift control apparatus further comprises a hydraulic gear shift control device including: the double-pinion type first planetary gearset G1 acting as the speed-increasing device and having the first sun gear S1, the first ring gear R1, and the first carrier PC1 for supporting the first double pinions P1 meshing with the two gears S1 and R1; the double sun gear type second planetary gearset G2 having two second sun gear S2 and fourth sun gear S4, the second carrier PC2 and the center member CM for supporting the second pinion P2 meshing with the two sun gears S2 and S4 and one second ring gear R2 meshing with the aforementioned second pinion P2; the single-pinion type third planetary gearset G3 having the third sun gear S3, the third ring gear R3, and the third carrier PC3 for supporting the third pinion P3 meshing with the two gears S3 and R3, the input shaft Input connected to the first ring gear R1; the output shaft Output connected to the center member CM; the first connection member M1 for connecting the second sun gear S2 and the third sun gear S3 integrally; the second connection member M3 for connecting the second carrier PC2 and the third ring gear R3 integrally; the first clutch C1 for connecting/disconnecting the first ring gear R1 and the second ring gear R2 selectively; the second clutch C2 for connecting/disconnecting the first ring gear R1 and the fourth sun gear S4 selectively; the third clutch C3 for connecting/disconnecting the first carrier PC1 and the third carrier PC3 selectively; the first brake B1 for stopping the rotation of the third carrier PC3 selectively; the second brake B2 for stopping the rotation of the third sun gear S3 selectively, and the hydraulic gear shift control device for achieving the six forward speeds and one reverse speed. Therefore, the automatic transmission gear shift control apparatus can achieve additional effects, as enumerated in the following (corresponding to Claim 14).

(1) At the 1st speed and 2nd speed, the ring gear input can be achieved for the so-called "Ishimaru type planetary gear train", which is constructed of the second planetary gearset G2 and the third planetary gearset G3, and the automatic transmission can be made compact.

(2) At the 2nd speed, the torque circulation is eliminated to improve the transmission efficiency at the 2nd speed and the fuel economy.

(3) When the gear shift control apparatus is to be applied to the automatic transmission of the FR car, the layout can be set such that the number of members passing on the inner side of the second planetary gearset G2 of the double sun gear type is reduced to one, thereby to reduce the size of the Ishimaru type planetary gear train to make the gear shift control apparatus compact.

Eighth Embodiment 8-1st Embodiment

First of all, the construction will be described in the following.

Figure 48:
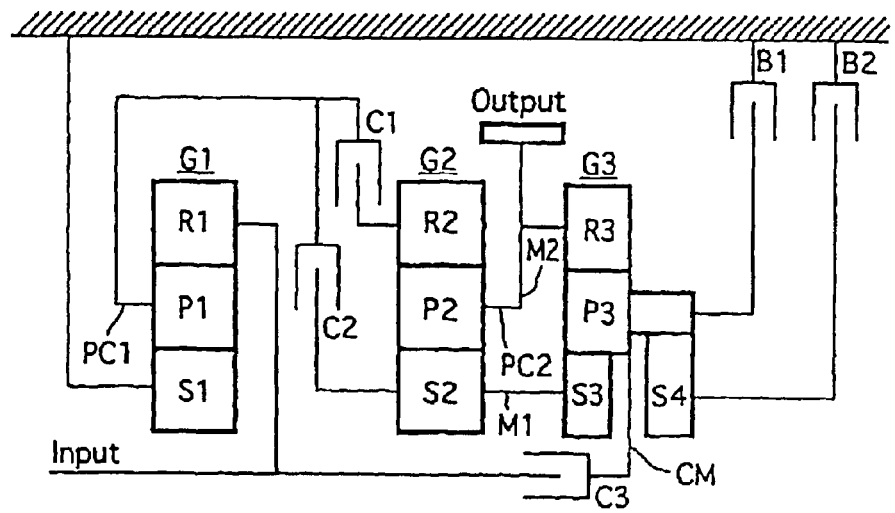
FIG. 48 is a schematic diagram showing a gear shift control apparatus for an automatic transmission of an 8-1st embodiment.

The 8-1st embodiment is directed to automatic transmission gear shift control apparatus corresponding to inventions defined in Claims 1, 3, 7, 8 and 15, and FIG. 48 is a schematic diagram showing the automatic transmission gear shift control apparatus of the 8-1st embodiment.

In FIG. 48: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-reducing single type 1+a stepped pinion type 1) of the 8-1st embodiment, the third sun gear S3 and the fourth sun gear S4 of the automatic transmission gear shift control apparatus (of the speed-reducing single type 1) of the first embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically larger portion of the third stepped pinion P3. Here, the remaining construction is similar to that of the first embodiment so that its description is omitted.

The actions will be described in the following.

Figure 49:
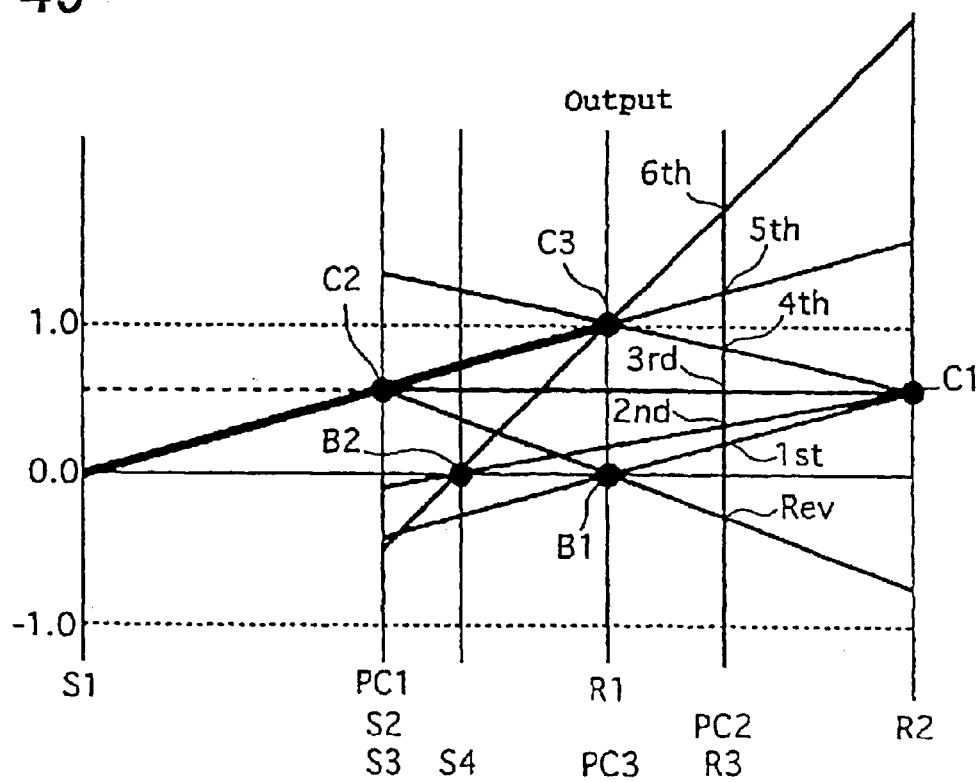
FIG. 49 is a collinear diagram in the automatic transmission gear shift control apparatus of the 8-1st embodiment.
Figure 50:
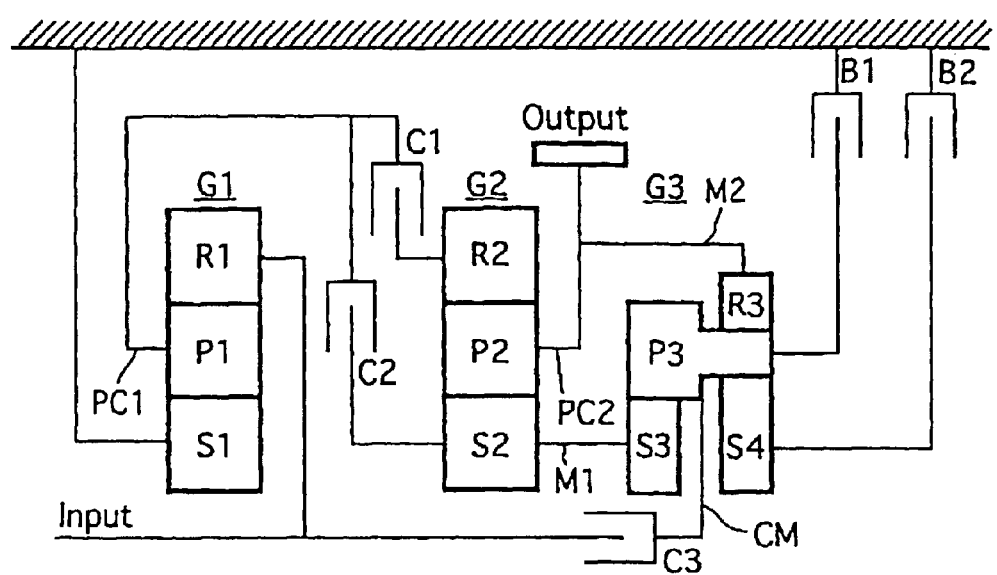
FIG. 50 is a schematic diagram showing a gear shift control apparatus for an automatic transmission of an 8-2nd embodiment.

FIG. 49 is a collinear diagram showing the rotation-stopped state of the members at the individual gear ranges in the automatic transmission gear shift control apparatus of the 8-1st embodiment.

As compared with the first embodiment, the 8-1st embodiment is different in that the third sun gear S3 and the fourth sun gear S4 have different speeds. Here, the shifting actions and the torque flows are similar to those of the first embodiment so that their descriptions are omitted.

<8-2nd Embodiment>

First of all, the construction will be described in the following.

The 8-2nd embodiment is directed to automatic transmission gear shift control apparatus corresponding to inventions defined in Claims 1, 3, 7, 8 and 15, and FIG. 49 is a schematic diagram showing the automatic transmission gear shift control apparatus of the 8-2nd embodiment.

In FIG. 49: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-reducing single type 1+a stepped pinion type 2) of the 8-2nd embodiment, the third sun gear S3 and the fourth sun gear S4 of the automatic transmission gear shift control apparatus (of the speed-reducing single type 1) of the first embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically smaller portion of the third stepped pinion P3. Here, the remaining construction is similar to that of the first embodiment so that its description is omitted.

Here, the collinear diagram showing the rotation-stopped state of the members at the individual gear ranges in the automatic transmission gear shift control apparatus of the 8-2nd embodiment is similar to that of FIG. 49, so that its illustration and description are omitted.

The effects will be described in the following.

As has been described hereinbefore, the automatic transmission gear shift control apparatus of the eighth embodiment can obtain the following effects in addition to effects (1) to (4) of the first embodiment.

(16) The double sun gear type third planetary gearset G3 is the planetary gearset which includes: the two sun gears S3 and S4 having the different tooth numbers; and the third stepped pinion P3 of the different tooth numbers to mesh individually with the two sun gears S3 and S4. Therefore, the step ratio can be made wider to improve the degree of freedom for setting the gear ratios better and to enhance the degree of freedom for the design. Specifically, there is raised the degree of freedom for the gear ratios for the 2nd speed and the 6th speed.

Ninth Embodiment

<9-1st Embodiment>

First of all, the construction will be described in the following.

Figure 51:
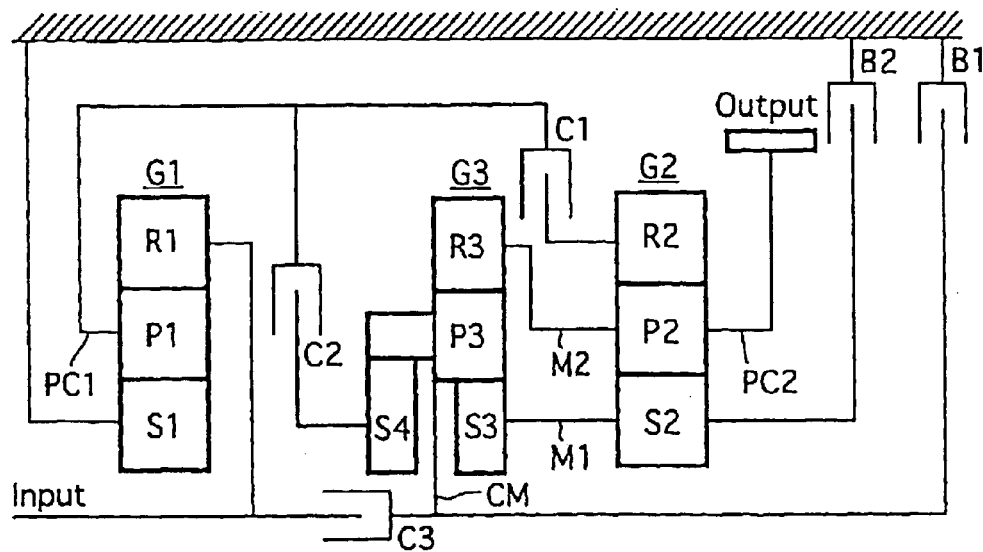
FIG. 51 is a schematic diagram showing a gear shift control apparatus for an automatic transmission of a 9-1st embodiment.

The 9-1st embodiment is directed to automatic transmission gear shift control apparatus corresponding to inventions defined in Claims 1, 3, 7, 9 and 15, and FIG. 51 is a schematic diagram showing the automatic transmission gear shift control apparatus of the 9-1st embodiment.

In FIG. 51: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-reducing single type 2+the stepped pinion type 1) of the 9-1st embodiment, the third sun gear S3 and the fourth sun gear S4 of the automatic transmission gear shift control apparatus (of the speed-reducing single type 2) of the second embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically larger portion of the third stepped pinion P3. Here, the remaining construction is similar to that of the second embodiment so that its description is omitted.

Moreover, the collinear diagram showing the rotation-stopped state of the members at the individual gear ranges in the automatic transmission gear shift control apparatus of the 9-1st embodiment is similar to that of FIG. 49, so that its illustration and description are omitted. Here, the shifting actions and the torque flows are similar to those of the second embodiment so that their descriptions are omitted.

9-2nd Embodiment

First of all, the construction will be described in the following.

Figure 52:
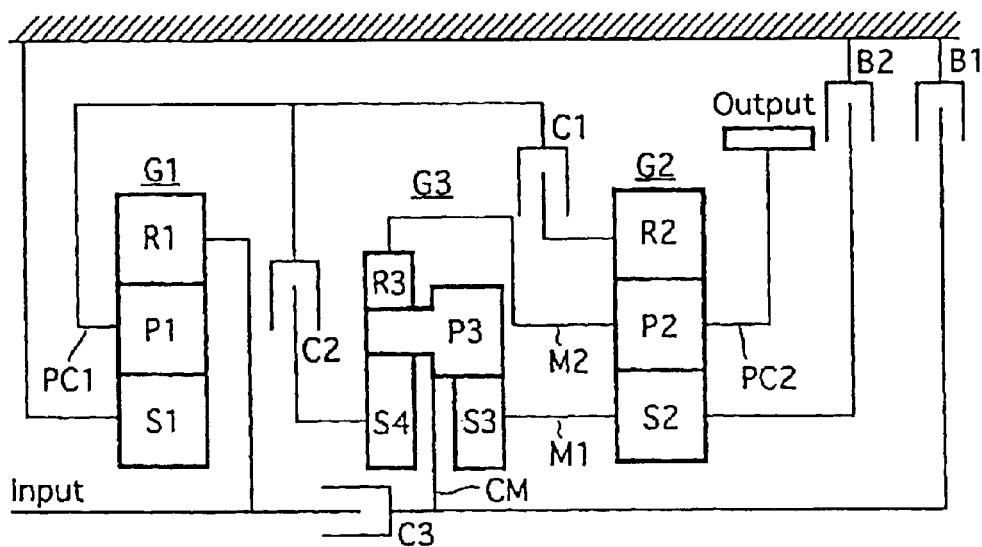
FIG. 52 is a schematic diagram showing a gear shift control apparatus for an automatic transmission of a 9-2nd embodiment.

The 9-2nd embodiment is directed to automatic transmission gear shift control apparatus corresponding to inventions defined in Claims 1, 3, 7, 9 and 15, and FIG. 52 is a schematic diagram showing the automatic transmission gear shift control apparatus of the 9-2nd embodiment.

In FIG. 52: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-reducing single type 2+the stepped pinion type 2) of the 9-2nd embodiment, the third sun gear S3 and the fourth sun gear S4 of the automatic transmission gear shift control apparatus (of the speed-reducing single type 2) of the second embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically smaller portion of the third stepped pinion P3. Here, the remaining construction is similar to that of the second embodiment so that its description is omitted.

Moreover, the collinear diagram showing the rotation-stopped state of the members at the individual gear ranges in the automatic transmission gear shift control apparatus of the 9-1st embodiment is similar to that of FIG. 49, so that its illustration and description are omitted. Here, the shifting actions and the torque flows are similar to those of the second embodiment so that their descriptions are omitted.

The effects will be described in the following.

As has been described hereinbefore, the automatic transmission gear shift control apparatus of the ninth embodiment can obtain, in addition to effects (excepting the effect (5) of the first embodiment) of the second embodiment, the effect (16) of the eighth embodiment, that is, the step ratio can be made wider to improve the degree of freedom for setting the gear ratios better and to enhance the degree of freedom for the design.

Tenth Embodiment 10-1st Embodiment

First of all, the construction will be described in the following.

Figure 53:
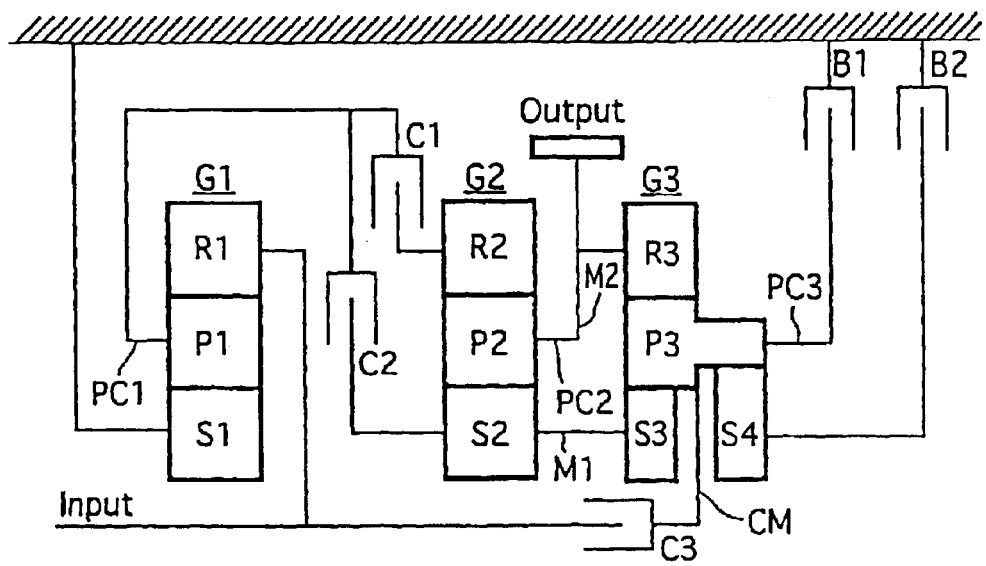
FIG. 53 is a schematic diagram showing a gear shift control apparatus for an automatic transmission of a 10-1st embodiment.

The 10-1st embodiment is directed to automatic transmission gear shift control apparatus corresponding to inventions defined in Claims 2, 5, 7, 10 and 15, and FIG. 53 is a schematic diagram showing the automatic transmission gear shift control apparatus of the 10-1st embodiment.

In FIG. 48: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-increasing single type 1+the stepped pinion type 1) of the 10-2nd embodiment, the third sun gear S3 and the fourth sun gear S4 of the automatic transmission gear shift control apparatus (of the speed-increasing single type 1) of the third embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically larger portion of the third stepped pinion P3. Here, the remaining construction is similar to that of the third embodiment so that its description is omitted.

The actions will be described in the following.

Figure 54:
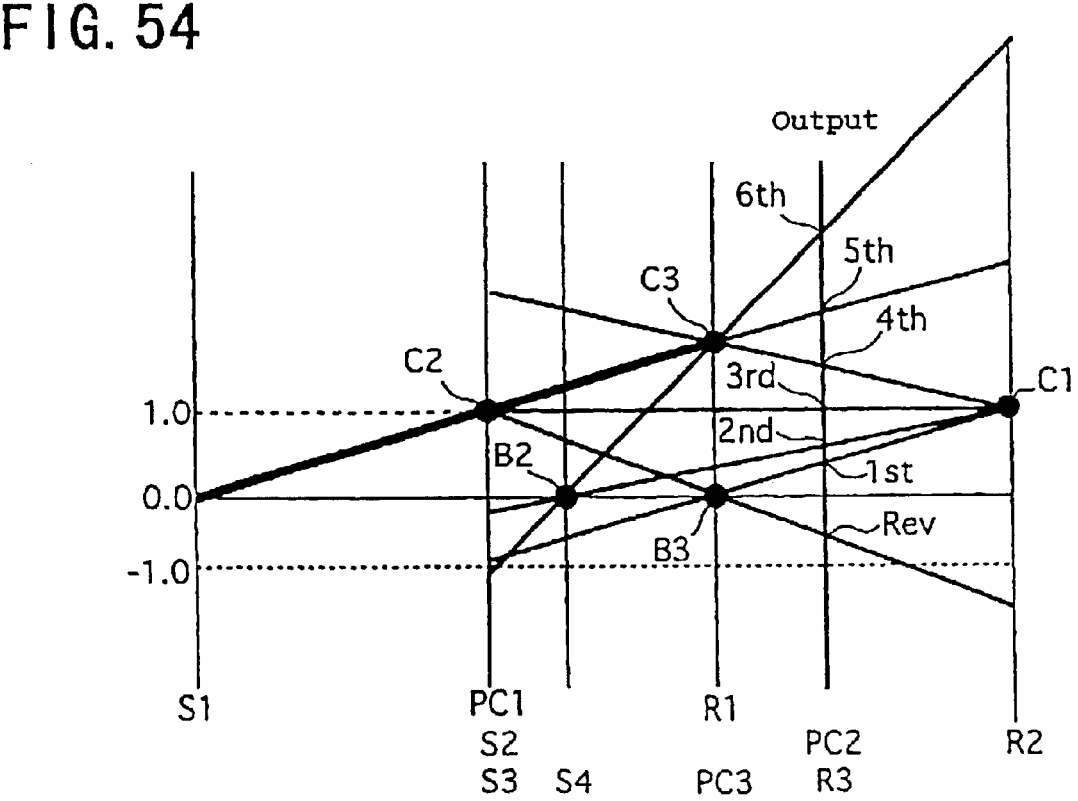
FIG. 54 is a collinear diagram in the automatic transmission gear shift control apparatus of the 10-1st embodiment.

FIG. 54 is a collinear diagram showing the rotation-stopped state of the members at the individual gear ranges in the automatic transmission gear shift control apparatus of the 10-1st embodiment.

As compared with the third embodiment, the 10-1st embodiment is different in that the third sun gear S3 and the fourth sun gear S4 have different speeds. Here, the shifting actions and the torque flows are similar to those of the third embodiment so that their descriptions are omitted.

10-2nd Embodiment

First of all, the construction will be described in the following.

Figure 55:
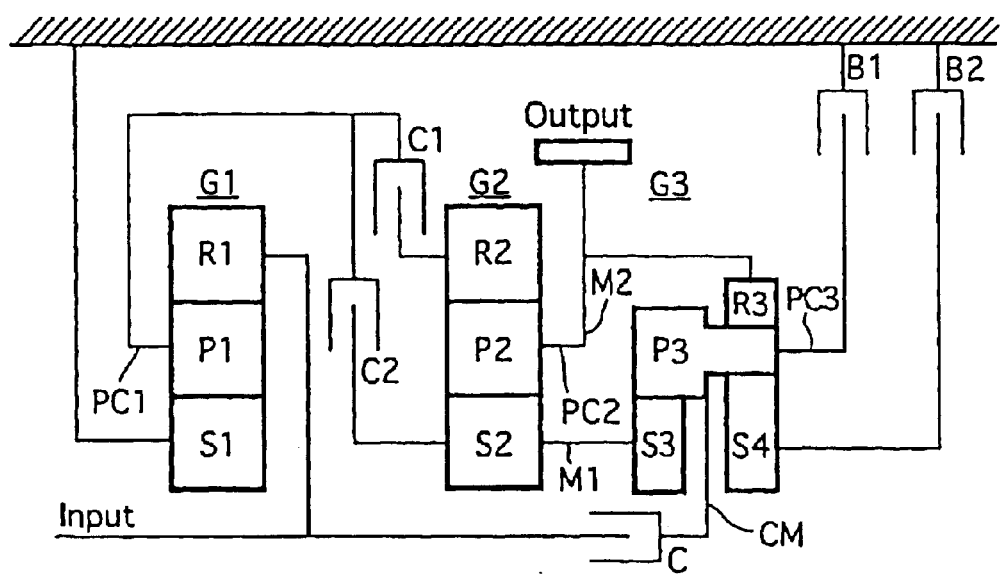
FIG. 55 is a schematic diagram showing a gear shift control apparatus for an automatic transmission of a 10-2nd embodiment.

The 10-2nd embodiment is directed to automatic transmission gear shift control apparatus corresponding to inventions defined in Claims 2, 5, 7, 10 and 15, and FIG. 55 is a schematic diagram showing the automatic transmission gear shift control apparatus of the 10-2nd embodiment.

In FIG. 55: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-increasing single type 1+the stepped pinion type 2) of the 10-2nd embodiment, the third sun gear S3 and the fourth sun gear S4 of the automatic transmission gear shift control apparatus (of the speed-increasing single type 1) of the third embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically smaller portion of the third stepped pinion P3. Here, the remaining construction is similar to that of the third embodiment so that its description is omitted.

Moreover, the collinear diagram showing the rotation-stopped state of the members at the individual gear ranges in the automatic transmission gear shift control apparatus of the 10-1st embodiment is similar to that of FIG. 54, so that its illustration and description are omitted.

The effects will be described in the following.

As has been described hereinbefore, the automatic transmission gear shift control apparatus of the tenth embodiment can obtain, in addition to effects (excepting the effect (5) of the first embodiment) of the third embodiment, the effect (16) of the eighth embodiment, that is, the step ratio can be made wider to improve the degree of freedom for setting the gear ratios better and to enhance the degree of freedom for the design.

Eleventh Embodiment 11-1st Embodiment

First of all, the construction will be described in the following.

Figure 56:
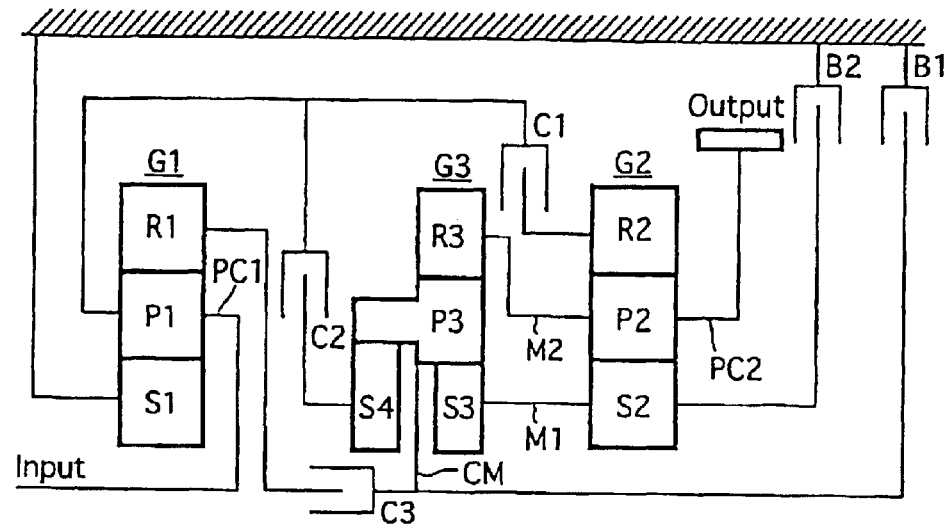
FIG. 56 is a schematic diagram showing a gear shift control apparatus for an automatic transmission of an 11-1st embodiment.

The 11-1st embodiment is directed to automatic transmission gear shift control apparatus corresponding to inventions defined in Claims 2, 5, 7, 11 and 15, and FIG. 56 is a schematic diagram showing the automatic transmission gear shift control apparatus of the 11-1st embodiment.

In FIG. 56: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-increasing single type 2+the stepped pinion type 1) of the 11-1st embodiment, the third sun gear S3 and the fourth sun gear S4 of the automatic transmission gear shift control apparatus (of the speed-increasing single type 2) of the fourth embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically larger portion of the third stepped pinion P3. Here, the remaining construction is similar to that of the fourth embodiment so that its description is omitted.

Moreover, the collinear diagram showing the rotation-stopped state of the members at the individual gear ranges in the automatic transmission gear shift control apparatus of the 11-1st embodiment is similar to that of FIG. 54, so that its illustration and description are omitted. Here, the shifting actions and the torque flows are similar to those of the fourth embodiment so that their descriptions are omitted.

11-2nd Embodiment

First of all, the construction will be described in the following.

Figure 57:
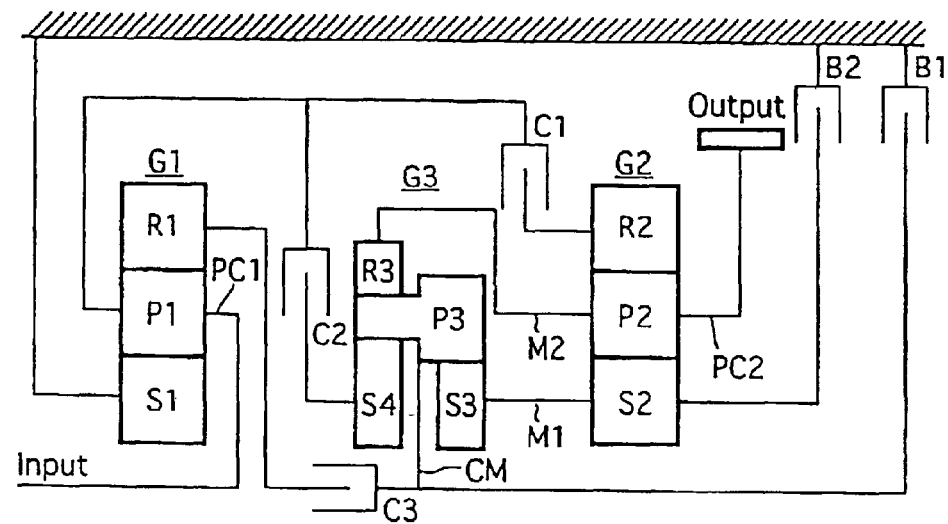
FIG. 57 is a schematic diagram showing a gear shift control apparatus for an automatic transmission of an 11-2nd embodiment.

The 11-2nd embodiment is directed to automatic transmission gear shift control apparatus corresponding to inventions defined in Claims 2, 5, 7, 11 and 15, and FIG. 57 is a schematic diagram showing the automatic transmission gear shift control apparatus of the 11-2nd embodiment.

In FIG. 57: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-increasing single type 2+the stepped pinion type 2) of the 11-2nd embodiment, the third sun gear S3 and the fourth sun gear S4 of the automatic transmission gear shift control apparatus (of the speed-increasing single type 2) of the fourth embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically smaller portion of the third stepped pinion P3. Here, the remaining construction is similar to that of the fourth embodiment so that its description is omitted.

Moreover, the collinear diagram showing the rotation-stopped state of the members at the individual gear ranges in the automatic transmission gear shift control apparatus of the 11-2nd embodiment is similar to that of FIG. 54, so that its illustration and description are omitted. Here, the shifting actions and the torque flows are similar to those of the fourth embodiment so that their descriptions are omitted.

The effects will be described in the following.

As has been described hereinbefore, the automatic transmission gear shift control apparatus of the eleventh embodiment can obtain, in addition to effects (excepting the effect (5) of the first embodiment) of the fourth embodiment, the effect (16) of the eighth embodiment, that is, the step ratio can be made wider to improve the degree of freedom for setting the gear ratios better and to enhance the degree of freedom for the design.

Twelfth Embodiment 12-1st Embodiment

First of all, the construction will be described in the following.

Figure 58:
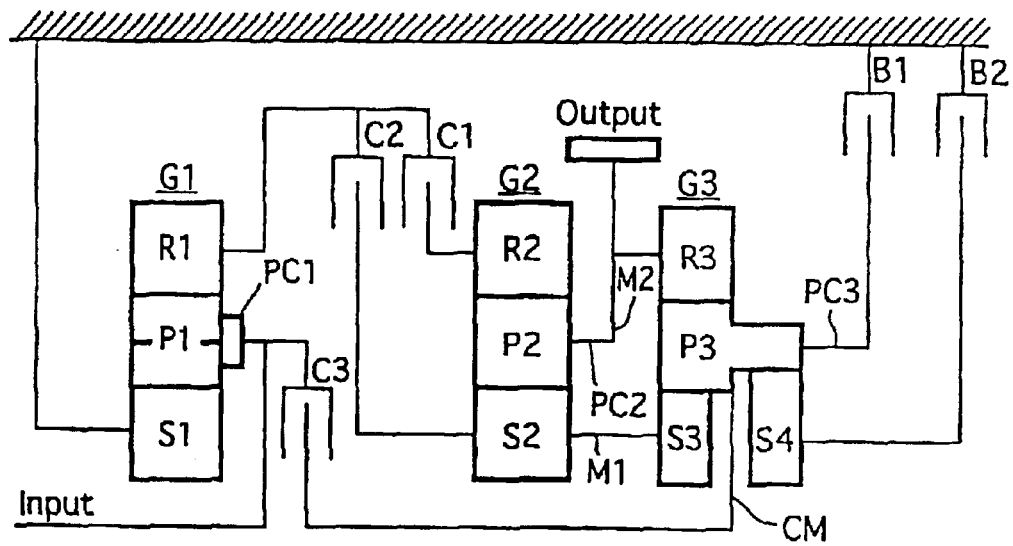
FIG. 58 is a schematic diagram showing a gear shift control apparatus for an automatic transmission of a 12-1st embodiment.

The 12-1st embodiment is directed to automatic transmission gear shift control apparatus corresponding to inventions defined in Claims 1, 4, 7, 12 and 15, and FIG. 58 is a schematic diagram showing the automatic transmission gear shift control apparatus of the 12-1st embodiment.

In FIG. 58: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-reducing double type 1+a stepped pinion type 1) of the 12-1st embodiment, the third sun gear S3 and the fourth sun gear S4 of the automatic transmission gear shift control apparatus (of the speed-reducing double type 1) of the 5-1st embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically larger portion of the third stepped pinion P3. Here, the remaining construction is similar to that of the 5-1st embodiment so that its description is omitted.

The actions will be described in the following.

Figure 59:
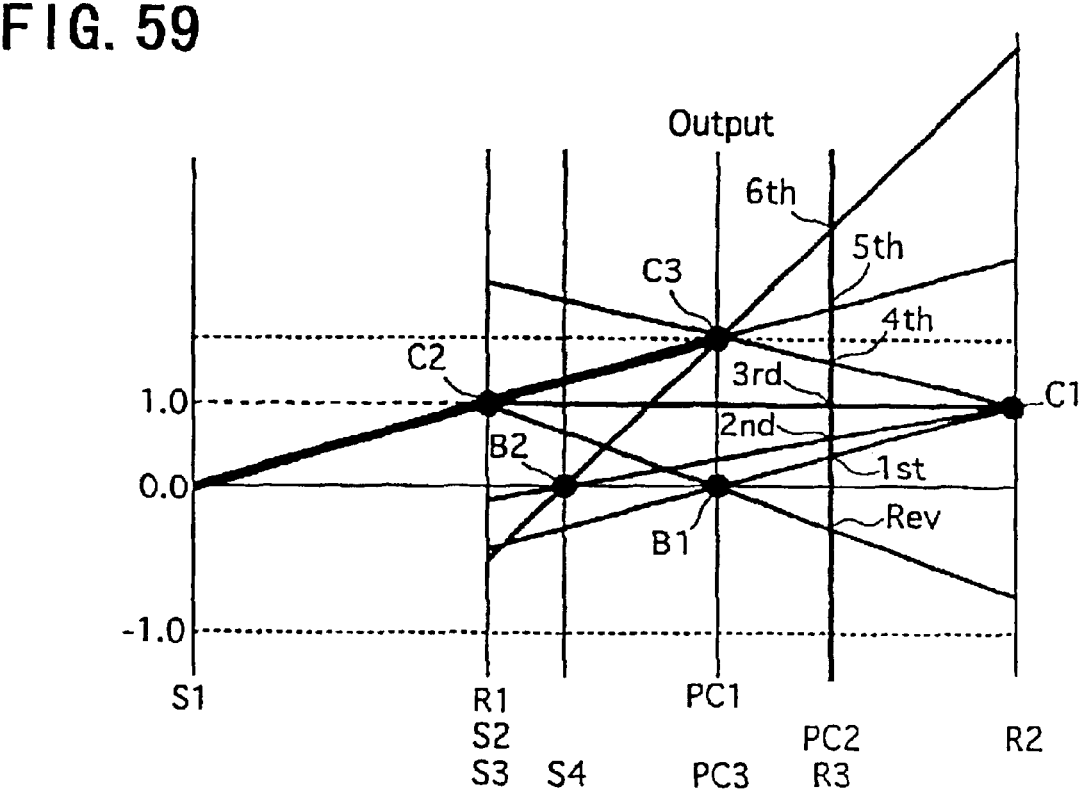
FIG. 59 is a collinear diagram in the automatic transmission gear shift control apparatus of the 12-1st embodiment.

FIG. 59 is a collinear diagram showing the rotation-stopped state of the members at the individual gear ranges in the automatic transmission gear shift control apparatus of the 12-1st embodiment.

As compared with the 5-1st embodiment, the 12-1st embodiment is different in that the third sun gear S3 and the fourth sun gear S4 have different speeds. Here, the shifting actions and the torque flows are similar to those of the 5-1st embodiment so that their descriptions are omitted.

12-2nd Embodiment

First of all, the construction will be described in the following.

Figure 60:
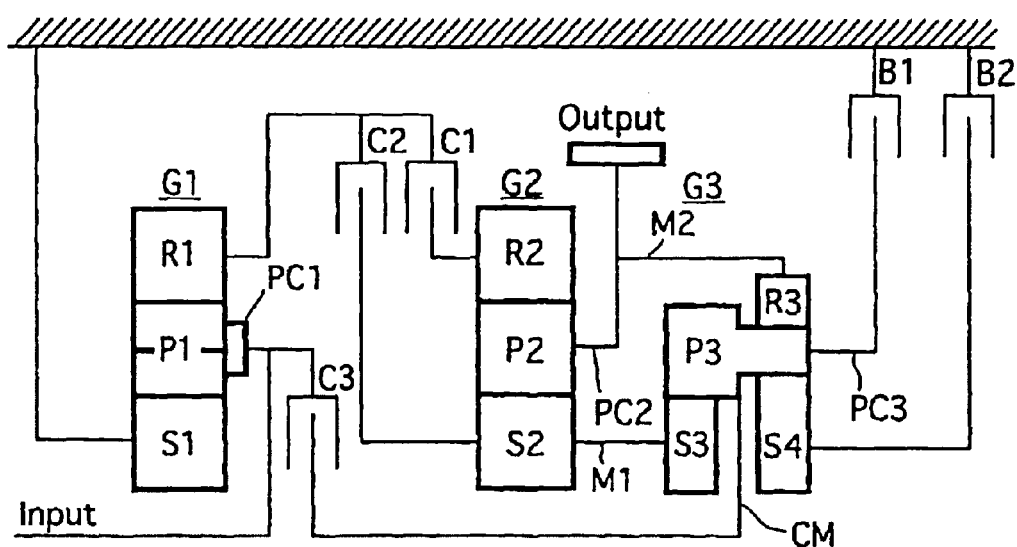
FIG. 60 is a schematic diagram showing a gear shift control apparatus for an automatic transmission of a 12-2nd embodiment.

The 12-2nd embodiment is directed to automatic transmission gear shift control apparatus corresponding to inventions defined in Claims 1, 4, 7, 12 and 15, and FIG. 60 is a schematic diagram showing the automatic transmission gear shift control apparatus of the 12-2nd embodiment.

In FIG. 60: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-reducing double type 1+the stepped pinion type 2) of the 12-2nd embodiment, the third sun gear S3 and the fourth sun gear S4 of the automatic transmission gear shift control apparatus (of the speed-reducing double type 1) of the 5-1st embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically smaller portion of the third stepped pinion P3. Here, the remaining construction is similar to that of the 5-1st embodiment so that its description is omitted.

Moreover, the collinear diagram showing the rotation-stopped state of the members at the individual gear ranges in the automatic transmission gear shift control apparatus of the 12-2nd embodiment is similar to that of FIG. 59, so that its illustration and description are omitted.

The effects will be described in the following.

As has been described hereinbefore, the automatic transmission gear shift control apparatus of the twelfth embodiment can obtain, in addition to effects (excepting the effect (5) of the first embodiment) of the fifth embodiment, the effect (16) of the eighth embodiment, that is, the step ratio can be made wider to improve the degree of freedom for setting the gear ratios better and to enhance the degree of freedom for the design.

Thirteenth Embodiment 13-1st Embodiment

First of all, the construction will be described in the following.

Figure 61:
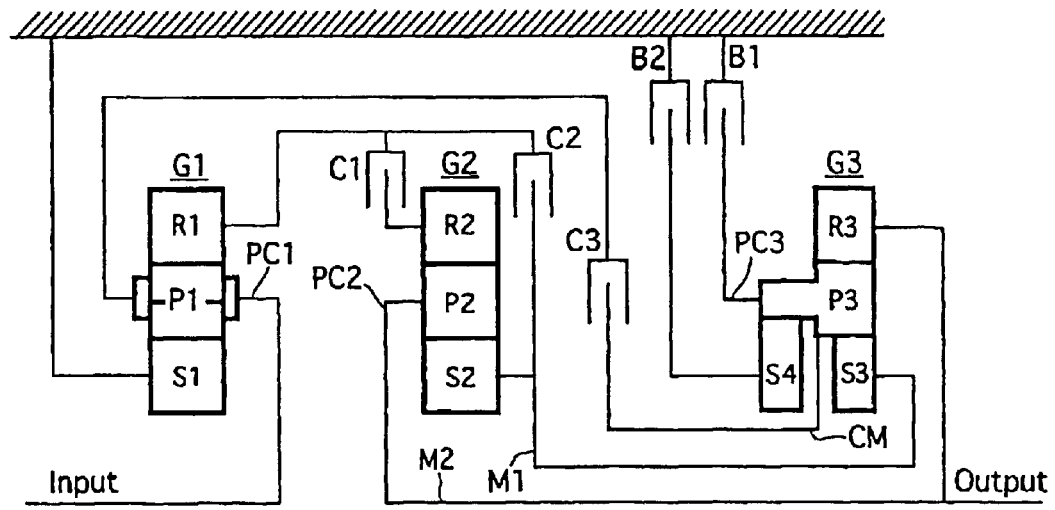
FIG. 61 is a schematic diagram showing a gear shift control apparatus for an automatic transmission of a 13-1st embodiment.

The 13-1st embodiment is directed to automatic transmission gear shift control apparatus corresponding to inventions defined in Claims 1, 4, 7, 12 and 15, and FIG. 61 is a schematic diagram showing the automatic transmission gear shift control apparatus of the 13-1st embodiment.

In FIG. 61: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output shaft (or an output portion).

In this automatic transmission gear shift control apparatus (the speed-reducing double type 2+the stepped pinion type 1) of the 13-1st embodiment, the third sun gear S3 and the fourth sun gear S4 of the automatic transmission gear shift control apparatus (of the speed-reducing double type 2) of the 5-2nd embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically larger portion of the third stepped pinion P3. Here, the remaining construction is similar to that of the 5-2nd embodiment so that its description is omitted.

Moreover, the collinear diagram showing the rotation-stopped state of the members at the individual gear ranges in the automatic transmission gear shift control apparatus of the 13-1st embodiment is similar to that of FIG. 59, so that its illustration and description are omitted. Here, the shifting actions and the torque flows are similar to those of the 5-2nd embodiment so that their descriptions are omitted.

13-2nd Embodiment

First of all, the construction will be described in the following.

Figure 62:
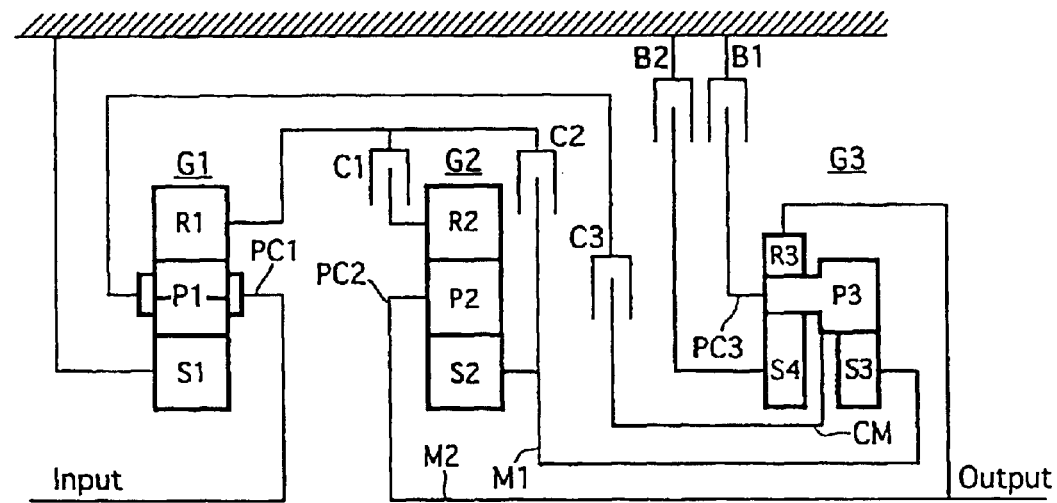
FIG. 62 is a schematic diagram showing a gear shift control apparatus for an automatic transmission of a 13-2nd embodiment.

The 13-2nd embodiment is directed to automatic transmission gear shift control apparatus corresponding to inventions defined in Claims 1, 4, 7, 12 and 15, and FIG. 62 is a schematic diagram showing the automatic transmission gear shift control apparatus of the 13-2nd embodiment.

In FIG. 62: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output shaft (or an output portion).

In this automatic transmission gear shift control apparatus (the speed-reducing double type 2+the stepped pinion type 2) of the 13-2nd embodiment, the third sun gear S3 and the fourth sun gear S4 of the automatic transmission gear shift control apparatus (of the speed-reducing double type 2) of the 5-2nd embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically smaller portion of the third stepped pinion P3. Here, the remaining construction is similar to that of the 5-2nd embodiment so that its description is omitted.

Moreover, the collinear diagram showing the rotation-stopped state of the members at the individual gear ranges in the automatic transmission gear shift control apparatus of the 13-2nd embodiment is similar to that of FIG. 59, so that its illustration and description are omitted. Here, the shifting actions and the torque flows are similar to those of the 5-2nd embodiment so that their descriptions are omitted.

The effects will be described in the following.

As has been described hereinbefore, the automatic transmission gear shift control apparatus of the thirteenth embodiment can obtain, in addition to effects (excepting the effect (5) of the first embodiment) of the fifth embodiment, the effect (16) of the eighth embodiment, that is, the step ratio can be made wider to improve the degree of freedom for setting the gear ratios better and to enhance the degree of freedom for the design.

Fourteenth Embodiment 14-1st Embodiment

First of all, the construction will be described in the following.

Figure 63:
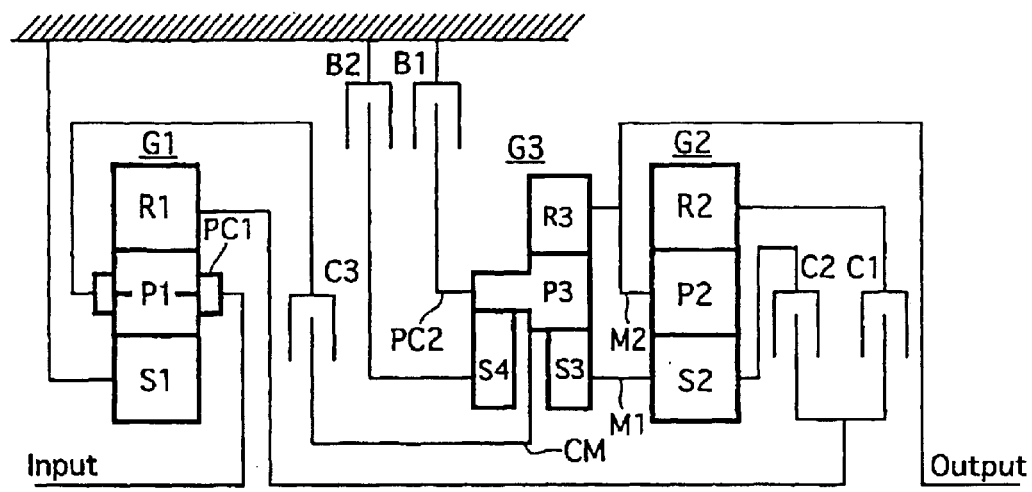
FIG. 63 is a schematic diagram showing a gear shift control apparatus for an automatic transmission of a 14-1st embodiment.

The 14-1st embodiment is directed to automatic transmission gear shift control apparatus corresponding to inventions defined in Claims 1, 4, 7, 12 and 15, and FIG. 63 is a schematic diagram showing the automatic transmission gear shift control apparatus of the 14-1st embodiment.

In FIG. 63: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output shaft (or an output portion).

In this automatic transmission gear shift control apparatus (the speed-reducing double type 3+the stepped pinion type 1) of the 14-1st embodiment, the third sun gear S3 and the fourth sun gear S4 of the automatic transmission gear shift control apparatus (of the speed-reducing double type 3) of the 5-3rd embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically larger portion of the third stepped pinion P3. Here, the remaining construction is similar to that of the 5-3rd embodiment so that its description is omitted.

Moreover, the collinear diagram showing the rotation-stopped state of the members at the individual gear ranges in the automatic transmission gear shift control apparatus of the 14-1st embodiment is similar to that of FIG. 59, so that its illustration and description are omitted. Here, the shifting actions and the torque flows are similar to those of the 5-3rd embodiment so that their descriptions are omitted.

14-2nd Embodiment

First of all, the construction will be described in the following.

Figure 64:
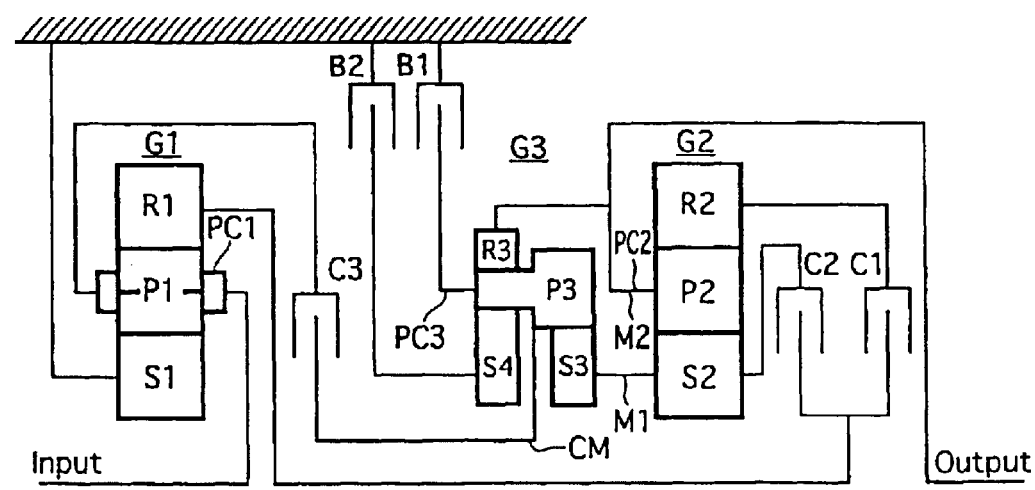
FIG. 64 is a schematic diagram showing a gear shift control apparatus for an automatic transmission of a 14-2nd embodiment.

The 14-2nd embodiment is directed to automatic transmission gear shift control apparatus corresponding to inventions defined in Claims 1, 4, 7, 12 and 15, and FIG. 64 is a schematic diagram showing the automatic transmission gear shift control apparatus of the 14-2nd embodiment.

In FIG. 64: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output shaft (or an output portion).

In this automatic transmission gear shift control apparatus (the speed-reducing double type 3+the stepped pinion type 2) of the 14-2nd embodiment, the third sun gear S3 and the fourth sun gear S4 of the automatic transmission gear shift control apparatus (of the speed-reducing double type 3) of the 5-3rd embodiment are given different tooth numbers to change the third pinion P3 into a third stepped pinion P3 having portions of different tooth numbers and of a larger diameter meshing with the third sun gear S3 and of a smaller diameter meshing with the fourth sun gear S4, and the third ring gear R3 meshes with the diametrically smaller portion of the third stepped pinion P3. Here, the remaining construction is similar to that of the 5-3rd embodiment so that its description is omitted.

Moreover, the collinear diagram showing the rotation-stopped state of the members at the individual gear ranges in the automatic transmission gear shift control apparatus of the 14-2nd embodiment is similar to that of FIG. 59, so that its illustration and description are omitted. Here, the shifting actions and the torque flows are similar to those of the 5-2nd embodiment so that their descriptions are omitted.

The effects will be described in the following.

As has been described hereinbefore, the automatic transmission gear shift control apparatus of the fourteenth embodiment can obtain, in addition to effects (excepting the effect (5) of the first embodiment) of the fifth embodiment, the effect (16) of the eighth embodiment, that is, the step ratio can be made wider to improve the degree of freedom for setting the gear ratios better and to enhance the degree of freedom for the design.

Fifteenth Embodiment 15-1st Embodiment

First of all, the construction will be described in the following.

Figure 65:
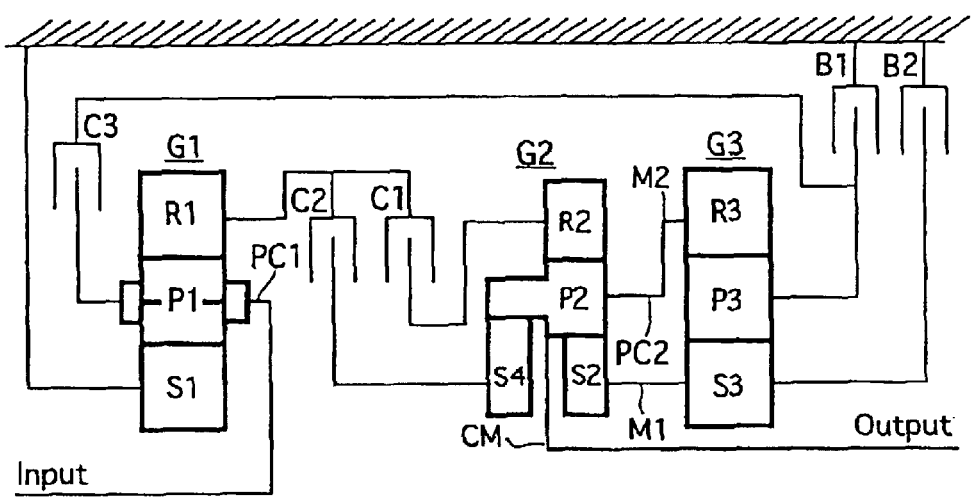
FIG. 65 is a schematic diagram showing a gear shift control apparatus for an automatic transmission of a 15-1st embodiment.

The 15-1st embodiment is directed to automatic transmission gear shift control apparatus corresponding to inventions defined in Claims 1, 4, 7, 13 and 15, and FIG. 65 is a schematic diagram showing the automatic transmission gear shift control apparatus of the 15-1st embodiment.

In FIG. 65: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-reducing double type 4+the stepped pinion type 1) of the 15-1st embodiment, the second sun gear S2 and the fourth sun gear S4 of the automatic transmission gear shift control apparatus (of the speed-reducing single type 4) of the sixth embodiment are given different tooth numbers to change the second pinion P2 into a second stepped pinion P2 having portions of different tooth numbers and of a larger diameter meshing with the second sun gear S2 and of a smaller diameter meshing with the fourth sun gear S4, and the second ring gear R2 meshes with the diametrically larger portion of the second stepped pinion P2. Here, the remaining construction is similar to that of the sixth embodiment so that its description is omitted.

The actions will be described in the following.

Figure 66:
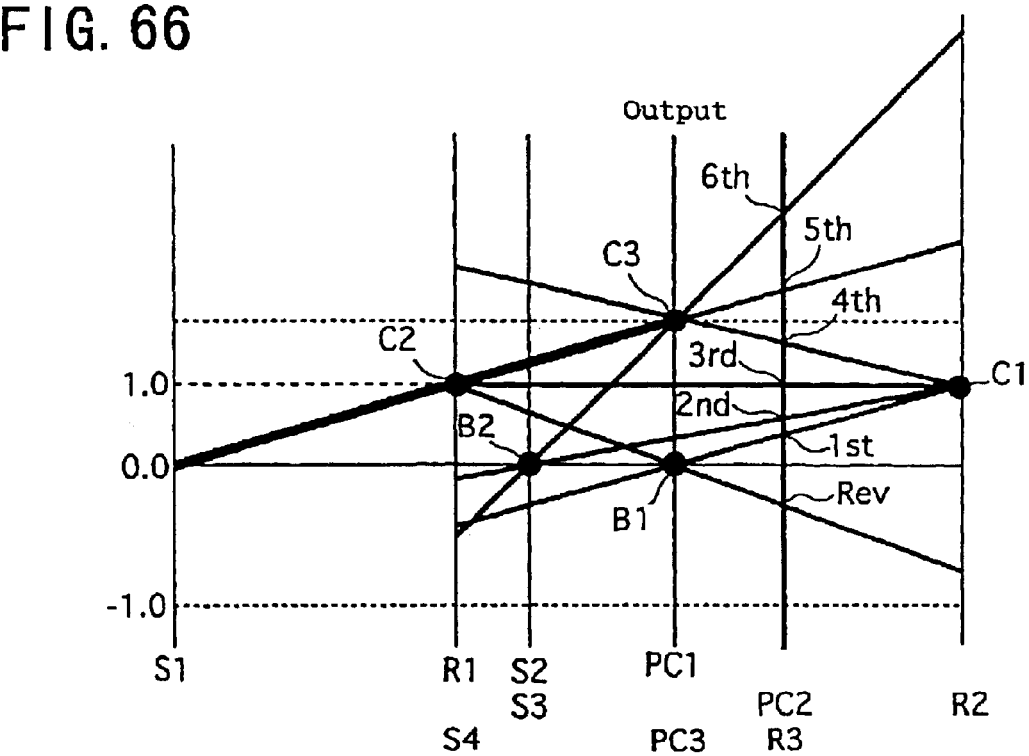
FIG. 66 is a collinear diagram in the automatic transmission gear shift control apparatus of the 15-1st embodiment.

FIG. 66 is a collinear diagram showing the rotation-stopped state of the members at the individual gear ranges in the automatic transmission gear shift control apparatus of the 15-1st embodiment.

As compared with the first embodiment, the 8-1st embodiment is different in that the second sun gear S2 and the fourth sun gear S4 have different speeds. Here, the shifting actions and the torque flows are similar to those of the sixth embodiment so that their descriptions are omitted.

15-2nd Embodiment

First of all, the construction will be described in the following.

Figure 67:
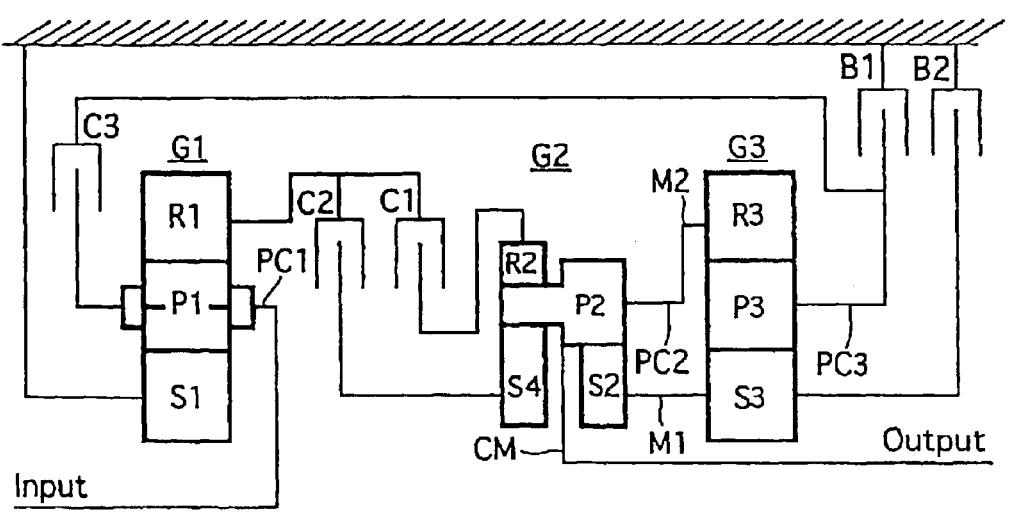
FIG. 67 is a schematic diagram showing a gear shift control apparatus for an automatic transmission of a 15-2nd embodiment.

The 15-2nd embodiment is directed to automatic transmission gear shift control apparatus corresponding to inventions defined in Claims 1, 3, 7, 13 and 15, and FIG. 67 is a schematic diagram showing the automatic transmission gear shift control apparatus of the 8-2nd embodiment.

In FIG. 67: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-reducing double type 4+the stepped pinion type 2) of the 15-2nd embodiment, the second sun gear S2 and the fourth sun gear S4 of the automatic transmission gear shift control apparatus (of the speed-reducing double type 4) of the sixth embodiment are given different tooth numbers to change the second pinion P2 into a second stepped pinion P2 having portions of different tooth numbers and of a larger diameter meshing with the second sun gear S2 and of a smaller diameter meshing with the fourth sun gear S4, and the second ring gear R2 meshes with the diametrically smaller portion of the second stepped pinion P2. Here, the remaining construction is similar to that of the first embodiment so that its description is omitted.

Moreover, the collinear diagram showing the rotation-stopped state of the members at the individual gear ranges in the automatic transmission gear shift control apparatus of the 15-2nd embodiment is similar to that of FIG. 66, so that its illustration and description are omitted.

The effects will be described in the following.

As has been described hereinbefore, the automatic transmission gear shift control apparatus of the eighth embodiment can obtain, in addition to effects (1), (3), (11) and (13) of the sixth embodiment, the effect (16) of the eighth embodiment, that is, the step ratio can be made wider to improve the degree of freedom for setting the gear ratios better and to enhance the degree of freedom for the design.

Sixteenth Embodiment
16-1st Embodiment

First of all, the construction will be described in the following.

Figure 68:
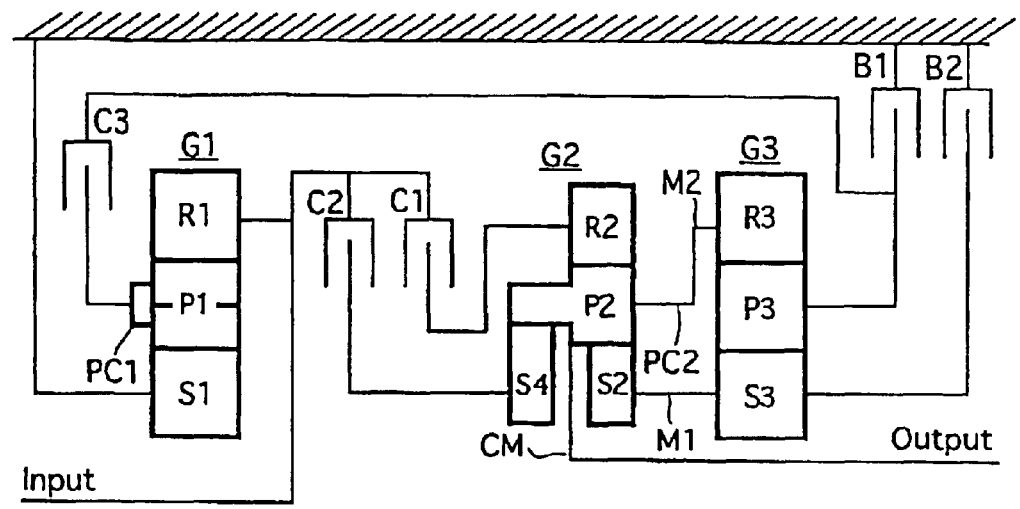
FIG. 68 is a schematic diagram showing a gear shift control apparatus for an automatic transmission of a 16-1st embodiment.

The 16-1st embodiment is directed to automatic transmission gear shift control apparatus corresponding to inventions defined in Claims 2, 6, 7, 14 and 15, and FIG. 68 is a schematic diagram showing the automatic transmission gear shift control apparatus of the 15-1st embodiment.

In FIG. 68: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

In this automatic transmission gear shift control apparatus (the speed-increasing double type 1+the stepped pinion type 1) of the 16-1st embodiment, the second sun gear S2 and the fourth sun gear S4 of the automatic transmission gear shift control apparatus (of the speed-increasing double type 1) of the seventh embodiment are given different tooth numbers to change the second pinion P2 into a second stepped pinion P2 having portions of different tooth numbers and of a larger diameter meshing with the second sun gear S2 and of a smaller diameter meshing with the fourth sun gear S4, and the second ring gear R2 meshes with the diametrically larger portion of the second stepped pinion P2. Here, the remaining construction is similar to that of the seventh embodiment so that its description is omitted.

The actions will be described in the following.

Figure 69:
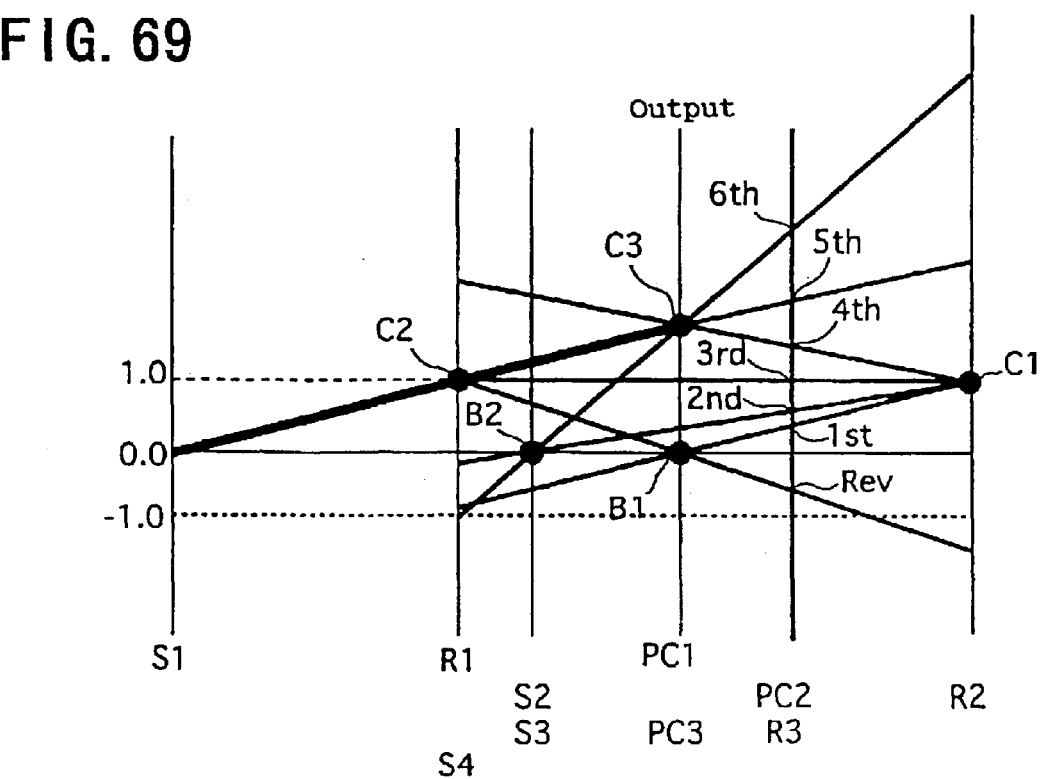
FIG. 69 is a collinear diagram in the automatic transmission gear shift control apparatus of the 16-1st embodiment.

FIG. 69 is a collinear diagram showing the rotation-stopped state of the members at the individual gear ranges in the automatic transmission gear shift control apparatus of the 16-1st embodiment.

As compared with the seventh embodiment, the 16-1st embodiment is different in that the third sun gear S3 and the fourth sun gear S4 have different speeds. Here, the shifting actions and the torque flows are similar to those of the seventh embodiment so that their descriptions are omitted.

16-2nd Embodiment

First of all, the construction will be described in the following.

Figure 70:
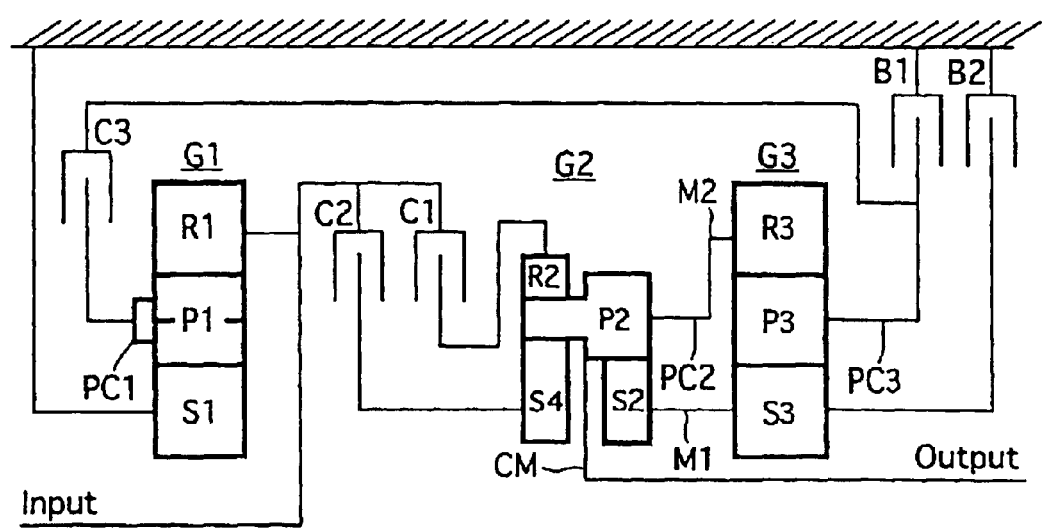
FIG. 70 is a schematic diagram showing a gear shift control apparatus for an automatic transmission of a 16-2nd embodiment.

The 16-2nd embodiment is directed to automatic transmission gear shift control apparatus corresponding to inventions defined in Claims 2, 6, 7, 14 and 15, and FIG. 70 is a schematic diagram showing the automatic transmission gear shift control apparatus of the 15-2nd embodiment.

In FIG. 70: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output shaft (or an output portion).

In this automatic transmission gear shift control apparatus (the speed-increasing double type 1+the stepped pinion type 2) of the 16-2nd embodiment, the second sun gear S2 and the fourth sun gear S4 of the automatic transmission gear shift control apparatus (of the speed-increasing double type 1) of the seventh embodiment are given different tooth numbers to change the second pinion P2 into a second stepped pinion P2 having portions of different tooth numbers and of a larger diameter meshing with the second sun gear S2 and of a smaller diameter meshing with the fourth sun gear S4, and the second ring gear R2 meshes with the diametrically smaller portion of the second stepped pinion P2. Here, the remaining construction is similar to that of the seventh embodiment so that its description is omitted.

Moreover, the collinear diagram showing the rotation-stopped state of the members at the individual gear ranges in the automatic transmission gear shift control apparatus of the 16-2nd embodiment is similar to that of FIG. 69, so that its illustration and description are omitted.

The effects will be described in the following.

As has been described hereinbefore, the automatic transmission gear shift control apparatus of the fifteenth embodiment can obtain, in addition to effects (excepting the effect (5) of the first embodiment) of the seventh embodiment, the effect (16) of the eighth embodiment, that is, the step ratio can be made wider to improve the degree of freedom for setting the gear ratios better and to enhance the degree of freedom for the design.

Although the gear shift control apparatus for the automatic transmission of the present invention has been described on the basis of the first embodiment to the sixteenth embodiment, its specific construction should not be limited to those of the embodiments, but a change, an addition and so on can be allowed so long as it does not deviate from the gist of the present invention, as defined in the individual Claims.

INDUSTRIAL APPLICABILITY

As has been described hereinbefore, the automatic transmission gear shift control apparatus according to the present invention is useful as the gear shift control apparatus for a vehicle demanding more gear ranges and, in particular, is suitable for use in the gear shift control section of the automatic transmission which is connected to the drive source output shaft of an automobile having an engine or motor mounted thereon as the drive source.

What is claimed is:

1. A gear shift control apparatus for an automatic transmission comprising:

an input portion for inputting a rotation from a drive source;

an output portion for outputting a shifted-gear rotation;

three sets of planetary gearsets;

a plurality of members for connecting a plurality of rotary elements integrally;

three selectively connecting/disconnecting clutches and two selectively fixing brakes positioned between respective rotary elements of the input portion, the output portion, the members and the three planetary gearsets; and a gear shift control apparatus for obtaining at least six forward speeds and one reverse speed by engaging/releasing the three clutches and two brakes properly;

wherein one of the three planetary gearsets is a speed-reducing device for reducing the speed of the input rotation always, wherein one of the remaining two planetary gearsets is a double sun gear type planetary gearset including two sun gears, a pinion meshing with each of the two sun gears, a carrier having a center member positioned between the two sun gears for inputting or outputting a rotation, and one ring gear meshing with the pinion, wherein assuming that the planetary gearset that functions as the speed-reducing device is a first planetary gearset, the double sun gear type planetary gearset having the double sun gears is a third planetary gearset and the remaining planetary gearset is a second planetary gearset, wherein the second planetary gearset and the third planetary gearset are the planetary gearsets that are constructed of five rotary members including the connection members for connecting the rotary members of the second planetary gearset and the rotary members of the third planetary gearset integrally; and wherein the gear shift control apparatus comprises:
a first rotary member having one sun gear of the third planetary gearset and connected to a second brake capable of selectively stopping the one sun gear;
a second rotary member having the other sun gear of the third planetary gearset and connected to a second clutch capable of selectively connecting/disconnecting the sun near and one member of the first planetary gearset, wherein a rotation of the one member of the first planetary gearset is reduced in speed more than the input portion;
a third rotary member having the connection member and connected to the output portion;
a fourth rotary member connected to a third clutch capable of selectively connection/disconnecting another member of the first planetary gearset, which another member is connected to the input portion, and a first brake capable of stopping selectively;
a fifth rotary member connected to a first clutch capable of connecting/disconnecting one member of the first planetary gearset selectively; and
gear shift control means for obtaining the first forward speed by engagement of the first clutch and the first brake, the second forward speed by engagement of the first clutch and the second brake, the third forward speed by engagement of the first clutch and the second clutch, the fourth forward speed by engagement of the first clutch and the third clutch, the fifth forward speed by engagement of the second clutch and the third clutch, the sixth forward speed by engagement of the third clutch and the second brake, and the reverse speed by engagement of the second clutch and the first brake, thereby establishing the at least six forward speeds and the one reverse speed.

2. A gear shift control apparatus for an automatic transmission as set forth in claim 1, wherein one planetary gearset of the speed-reducing device is of a single-pinion type.

3. A gear shift control apparatus for an automatic transmission as set forth in claim 1, wherein one planetary gearset of the speed-reducing device is of a double-pinion type.

4. A gear shift control apparatus for an automatic transmission comprising:
an input portion for inputting a rotation from a drive source;
an output portion for outputting a shifted-gear rotation;
three sets of planetary gearsets;
a plurality of members for connecting a plurality of rotary elements integrally;
three selectively connecting/disconnecting clutches and two selectively fixing brakes positioned between respective rotary elements of the input portion, the output portion, the members and the three planetary gearsets; and
a gear shift control apparatus for obtaining at least six forward speeds and one reverse speed by engaging/releasing the three clutches and two brakes properly,
wherein one of the three planetary gearsets is a speed-increasing device for increasing the speed of the input rotation always,
wherein one of the remaining two planetary gearsets is a double sun gear type planetary gearset including two sun gears, a pinion meshing with each of the two sun gears, a carrier having a center member positioned between the two sun gears for inputting or outputting a rotation, and one ring gear meshing with the pinion,
wherein assuming that the planetary gearset that functions as the speed-increasing device is a first planetary gearset, the double sun gear type planetary gearset having the double sun gears is a third planetary gearset and the remaining planetary gearset is a second planetary gearset,
wherein the second planetary gearset and the third planetary gearset are the planetary gearsets that are constructed of five rotary members including the connection members for connecting the rotary members of the second planetary gearset and the rotary members of the third planetary gearset integrally; and wherein the gear shift control apparatus comprises:
a first rotary member having one sun gear of the third planetary gearset and connected to a second brake capable of selectively stopping the one sun gear;
a second rotary member having the other sun gear of the third planetary gearset and connected to a second clutch capable of selectively connecting/disconnecting the sun gear and one member of the first planetary gearset, which one member of the first planetary gearset is connected to the input portion;
a third rotary member having the connection member and connected to the output portion;
a fourth rotary member connected to a third clutch capable of selectively connecting/disconnecting another member of the first planetary gearset, which another member is increased in speed more than the imputer portion, and a first brake capable of stopping selectively;
a fifth rotary member connected to a first clutch capable of connecting/disconnecting one member of the first planetary gearset selectively; and
gear shift control means for obtaining the first forward speed by engagement of the first clutch and the first brake, the second forward speed by engagement of the first clutch and the second brake, the third forward speed by engagement of the first clutch and the second clutch, the fourth forward speed by engagement of the first clutch and the third clutch, the fifth forward speed by engagement of the second clutch and the third clutch, the sixth forward speed by engagement of the third clutch and the second brake, and the reverse speed by engagement of the second clutch and the first brake, thereby establishing the at least six forward speeds and the one reverse speed.

5. A gear shift control apparatus for an automatic transmission as set forth in claim 4, wherein one planetary gearset of the speed-increasing device is of a single-pinion type.

6. A gear shift control apparatus for an automatic transmission as set forth in claim 4, wherein one planetary gearset of the speed-increasing device is of a double-pinion type.

7. A gear shift control apparatus for an automatic transmission comprising:
an input portion for inputting a rotation from a drive source;
an output portion for outputting a shifted-gear rotation;
three sets of planetary gearsets,
wherein one of the three planetary gearsets is a speed-reducing device far continuously reducing the speed of the input rotation, and wherein one of the remaining two planetary gearsets is a double sun gear type planetary gearset including two sun gears, a pinion meshing with each of the two sun gears, a carrier having a center member positioned between the two sun gears for inputting or outputting a rotation, and one ring gear meshing with the pinion;

a plurality of members for connecting a plurality of rotary elements integrally;

three selectively connecting/disconnecting clutches and two selectively fixing brakes positioned between respective rotary elements of the input portion, the output portion, the members and the three planetary gearsets;

gear shift control means for obtaining at least six forward speeds and one reverse speed by engaging/releasing the three clutches and two brakes properly;

a first planetary gearset acting as the speed-reducing device and having a first sun gear, a first ring gear, and a first carrier for supporting a first pinion meshing with the first sun gear and the first ring gear;

a single-pinion type second planetary gearset having a second sun gear, a second ring gear, and a second carrier for supporting a second pinion meshing with the second sun gear and the second ring gear;

a double sun gear type third planetary gearset having a third sun gear and fourth sun gear, a center member, a third carrier for supporting a third pinion meshing individually with the two sun gears, and one third ring gear meshing with the third pinion, wherein the input portion is connected to the first ring gear, and wherein the output portion is connected to the second carrier;

a first connection member for connecting the second sun gear and the third sun gear integrally;

a second connection member for connecting the second carrier and the third ring gear integrally;

a first clutch for connecting/disconnecting the first carrier and the second ring gear selectively;

a second clutch for connecting/disconnecting the first carrier and the second sun gear selectively;

a third clutch for connecting/disconnecting the input portion and the center member selectively;

a first brake for stopping the rotation of the third carrier or the center member selectively; and a second brake for stopping the rotation of the fourth sun gear selectively, wherein the gear shift control means obtains the first forward speed by engagement of the first clutch and the first brake, the second forward speed by engagement of the first clutch and the second brake, the third forward speed by engagement of the first clutch and the second clutch, the fourth forward speed by engagement of the first clutch and the third clutch, the fifth forward speed by engagement of the second clutch and the third clutch, the sixth forward speed by engagement of the third clutch and the second brake, and the reverse speed by engagement of the second clutch and the first brake, thereby establishing the at least six forward speeds and the one reverse speed.

8. A gear shift control apparatus for an automatic transmission comprising:

an input portion for inputting a rotation from a drive source;

an output portion for outputting a shifted-gear rotation;

three sets of planetary gearsets, wherein one of the three planetary gearsets is a speed-reducing device for continuously reducing the speed of the input rotation, and wherein one of the remaining two planetary gearsets is a double sun sear type planetary gearset including two sun gears, a pinion meshing with each of the two sun gears, a carrier having a center member positioned between the two sun gears for inputting or outputting a rotation, and one ring gear meshing with the pinion;

a plurality of members for connecting a plurality of rotary elements integrally;

three selectively connecting/disconnecting clutches and two selectively fixing brakes positioned between respective rotary elements of the input portion, the output portion, the members and the three planetary gearsets;

gear shift control means for obtaining at least six forward speeds and one reverse speed by engaging/releasing the three clutches and two brakes properly;

a first planetary gearset acting as the speed-reducing device and having a first sun gear, a first ring gear, and a first carrier for supporting a first pinion meshing with the first sun gear and the first ring gear;

a single-pinion type second planetary gearset having a second sun gear, a second ring gear, and a second carrier for supporting a second pinion meshing with the second sun gear and the second ring gear;

a double sun gear type third planetary gearset having a third sun gear and fourth sun gear, a center member, a third carrier for supporting a third pinion meshing individually with the two sun gears, and one third ring gear meshing with the third pinion, wherein the input portion is connected to the first ring gear, and wherein the output portion is connected to the second carrier;

a first connection member for connecting the second sun gear and the third sun gear integrally;

a second connection member for connecting the second carrier and the third ring gear integrally;

a first clutch for connecting/disconnecting the first carrier and the second ring gear selectively;

a second clutch for connecting/disconnecting the first carrier and the fourth sun gear selectively;

a third clutch for connecting/disconnecting the input portion and the center member selectively;

a first brake for stopping the rotation of the center member selectively; and a second brake for stopping the rotation of the second sun gear selectively, wherein the near shift control means obtains the first forward speed by engagement of the first clutch and the first brake, the second forward speed by engagement of the first clutch and the second brake, the third forward speed by engagement of the first clutch and the second clutch, the fourth forward speed by engagement of the first clutch and the third clutch, the fifth forward speed by engagement of the second clutch and the third clutch, the sixth forward speed by engagement of the third clutch and the second brake, and the reverse speed by engagement of the second clutch and the first brake, thereby establishing the at least six forward speeds and the one reverse speed.

9. A gear shift control apparatus for an automatic transmission comprising:

an input portion for inputting a rotation from a drive source;

an output portion for outputting a shifted-near rotation;

three sets of planetary gearsets,
wherein one of the three planetary gearsets is a speed-increasing device for continuously increasing the speed of the input rotation, and
wherein one of the remain two planetary gearsets is a double sun gear type planetary gearset including two sun gears, a pinion meshing with each of the two sun gears, a carrier having a center member positioned between the two sun gears for inputting or outputting a rotation, and one ring gear meshing with the pinion;

a plurality of members for connecting a plurality of rotary elements integrally;

three selectively connecting/disconnecting clutches and two selectively fixing brakes positioned between respective rotary elements of the input portion, the output portion, the members and the three planetary gearsets;

gear shift control means for obtaining at least six forward speeds and one reverse speed by engaging/releasing the three clutches and two brakes properly;

a first planetary gearset acting as the speed-increasing device and having a first sun gear, a first ring gear, and a first carrier for supporting a first pinion meshing with the first sun gear and the second ring gear;

a single-pinion type second planetary gearset having a second sun gear, a second ring gear, and a second carrier for supporting a second pinion meshing with the second sun gear and the second ring gear;

a double sun gear type third planetary gearset having a third sun gear and fourth sun gear, a center member, a third carrier for supporting a third pinion meshing individually with the two sun gears, and one third ring gear meshing with the third pinion,
wherein the input portion is connected to the first carrier, and
wherein the output portion is connected to the second carrier;

a first connection member for connecting the second sun gear and the third sun gear integrally;

a second connection member for connecting the second carrier and the third ring gear integrally;

a first clutch for connecting/disconnecting the first carrier and the second ring gear selectively;

a second clutch for connecting/disconnecting the first carrier and the second sun gear selectively;

a third clutch for connecting/disconnecting the first ring gear and the center member selectively;

a first brake for stopping the rotation of the third carrier selectively; and a second brake for stopping the rotation of the fourth sun gear selectively, wherein the gear shift control means obtains the first forward speed by engagement of the first clutch and the first brake, the second forward speed by engagement of the first clutch and the second brake, the third forward speed by engagement of the first clutch and the second clutch, the fourth forward speed by engagement of the first clutch and the third clutch, the fifth forward speed by engagement of the second clutch and the third clutch, the sixth forward speed by engagement of the third clutch and the second brake, and the reverse speed by engagement of the second clutch and the first brake, thereby to establish the at least six forward speeds and the one reverse speed.

10. A gear shift control apparatus for an automatic transmission comprising:

an input portion for inputting a rotation from a drive source;

an output portion for outputting a shifted-gear rotation;

three sets of planetary gearsets,
wherein one of the three planetary gearsets is a speed-increasing device for continuously increasing the speed of the input rotation, and
wherein one of the remaining two planetary gearsets is a double sun gear type planetary gearset including two sun gears, a pinion meshing with each of the two sun gears, a carrier having a center member positioned between the two sun gears for inputting or outputting a rotation, and one ring gear meshing with the pinion;

a plurality of members for connecting a plurality of rotary elements integrally;

three selectively connecting/disconnecting clutches and two selectively fixing brakes positioned between respective rotary elements of the input portion, the output portion, the members and the three planetary gearsets;

gear shift control means for obtaining at least six forward speeds and one reverse speed by engaging/releasing the three clutches and two brakes properly;

a first planetary gearset acting as the speed-increasing device and having a first sun gear, a first ring gear, and a first carrier for supporting a first pinion meshing with the first sun gear and the first ring gear;

a single-pinion type second planetary gearset having a second sun gear, a second ring gear, and a second carrier for supporting a second pinion meshing with the second sun gear and the second ring gear;

a double sun gear type third planetary gearset having a third sun gear and fourth sun gear, a center member, a third carrier for supporting a third pinion meshing individually with the two sun gears, and one third ring gear meshing with the third pinion,
wherein the input portion is connected to the first carrier, and
wherein the output portion is connected to the second carrier;

a first connection member for connecting the second sun gear and the third sun gear integrally;

a second connection member for connecting the second carrier and the third ring gear integrally;

a first clutch for connecting/disconnecting the first carrier and the second ring gear selectively;

a second clutch for connecting/disconnecting the first carrier and the fourth sun gear selectively;

a third clutch for connecting/disconnecting the first ring gear and the center member selectively;

a first brake for stopping the rotation of the center member selectively; and a second brake for stopping the rotation of the second sun gear selectively, wherein the gear shift control means obtains the first forward speed by engagement of the first clutch and the first brake, the second forward speed by engagement of the first clutch and the second brake, the third forward speed by engagement of the first clutch and the second clutch, the fourth forward speed by engagement of the first clutch and the third clutch, the fifth forward speed by engagement of the second clutch and the third clutch, the sixth forward speed by engagement of the third clutch and the second brake, and the reverse speed by engagement of the second clutch and the first brake, thereby to establish the at least six forward speeds and the one reverse speed.

11. A gear shift control apparatus for an automatic transmission comprising:

an input portion for inputting a rotation from a drive source;

an output portion for outputting a shifted-gear rotation;

three sets of planetary gearsets,
  wherein one of the three planetary gearsets is a speed-reducing device for continuously reducing the speed of the input rotation, and
  wherein one of the remaining two planetary gearsets is a double sun gear type planetary gearset including two sun gears, a pinion meshing with each of the two sun gears, a carrier having a center member positioned between the two sun gears for inputting or outputting a rotation, and one ring gear meshing with the pinion;

a plurality of members for connecting a plurality of rotary elements integrally;

three selectively connecting/disconnecting clutches and two selectively fixing brakes positioned between respective rotary elements of the input portion, the output portion, the members and the three planetary gearsets;

gear shift control means for obtaining at least six forward speeds and one reverse speed by engaging/releasing the three clutches and two brakes properly;

a double-pinion type first planetary gearset acting as the speed-reducing device and having a first sun gear, a first ring gear, and a first carrier for supporting a first double pinion meshing with the first sun gear and the first ring gear;

a single-pinion type second planetary gearset having a second sun gear, a second ring gear, and a second carrier for supporting a second pinion meshing with the second sun gear and the second ring gear;

a double sun gear type third planetary gearset having a third sun gear and fourth sun gear, a center member, a third carrier for supporting a third pinion meshing individually with the two sun gears, and one third ring gear meshing with the third pinion,
  wherein the input portion is connected to the first carrier, and
  wherein the output portion is connected to the second carrier;

a first connection member for connecting the second sun gear and the third sun gear integrally;

a second connection member for connecting the second carrier and the third ring gear integrally;

a first clutch for connecting/disconnecting the first ring gear and the second ring gear selectively;

a second clutch for connecting/disconnecting the first ring gear and the second sun gear selectively;

a third clutch for connecting/disconnecting the input portion and the center member selectively;

a first brake for stopping the rotation of the third carrier selectively; and a second brake for stopping the rotation of the fourth sun gear selectively, wherein the gear shift control means obtains the first forward speed by engagement of the first clutch and the first brake, the second forward speed by engagement of the first clutch and the second brake, the third forward speed by engagement of the first clutch and the second clutch, the fourth forward speed by engagement of the first clutch and the third clutch, the fifth forward speed by engagement of the second clutch and the third clutch, the sixth forward speed by engagement of the third clutch and the second brake, and the reverse speed by engagement of the second clutch and the first brake, thereby to establish the at least six forward speeds and the one reverse speed.

12. A gear shift control apparatus for an automatic transmission comprising:

an input portion for inputting a rotation from a drive source;

an output portion for outputting a shifted-gear rotation;

three sets of planetary gearsets,
  wherein one of the three planetary gearsets is a speed-reducing device for continuously reducing the speed of the input rotation, and
  wherein one of the remaining two planetary gearsets is a double sun gear type planetary gearset including two sun gears, a pinion meshing with each of the two sun gears, a carrier having a center member positioned between the two sun gears for inputting or outputting a rotation, and one ring gear meshing with the pinion;

a plurality of members for connecting a plurality of rotary elements integrally;

three selectively connecting/disconnecting clutches and two selectively fixing brakes positioned between respective rotary elements of the input portion, the output portion, the members and the three planetary gearsets;

gear shift control means for obtaining at least six forward speeds and one reverse speed by engaging/releasing the three clutches and two brakes properly;

a double-pinion type first planetary gearset acting as the speed-reducing device and having a first sun gear, a first ring gear, and a first carrier for supporting a first double pinion meshing with the first sun gear and the first ring gear;

a double sun gear type second planetary gearset having a second sun gear and fourth sun gear, a center member, a second carrier for supporting a second pinion meshing individually with the two sun gears, and one second ring gear meshing with the second pinion;

a single-pinion type third planetary gearset having a third sun gear, a third ring gear, and a third carrier for supporting a third pinion meshing with the third sun gear and the third ring gear, wherein the input portion is connected to the first carrier, and wherein the output portion connected to the center member;

a first connection member for connecting the second sun gear and the third sun gear integrally;

a second connection member for connecting the second carrier and the third ring gear integrally;

a first clutch for connecting/disconnecting the first ring gear and the second ring gear selectively;

a second clutch for connecting/disconnecting the first ring gear and the fourth sun gear selectively;

a third clutch for connecting/disconnecting the input portion and the third carrier selectively;

a first brake for stopping the rotation of the third carrier selectively; and a second brake for stopping the rotation of the third sun gear selectively, wherein the gear shift control means obtains the first forward speed by engagement of the first clutch and the first brake, the second forward speed by engagement of the first clutch and the second brake, the third forward speed by engagement of the first clutch and the second clutch, the fourth forward speed by engagement of the first clutch and the third clutch, the fifth forward speed by engagement of the second clutch and the third clutch, the sixth forward speed by engagement of the third clutch and the second brake, and the reverse speed by engagement of the second clutch and the first brake, thereby establishing the at least six forward speeds and the one reverse speed.

13. A gear shift control apparatus for an automatic transmission comprising:

an input portion for inputting a rotation from a drive source;

an output portion for outputting a shifted-gear rotation;

three sets of planetary gearsets, wherein one of the three planetary gearsets is a speed-increasing device for continuously increasing the speed of the input rotation, and wherein one of the remaining two planetary gearsets is a double sun gear type planetary gearset including two sun gears, a pinion meshing with each of the two sun gears, a carrier having a center member positioned between the two sun gears for inputting or outputting a rotation, and one ring gear meshing with the pinion;

a plurality of members for connecting a plurality of rotary elements integrally;

three selectively connecting/disconnecting clutches and two selectively fixing brakes positioned between respective rotary elements of the input portion, the output portion, the members and the three planetary gearsets;

gear shift control means for obtaining at least six forward speeds and one reverse speed by engaging/releasing the three clutches and two brakes properly;

a double-pinion type first planetary gearset acting as the speed-increasing device and having a first sun gear, a first ring gear, and a first carrier for supporting a first double pinion meshing with the first sun gear and the first ring gear;

a double sun gear type second planetary gearset having a second sun gear and fourth sun gear, a center member, a second carrier for supporting a second pinion meshing individually with the two sun gears, and one second ring gear meshing with the second pinion;

a single-pinion type third planetary gearset having a third sun gear, a third ring gear, and a third carrier for supporting a third pinion meshing with the third sun gear and the third ring near;

wherein the input portion is connected to the first ring gear;

wherein the output portion is connected to the center member;

a first connection member for connecting the second sun gear and the third sun gear integrally;

a second connection member for connecting the second carrier and the third ring gear integrally;

a first clutch for connecting/disconnecting the first ring gear and the second ring gear selectively;

a second clutch for connecting/disconnecting the first ring gear and the fourth sun gear selectively;

a third clutch for connecting/disconnecting the first carrier and the third carrier selectively;

a first brake for stopping the rotation of the third carrier selectively; and a second brake for stopping rotation of the third sun gear selectively, wherein the gear shift control means obtains the first forward speed by engagement of the first clutch and the first brake, the second forward speed by engagement of the first clutch and the second brake, the third forward speed by engagement of the first clutch and the second clutch, the fourth forward speed by engagement of the first clutch and the third clutch, the fifth forward speed by engagement of the second clutch and the third clutch, the sixth forward speed by engagement of the third clutch and the second brake, and the reverse speed by engagement of the second clutch and the first brake, thereby establishing the at least six forward speeds and the one reverse speed.

14. A gear shift control apparatus for an automatic transmission as set forth in any of claims 1 to 6 or 7 to 13, wherein the double sun gear type planetary gearset is a planetary gearset including two sun gears having different tooth numbers, and a stepped pinion of different tooth numbers meshing individually with the two sun gears.

15. A gear shift control apparatus for an automatic transmission as set forth in any of claims 1 to 6 or 7 to 13, wherein the double sun gear type planetary gearset is a planetary gearset including two sun gears having equal tooth numbers, and a pinion meshing individually with the two sun gears.

16. A gear shift control apparatus for an automatic transmission as set forth in claim 1 or 4, wherein the double sun gear type planetary gearset is a planetary gearset including two sun gears having different tooth numbers, and a stepped pinion of different tooth numbers meshing individually with the two sun gears.

17. A gear shift control apparatus for an automatic transmission as set forth in that claim 1 or 4, wherein the double sun gear type planetary gearset is a planetary gearset including two sun gears having equal tooth numbers, and a pinion meshing individually with the two sun gears.

* * * * *